(12) United States Patent
Baldwin et al.

(10) Patent No.: US 9,881,140 B2
(45) Date of Patent: Jan. 30, 2018

(54) PRESENTING SONIC SIGNALS TO PREVENT DIGITAL CONTENT MISUSE

(71) Applicant: Screening Room Media, Inc., West Hollywood, CA (US)

(72) Inventors: James Armand Baldwin, Palo Alto, CA (US); Prem Akkaraju, Los Angeles, CA (US); Giorgio Vanzini, Los Angeles, CA (US)

(73) Assignee: Screening Room Media, Inc., West Hollywood, CA (US)

( * ) Notice: Subject to any disclaimer, the term of this patent is extended or adjusted under 35 U.S.C. 154(b) by 0 days.

(21) Appl. No.: 15/344,368

(22) Filed: Nov. 4, 2016

(65) Prior Publication Data

US 2017/0124301 A1  May 4, 2017

Related U.S. Application Data

(60) Provisional application No. 62/250,945, filed on Nov. 4, 2015.

(51) Int. Cl.
*G06F 21/10* (2013.01)
*H04L 29/06* (2006.01)
(Continued)

(52) U.S. Cl.
CPC ............ *G06F 21/10* (2013.01); *G06F 21/105* (2013.01); *G06F 21/31* (2013.01); *G06F 21/42* (2013.01);
(Continued)

(58) Field of Classification Search
CPC .......... G06F 21/44; G06F 21/42; G06F 21/34; G06F 21/31; G06F 21/10; G06F 21/60; G06K 7/1417; H04L 67/42

See application file for complete search history.

(56) References Cited

U.S. PATENT DOCUMENTS 8,943,605 B1  1/2015  Martin et al.
9,268,920 B1 *  2/2016  Butler .................... G06F 21/10
(Continued)

FOREIGN PATENT DOCUMENTS

WO    WO-2017079658 A1    5/2017

OTHER PUBLICATIONS

"International Application Serial No. PCT/US2016/060681, International Search Report dated Feb. 6, 2017", 2 pgs.
(Continued)

*Primary Examiner* — Theodore C Parsons
(74) *Attorney, Agent, or Firm* — Schwegman Lundberg & Woessner, P.A.

(57) ABSTRACT

A method for preventing digital content misuse can include receiving, by a client-side computing device, digital content from a remote computing system; periodically presenting sonic signals to confirm that a mobile computing device of a user authorized with the client-side computing device is within a desired geographic distance of the client-side computing device; receiving, by the client-side computing device, a notification that a number of unconfirmed sonic signals exceeds a threshold number of allowable unconfirmed sonic signals, wherein the number of unconfirmed sonic signals indicates a number of sonic signals presented by the client-side computing device that the mobile computing device did not confirm detecting; and in response to receiving the notification that the number of unconfirmed sonic signals exceeds the threshold number of allowable unconfirmed sonic signals, executing a remedial action.

16 Claims, 39 Drawing Sheets

(51) Int. Cl.
*H04L 29/08* (2006.01)
*G06F 21/31* (2013.01)
*G06F 21/42* (2013.01)
*G06F 21/44* (2013.01)
*G06F 21/60* (2013.01)
*G06K 7/14* (2006.01)
*G06Q 30/06* (2012.01)
*G06Q 50/18* (2012.01)

(52) U.S. Cl.
CPC .............. *G06F 21/44* (2013.01); *G06F 21/60* (2013.01); *G06K 7/1417* (2013.01); *G06Q 30/0635* (2013.01); *G06Q 50/184* (2013.01); *H04L 63/10* (2013.01); *H04L 63/107* (2013.01); *H04L 67/10* (2013.01); *H04L 67/18* (2013.01); *H04L 67/42* (2013.01); *G06F 2221/0775* (2013.01); *G06F 2221/2101* (2013.01); *G06F 2221/2111* (2013.01)

(56) References Cited

U.S. PATENT DOCUMENTS

| | | | |
|---|---|---|---|
| 2003/0142587 A1 | 7/2003 | Zeitzew | |
| 2003/0184431 A1 | 10/2003 | Lundkvist | |
| 2004/0133789 A1* | 7/2004 | Gantman | G06F 21/34 713/189 |
| 2007/0033422 A1* | 2/2007 | Lee | G10L 19/018 713/193 |
| 2007/0113081 A1 | 5/2007 | Camp | |
| 2008/0022003 A1 | 1/2008 | Alve | |
| 2012/0025950 A1* | 2/2012 | Von Tippelskirch | G06F 21/42 340/5.74 |
| 2012/0089835 A1* | 4/2012 | Peckover | G06F 21/10 713/168 |
| 2012/0151515 A1* | 6/2012 | Atsmon | G06F 21/34 725/23 |
| 2012/0221860 A1* | 8/2012 | Hoornaert | G06F 21/34 713/172 |
| 2012/0251076 A1* | 10/2012 | Stewart | H04N 5/913 386/252 |
| 2013/0208103 A1 | 8/2013 | Sands et al. | |
| 2014/0134951 A1* | 5/2014 | Paulson | H04B 7/2603 455/41.2 |
| 2014/0364056 A1 | 12/2014 | Belk et al. | |
| 2014/0366159 A1 | 12/2014 | Cohen | |
| 2015/0074253 A1 | 3/2015 | Lee et al. | |
| 2015/0242932 A1* | 8/2015 | Beguin | G06Q 30/0633 705/26.8 |
| 2015/0295921 A1* | 10/2015 | Cao | H04L 63/0853 726/7 |
| 2015/0365384 A1* | 12/2015 | Rider Jimenez | H04L 63/0435 705/77 |
| 2016/0180072 A1* | 6/2016 | Ligatti | G06F 21/34 726/7 |
| 2017/0124296 A1 | 5/2017 | Baldwin et al. | |
| 2017/0124297 A1 | 5/2017 | Baldwin et al. | |
| 2017/0124298 A1 | 5/2017 | Baldwin et al. | |
| 2017/0124299 A1 | 5/2017 | Baldwin et al. | |
| 2017/0124300 A1 | 5/2017 | Baldwin et al. | |
| 2017/0124302 A1 | 5/2017 | Baldwin et al. | |
| 2017/0124303 A1 | 5/2017 | Baldwin et al. | |

OTHER PUBLICATIONS

"International Application Serial No. PCT/US2016/060681, Written Opinion dated Feb. 6, 2017", 7 pgs.

* cited by examiner

PRESENTING SONIC SIGNALS TO PREVENT DIGITAL CONTENT MISUSE

CROSS-REFERENCE TO RELATED APPLICATIONS

The present application claims the benefit of priority of U.S. Provisional Application No. 62/250,945, filed on Nov. 4, 2015, which is incorporated herein by reference in its entirety.

BACKGROUND

With the advent of digital data and the Internet, digital content can now be shared quickly and easily to users in almost any geographic location. For example, digital content posted publicly to websites can be accessed by any user with a computer and internet connection. Although sharing digital content, particularly digital content that is intended to be accessed with no restrictions, has become much easier, the threat of unauthorized access and/or use of digital content that is intended to be restricted has increased. For example, some digital content can be intended to be accessed and/or used under specified restricted conditions, such as confidential content, sensitive content, licensed content, etc.

Current systems focus their security efforts on restricting initial access to digital content, and provide little to no security once initial access has been granted. For example, many systems will require initial user authentication (e.g., user name, password, device recognition, etc.,) prior to providing access to digital content, but do not monitor use of the digital content after initial access is granted. As a result, digital content can easily be misused, copied, shared, etc. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
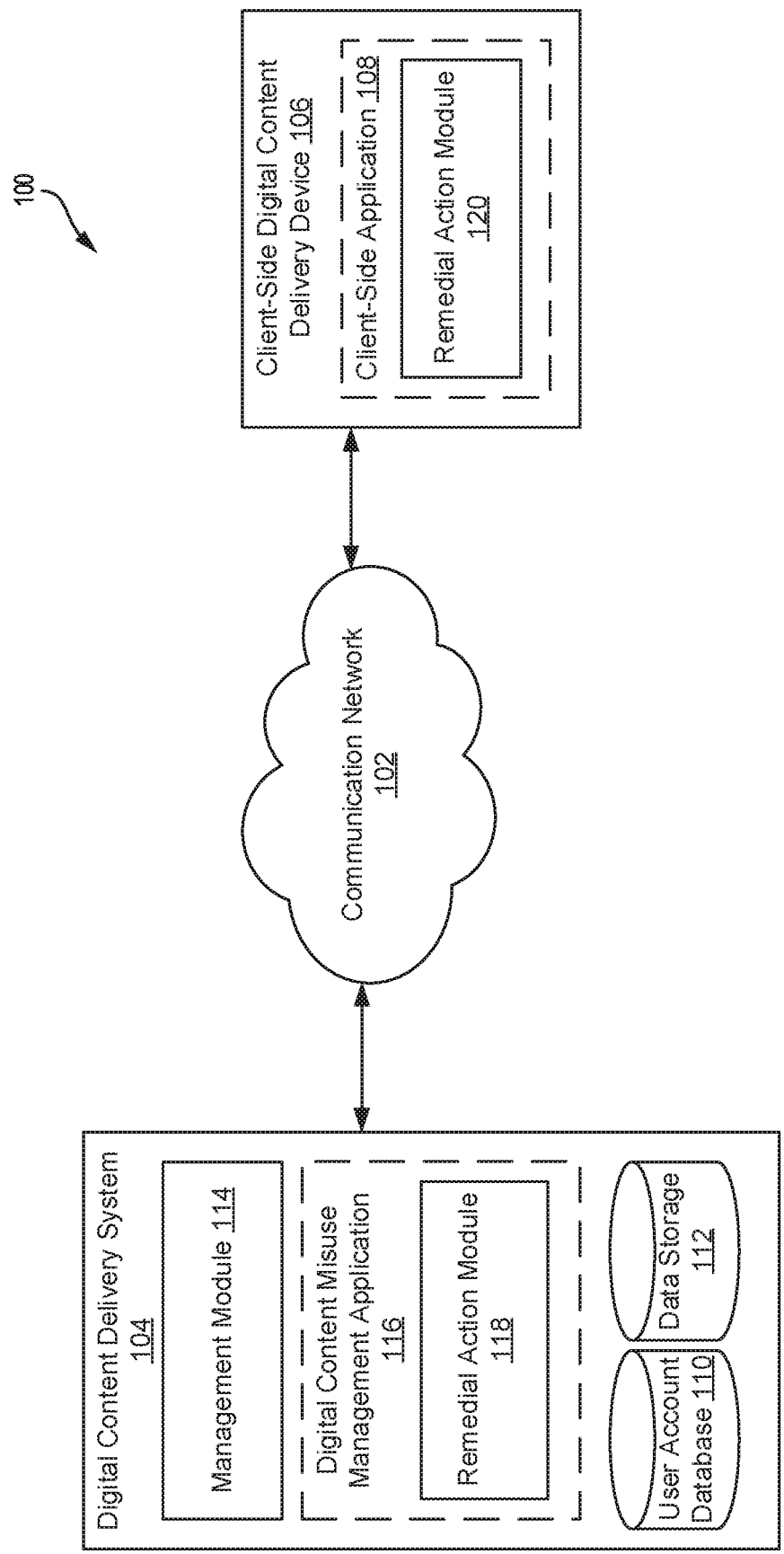
FIG. 1 shows an example digital content distribution network.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT-SIDE DIGITAL CONTENT DELIVERY DEVICE" in this context refers to any machine that interfaces to a communication network to obtain resources from one or more server systems or other computing device. A client-side digital content delivery device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATION NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"DIGITAL CONTENT DELIVERY SYSTEM OR DIGITAL CONTENT DISTRIBUTION NETWORK" in this context refers to a system of distributed servers (e.g. networked proxy server) that deliver digital content to a user.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC).

A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Description

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, SCREENING ROOM MEDIA, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

DRAWINGS

The current application discloses a number of technologies that may be used, in example embodiments, to address and mitigate challenges with enforcing access and/or usage restrictions on digital content. These technologies monitor use of digital content and suspend or terminate access to digital content when certain behaviors are detected.

FIG. 1 shows an example digital content distribution network. It shall be appreciated that although the various functional components of network 100 are discussed in a singular sense, multiple instances of one or more of the various functional components may be employed.

Network 100 includes multiple computing devices connected to communication network 102 and configured to communicate with each other through use of communication network 102. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of machine 2000 of FIG. 20.

To facilitate communication with other computing devices, a computing device can include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

Network 100 includes digital content delivery system 104 and client-side digital content delivery device 106 configured to provide digital content to users, as well as to enforce access and/or usage restrictions on the digital content. Digital content can include any type of digital content or data, such as text files, video files, music files, etc. Digital content can be associated with one or more intended restrictions on access and/or use of the digital content. For example, digital content can include confidential data and/or sensitive data, such as personal information (e.g., social security number), financial information (e.g., bank records, account numbers, etc.), medical records, confidential work materials, etc., that are restricted for use by specified people. Digital content can also include licensed content, such as movie rentals, movie purchases, music rentals, etc., that can be restricted for use by a specified person or audience, during specified times, etc.

Restrictions can include any type of restriction regarding accessing and/or using the digital content, such as a specified user or specified set of users that can access and/or use the digital content, a specified time period during which the digital content can be accessed and/or used, a specified geographic location where the digital content can be accessed and/or used, restrictions on how the digital content can be accessed and/or used, restrictions on whether the digital content can be copied and/or shared, etc.

In network 100, digital content delivery system 104 and client-side digital content delivery device 106 can work together to provide users with access to digital content, as well as to enforce access and/or usage restrictions on the digital content. For example, digital content delivery system 104 and client-side digital content delivery device 106 can monitor one or more usage signals to ensure that digital content is not being misused (e.g., that restrictions associated with the digital content are not being violated). In the event that digital content is being misused, or is potentially being misused, digital content delivery system 104 and/or client-side digital content delivery device 106 can execute one or more remedial actions, such as suspend or terminate a user's access to the digital content, gather additional data, investigate use of the digital content, etc.

In network 100, a user can interact with digital content delivery system 104 through client-side digital content delivery device 106 connected to communication network 102 by direct and/or indirect communication. Digital content delivery system 104 can be comprised of one or more computing devices configured to work with client-side digital content delivery device 106 to provide users with digital content, as well as to enforce access and/or usage restrictions on the digital content. Digital content delivery system 104 can support connections from a variety of different types of client-side digital content delivery devices 106, such as desktop computers; mobile computers; mobile communications devices (e.g. mobile phones, smart phones, tablets, etc.); smart televisions; set-top boxes; and/or any other network-enabled computing devices. Client-side digital content delivery device 106 can be of varying type, capabilities, operating systems, etc. Furthermore, digital content delivery system 104 can concurrently accept connections from and interact with multiple client-side digital content delivery devices 106.

A user can interact with digital content delivery system 104 via client-side application 108 installed on client-side digital content delivery device 106. In some embodiments, client-side application 108 can include a digital content delivery system-specific component. For example, the component can be a stand-alone application, one or more application plug-ins, and/or a browser extension. Client-side application 108 can present a user interface (UI) for the user to interact with digital content delivery system 104. For example, the UI can provide the user with digital content as well as include one or more user interface elements (e.g., buttons, text fields, etc.) to enable a user to interact with digital content delivery system 104.

Additionally, client-side application 108 can present a user with digital content. Client-side application 108 can utilize one or more output devices (e.g., display, speaker, etc.) of client-side digital content delivery device 106 and/or a secondary computing device (not shown) coupled to client-side digital content delivery device 106 to present digital content received from digital content delivery system 104. For example, in an embodiment in which client-side digital content delivery device 106 is a mobile phone, client-side application 108 can cause presentation of digital content using a display and/or speaker of the mobile phone. As another example, in an embodiment in which client-side digital content delivery device 106 is a set-top box, client-side application 108 can cause presentation of digital content on a display of a viewing device (e.g., television, monitor, etc.) that is connected to the set-top box.

In some embodiments, client-side application 108 can embed digital content with a digital watermark that can be used if the digital content has been misused. For example, the digital watermark can be embedded with an identifier for client-side digital content delivery device 106. Once embedded in the digital content, the digital watermark will be present in any copies made of the digital content, including unauthorized copies. Hence, if an unauthorized copy of digital content is found, the digital watermark embedded in the unauthorized copy can be used to identify the source.

Digital content delivery system 104 can be configured to manage digital content for multiple user accounts. For example, digital content delivery system 104 can allow users to store, access, rent and/or purchase digital content.

To facilitate the various services provided by digital content delivery system 104, a user can create a user account with digital content delivery system 104. The account information for each created user account can be maintained in user account database 110. User account database 110 can store profile information for each user account, including a unique account identifier identifying the user account, personal information, username, password, email address, home address, credit card information, banking information, etc. User account database 110 can also include account management information, such as data storage locations, security settings, personal configuration settings, device identifier for client-side digital content delivery devices 106 that are authorized to access the user account, etc.

A user account can be used to purchase, rent, manage and store digital content, such as digital data, documents, text files, audio files, video files, etc. For example, digital content delivery system 104 can provide an online retailer where users can purchase/rent digital content, such as movies, shows, books, music, etc.

Upon digital content being purchased and/or rented by a user, the user's account can be updated to indicate that the user has acquired a license to the purchased and/or rented digital content. This can allow the user to access the digital content using client-side digital content delivery devices 106. For example, a digital content identifier identifying rented and/or purchased digital content (e.g., movie) can be assigned to a user account in user account database 110 and associated with the corresponding user account. The digital content identifier can be used to identify the digital content as well as the location of the digital content.

Further, the user's account can be updated with data defining restrictions associated with the digital content, such users authorized to access or use the digital content, geographic locations where the digital content can be accessed, times during which the digital content can be accessed, etc. In some embodiments, the restrictions can be based on a license purchased by the user with respect to digital content. For example, a user may have purchased a limited rental of a movie that entitles the user to view the movie a limited number of times, during a limited time and/or with a limited number of other users.

Digital content can be stored in data storage 112. Data storage 112 can be a storage device, multiple storage devices, or a server. Alternatively, data storage 112 can be a cloud storage provider or network storage accessible via one or more communication networks. Digital content delivery system 104 can hide the complexity and details regarding storage of digital content from client-side digital content delivery device 106 such that the location of digital content stored by digital content delivery system 104 is not known by client-side digital content delivery device 106. Digital content delivery system 104 can store the digital content in a network accessible storage (SAN) device, in a redundant array of inexpensive disks (RAID), etc. Data storage 112 can store digital content using one or more partition types, such as FAT, FAT32, NTFS, EXT2, EXT3, EXT4, ReiserFS, BTRFS, and so forth.

Data storage 112 can also store metadata describing digital content, digital content types, and the relationship of digital content to various user accounts. The metadata can be stored as part of the digital content or can be stored separately. In one variation, digital content stored in data storage 112 can be assigned a system-wide unique identifier. In some embodiments, the metadata can include restrictions associated with the digital content.

Digital content delivery system 104 can include management module 114 configured to manage and access each user account and the digital content assigned to the user accounts. For example, management module 114 can be configured to communicate with user account database 110 and data storage 112 to adjust privileges and otherwise manage access to digital content.

Upon a user logging into their user account from client-side digital content delivery device 106, management module 114 can access the account information associated with the user account to identify digital content assigned to the user account, as well as any corresponding restrictions placed on the digital content. Management module 114 can enable a user to access and/or use the digital content assigned to the user's account. For example, management module 114 can access the user's account to identify digital content identifiers assigned to the user account. Management module 114 can use the digital content identifiers to identify and locate the digital content assigned to the user's account, which can be presented according to the account configuration data.

Management module 114 can also update the user's profile to update the user's usage history. Each user's profile can include a usage history indicating the digital content that the user has accessed and/or used, as well as metadata describing each use. This can include the times at which the user accessed and/or used the digital content, as well as any other usage signal data, such as a number of mobile computing devices present during usage, geographic location of the user when accessing the digital content, client-side digital content delivery device 106 used to access the digital content, etc. Management module 114 can access a user's account and update the user's usage history as the user accesses and/or uses digital content to record each use.

As explained above, in network 100, digital content delivery system 104 and client-side digital content delivery device 106 can monitor one or more usage signals to ensure that digital content is not being misused and, in the event that digital content is potentially being misused, execute one or more remedial actions. Usage signals can be any type of data gathered with regard to presenting digital content. For example, usage signals can include the user's usage history, frequency that a user accesses digital content, a number of times the user has accessed a particular item of digital content (e.g., a particular movie, document, etc.), a number of detected users viewing the digital content, location of the user when accessing digital content, configuration changes prior to or while accessing digital content, etc.

Digital content delivery system 104 and client-side data detection device 106 can each gather and share usage signal data to determine whether digital content is potentially being misused and, in the event that digital content is potentially being misused, execute one or more remedial actions. For example, digital content delivery system 104 can include digital content misuse management application 116 configured to determine whether digital content is potentially being misused and, in the event that digital content is potentially being misused, execute one or more remedial actions. Likewise, client-side application 108 can be configured to determine whether digital content is potentially being misused and, in the event that digital content is potentially being misused, execute one or more remedial actions. Specific embodiments of digital content delivery system 104 and client-side digital content delivery device 106 determining whether digital content has been misused are discussed in greater detail in the discussion of FIG. 2-XX.

A remedial action can be one or more actions performed with the intent of stopping misuse of digital content. For example, a remedial action can include terminating performance of digital content, suspending performance of digital content, disabling client-side digital content delivery device 106, gathering additional data to determine whether a suspected misuse of digital content is in fact a misuse of the content, etc.

A remedial action can be performed by digital content delivery system 104 and/or client-side digital content delivery device 106. As shown, digital content delivery system 104 includes remedial action module 118 configure to execute remedial actions. Likewise, client-side digital content delivery device 106 includes remedial action module 120 configured to execute remedial actions.

In some embodiments, a remedial action can include terminating performance of digital content, which can cause the performance of digital content being performed by client-side digital content delivery device 106 to end. For example, remedial action module 118 can cause digital content delivery system 104 to stop transmitting (e.g., streaming, downloading, etc.) the digital content to client-side digital content delivery device 106, thereby terminating performance of the digital content. As another example, remedial action module 118 can transmit a command to client-side digital content delivery device 106 to stop performing the digital content. As another example, remedial action module 120 can cause client-side digital content delivery device 106 to terminate performance of the digital content.

In some embodiments, a remedial action can include causing client-side digital content delivery device 106 to suspend performance of digital content. In contrast to terminating performance of digital content, suspending performance can include pausing performance of the digital content. This can be for a specified period of time or until a command is received to resume performance. For example, digital content delivery system 104 can transmit a command to client-side digital content delivery device 106 to resume performance of the suspended digital content. This can be the result of digital content delivery system 104 determining that the digital content is not being misused.

In some embodiments, a remedial action can include disabling client-side digital content delivery device 106. Disabling client-side digital content delivery device 106 can cause client-side digital content delivery device 106 to be inoperable to perform any function by the user.

In some embodiments, a remedial action can include gathering additional information to determine whether a suspected misuse of digital content is in fact a misuse. Remedial action module 118 and/or remedial action module 120 can cause social media activity of one or more users associated with client-side digital content delivery device 106 to be scanned to gather information indicating that the user(s) are misusing digital content. For example, remedial action module 118 and/or remedial action module 120 can scan a user's social media activity for postings indicating that the user allowed unauthorized access to digital content (e.g., hosting viewing of movies for large audiences).

In some embodiments, a remedial action can include simply presenting a user with a warning or message indicating that the user is suspected of misusing digital content. Although several examples of remedial actions are given, these are just some examples and are not meant to be limiting.

Figure 2:
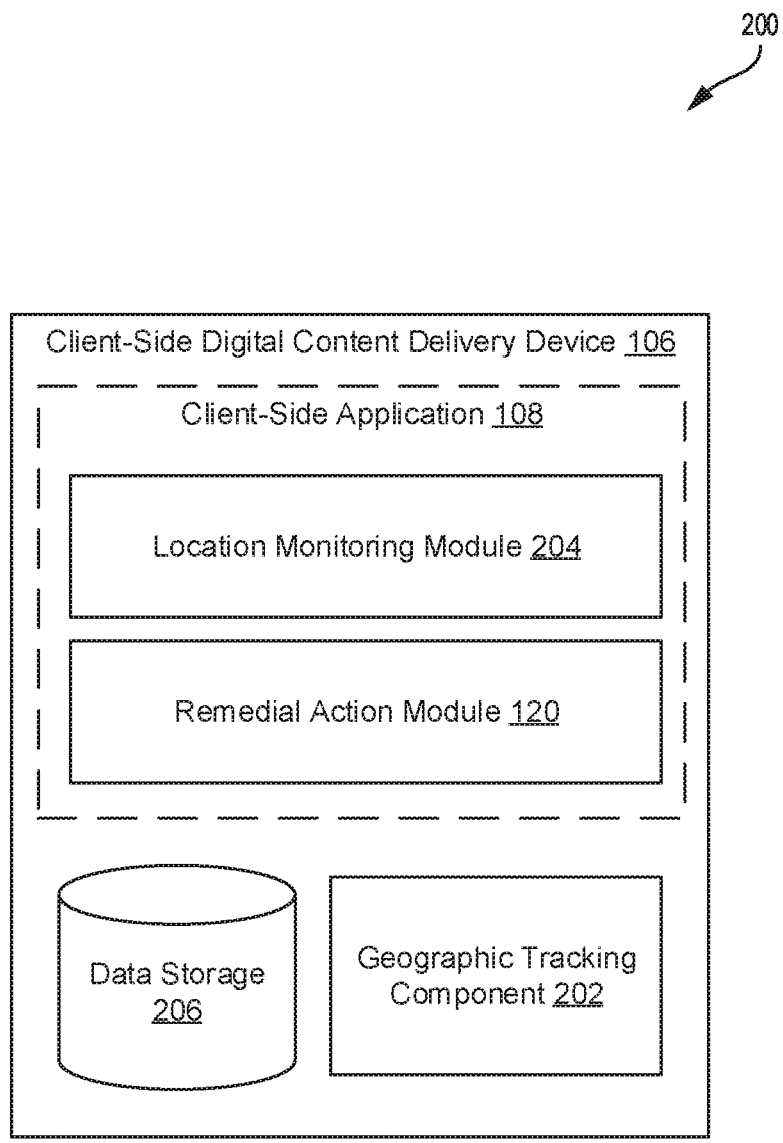
FIG. 2 shows a block diagram of a client-side digital content delivery device configured to determine whether digital content is being misused based on the location of the client-side digital content delivery device.

FIG. 2 shows a block diagram 200 of client-side digital content delivery device 106 configured to determine whether digital content is being misused based on the location of client-side digital content delivery device 106. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported to facilitate additional functionality that is not specifically described herein. Furthermore, the various functional modules depicted in FIG. 2 may reside on a single computing device or may be distributed across several computing devices in various arrangements such as those used in cloud-based architectures.

In some instances, digital content may be associated with geographic based restrictions that restrict use of the digital content to a specified geographic location and/or within a specified geographic area. For example, digital content such as confidential work materials may include a geographic restriction that the confidential work materials only be accessed within a predetermined distance of a work office. As another example, digital content such as a movie with a limited use license (e.g., rented movie) may include a geographic restriction that the movie only be played within a predetermined distance of a renting user's house. Client-side digital content delivery device 106 can be configured to monitor the geographic location of client-side digital content delivery device 106 prior to, during and/or after performance of digital content and execute a remedial action if the location of the client-side digital content delivery device 106 is outside of a permitted geographic area.

As shown, client-side digital content delivery device 106 includes geographic tracking component 202, which can determine the geographic location of client-side digital content delivery device 106. Geographic tracking component 202 can determine the location of client-side digital content delivery device 106 using any known location tracking technique or technology. For example, geographic tracking component 202 can determine the location of client-side digital content delivery device 106 using a Global Positioning System (GPS), control plane locating techniques, cellular tower triangulation, real-time locating, satellite tracking, etc.

Client-side application 108 can be configured to gather location data from geographic tracking component 202 and use the location data to determine whether digital content is being misused. Client-side application 108 can include location monitoring module 204 that is configured to communicate with geographic tracking component 202 to periodically gather location data describing the current location of client-side digital content delivery device 106.

Location monitoring module 204 can communicate with geographic tracking component 202 to request the current location of client-side digital content delivery device 106 at specified time intervals. For example, location monitoring module 204 can request the current location of client-side digital content delivery device 106 every 10 seconds, 20 seconds, 1 minute, etc. Location monitoring module 204 can request the current location of client-side data delivery prior to, during, and/or after client-side application 108 presents digital content.

Location monitoring module 204 can utilize the gathered location data to determine whether the current location of client-side digital content delivery device 106 is within a predetermined geographic area in which client-side digital content delivery device 106 is authorized to present digital content. Digital content received by client-side digital content delivery device 106 from digital content delivery system 104 can include metadata indicating one or more geographic areas in which client-side digital content delivery device 106 is authorized to present the digital content. Client-side digital content delivery device 106 can store the received metadata in data storage 206. The metadata can include coordinate data describing the boundaries of geographic areas where client-side digital content delivery device 106 is authorized to present the digital content. Alternatively, the metadata can include a geographic coordinate along with a radius indicating an authorized distance from the geographic area in which client-side digital content delivery device 106 is authorized to present the digital content.

Location monitoring module 204 can access data storage 206 to gather the metadata indicating one or more geographic areas in which client-side digital content delivery device 106 is authorized to present the digital content. Location monitoring module 204 can then use the current location of the client-side digital content delivery device 106 and the metadata indicating one or more geographic areas in which client-side digital content delivery device 106 is authorized to present the digital content to determine whether the current location of client-side digital content delivery device 106 is within a predetermined geographic area in which client-side digital content delivery device 106 is authorized to present digital content.

In response to determining that client-side digital content delivery device 106 is outside of the predetermined geographic area, client-side digital content delivery device 106 can execute a remedial action. As shown, client-side digital content delivery device 106 can include remedial action module 120, which can perform one or more remedial actions. In response to determining that client-side digital content delivery device 106 is outside of the predetermined geographic area, location monitoring module 204 can notify remedial action module 120. Remedial action module 120 can then perform one or more remedial action, such as suspending performance of digital content, disabling client-side digital content delivery device 106, etc.

Figure 3:
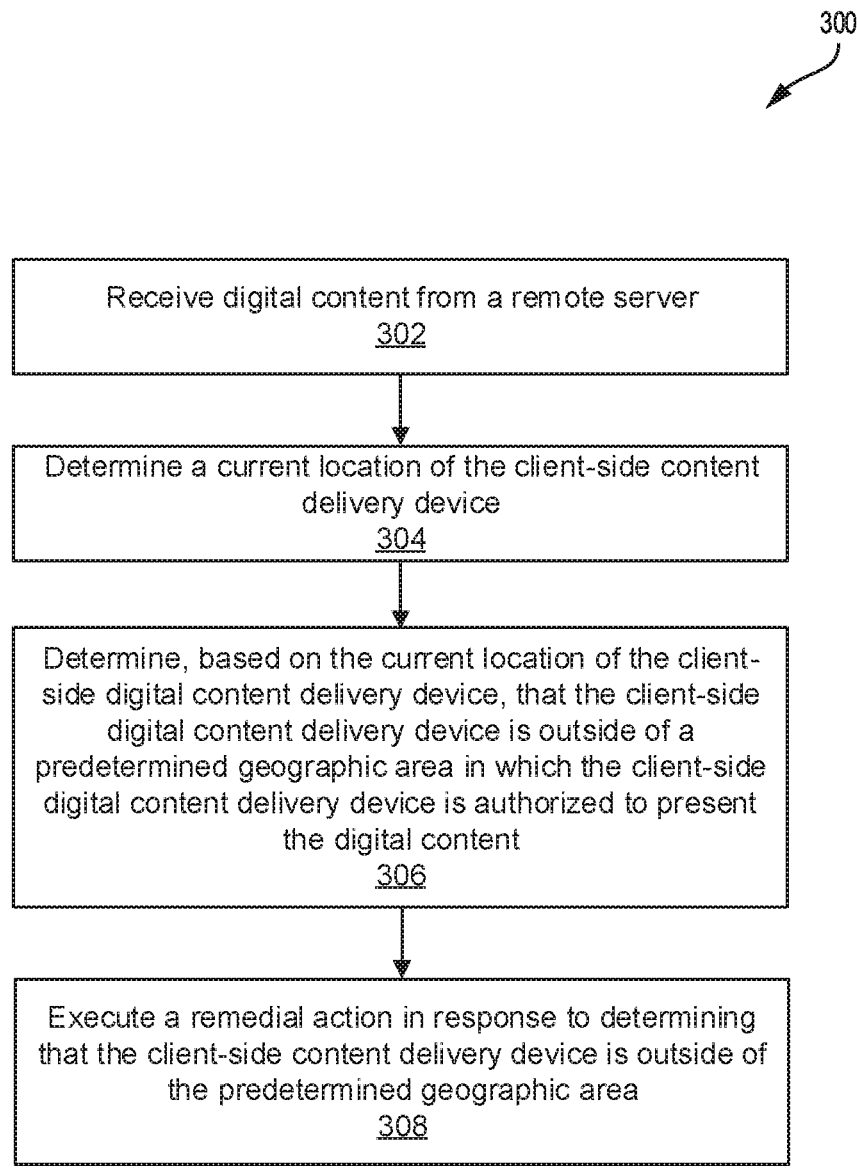
FIG. 3 shows an example method for determining whether digital content is being misused based on the location of a client-side digital content delivery device.

FIG. 3 shows an example method 300 for determining whether digital content is being misused based on the location of a client-side digital content delivery device (e.g., the device 106 of FIGS. 1 and 2). It should be understood that there can be additional, fewer, or alternative steps performed in similar or alternative orders, or in parallel, within the scope of the various embodiments unless otherwise stated.

At step 302, a client-side content delivery device receives digital content from a remote server. The remote server can be part of a digital content delivery system (e.g., the digital content delivery system 104). The digital content can be associated with one or more usage restrictions, such as a geographic restriction that dictates one or more predetermined geographic areas in which the client-side digital content delivery device is authorized to present the digital content.

In some embodiments, the client-side content delivery device can receive, from the remote server, data identifying the predetermined geographic area in which the client-side content delivery device is authorized to present the digital content. For example, the data can be received along with the digital content. Alternatively, the data can be received separately from the digital content.

In some embodiments, the predetermined geographic area in which the client-side content delivery device is authorized to present the digital content is based on a geographic location of a dwelling associated with the client-side content delivery device. For example, digital content such as a movie rental can be restricted to use within a predetermined geographic distance of the renting user's house.

In some embodiments, the predetermined geographic area in which the client-side content delivery device is authorized to present the digital content is based on a license acquired for the digital content. Digital content such as a movie rental may be limited based on a license purchased by the renting user. For example, a basic rental can allow the user to present the movie within a limited distance of the user's house. Alternatively, a higher cost rental may allow the user to present the movie in a larger venue.

At step 304, the client-side digital content delivery device determines a current location of the client-side digital content delivery device. The client-side digital content delivery device can determine the current location of the client-side digital content delivery device using any known technique and or technology. For example, in some embodiments, the client-side digital content delivery device can determine the current location of the client-side digital content delivery device using a Global Positioning Service (GPS). As another example, the client-side digital content delivery device can determine the current location of the client-side digital content delivery device using cellular tower triangulation techniques.

At step 306, the client-side digital content delivery device determines, based on the current location of the client-side digital content delivery device, that the client-side digital content delivery device is outside of a predetermined geographic area in which the client-side digital content delivery device is authorized to present the digital content.

At step 308, the client-side digital content delivery device executes a remedial action in response to determining that the client-side digital content delivery device is outside of the predetermined geographic area. For example, the client-side digital content delivery device can terminate performance of the digital content, disable the client-side digital content delivery device, suspend performance of the digital content, etc.

Figure 4:
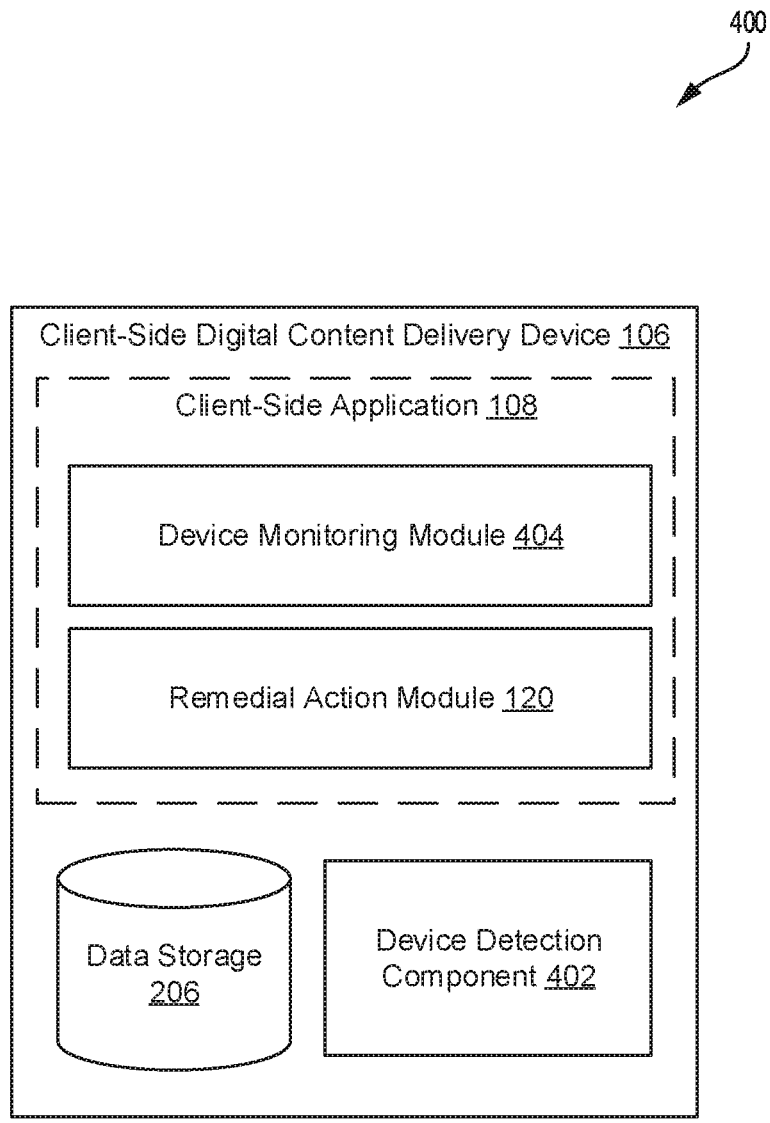
FIG. 4 shows a block diagram of a client-side digital content delivery device configured to determine whether digital content is being misused based on a number of mobile computing devices detected by the client-side digital content delivery device.

FIG. 4 shows a block diagram 400 of client-side digital content delivery device 106 configured to determine whether digital content is being misused based on a number of mobile computing devices detected by client-side digital content delivery device 106. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported to facilitate additional functionality that is not specifically described herein. Furthermore, the various functional modules depicted in FIG. 4 may reside on a single computing device or may be distributed across several computing devices in various arrangements such as those used in cloud-based architectures.

In some instances, digital content can be associated with restrictions on the number of users that may view the digital content. For example, digital content such as personal information can be intended for use by a limited number of people. Accordingly, personal information may have a restriction on the number of people that can view the personal data. As another example, digital content such as a movie with a limited use license (e.g., rented movie) may include a restriction on the number of users that are allowed to view the rented movie. Client-side digital content delivery device 106 can be configured to monitor the number of nearby users during performance of digital content and execute a remedial action if the number of users exceeds a threshold allowable number of users.

As shown, client-side digital content delivery device 106 includes device detection component 402. Device detection component 402 can be configured to detect a number of mobile computing devices (e.g., cell phones, tablets, etc.) that are within a geographic distance of client-side digital content delivery device 106. Device detection component 402 can detect the number of mobile computing device using one or more techniques. For example, in some embodiments, device detection component 402 can scan a home network, such as a Wi-Fi network, to determine the number of mobile computing devices that are connected to the home network. As another example, device detection component 402 can scan for short wave connectivity signals (e.g., Bluetooth signals) being emitted by mobile computing devices.

As shown, client-side application 108 can include device monitoring module 404. Device monitoring module 404 can be configured to communicate with device detection component 402 to request the number detected mobile computing devices and determine, based on the number of detected mobile computing devices, whether a number of users viewing the digital content exceeds a threshold number of authorized users associated with the digital content.

Device monitoring module 404 can communicate with device detection component 402 at specified time intervals to request the number of detected mobile computing devices. For example, device detection module 404 can transmit a request every 10 seconds, 20 seconds, 1 minute, etc. Device monitoring module 404 can request the number of detected mobile computing devices prior to, during and/or after client-side application 108 is presenting digital content.

Device monitoring module 404 can utilize the number of detected mobile computing devices to determine whether a number of users viewing the digital content exceeds a threshold number of authorized users associated with the digital content. Device monitoring module 404 can determine the number of users viewing the digital content based on an assumption that most users own and regularly carry a mobile computing device, such as a mobile phone. Accordingly, device monitoring module 404 can determine the number of users viewing the digital content based on the number of mobile computing devices detected by device detection component 402. For example, device monitoring module 404 can determine that each detected mobile computing device indicates a unique user viewing the digital content.

In some embodiments, device monitoring module 404 can determine the number of users viewing the digital content based on the type of mobile computing devices detected by device detection component 402. In some instances, a single user may have multiple mobile computing devices, such as a smartphone, tablet and/or laptop computer. While a user may have multiple mobile computing devices with them, generally a user carries only a single mobile phone. Accordingly, in some embodiments, device monitoring module 404 can determine the number of users viewing the digital content based on the number of mobile phones that are detected by device detection component 402, rather than the overall number of mobile computing devices detected by device detection component 402.

Device monitoring module 404 can determine the type of mobile computing devices using any known technique. For example, device monitoring module 404 can gather metadata from the detected mobile computing devices that indicate the type of mobile computing device, such as a device identifier that can be used to discern the mobile computing device type. In some instances, a mobile computing device may include a descriptive name indicating the mobile computing type, such as "Bob's Phone" or "Bob's Tablet." Device monitoring module 404 can request the device name from each detected mobile computing device and analyze the device names to determine the mobile computing device type.

Digital content received by client-side digital content delivery device 106 from digital content delivery system 104 can include metadata indicating a number of authorized users authorized to view the digital content. Client-side digital content delivery device 106 can store the received metadata in data storage 206. Device monitoring module 404 can access data storage 206 to gather the metadata indicating the number of authorized users authorized to view the digital content. Device monitoring module 404 can then use the metadata to determine whether the number of users viewing the digital content exceeds the threshold number of authorized users associated with the digital content.

In response to determining that the number of users viewing the digital content exceeds the threshold number of authorized users associated with the digital content, client-side digital content delivery device 106 can execute a remedial action. As shown, client-side digital content delivery device 106 can include remedial action module 120, which can perform one or more remedial actions. Device monitoring module 404 can notify remedial action module 120 that the number of users viewing the digital content exceeds the threshold number of authorized users associated with the digital content. Remedial action module 120 can then perform one or more remedial action, such as suspending performance of digital content, disabling client-side digital content delivery device 106, etc.

Figure 5:
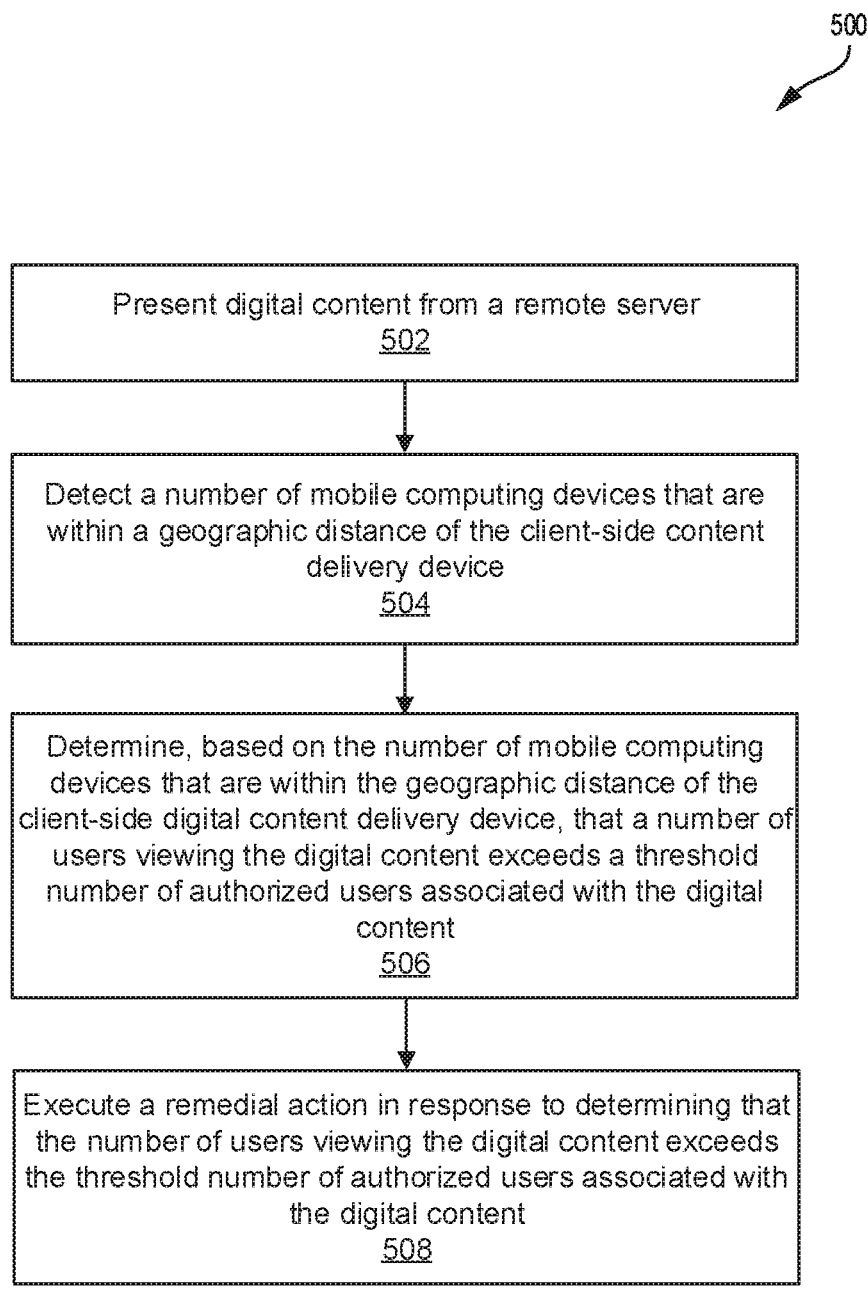
FIG. 5 shows an example method for determining whether digital content is being misused based on a number of mobile computing devices detected by a client-side digital content delivery device.

FIG. 5 shows an example method 500 for determining whether digital content is being misused based on a number of mobile computing devices detected by a client-side digital content delivery device. It should be understood that there can be additional, fewer, or alternative steps performed in similar or alternative orders, or in parallel, within the scope of the various embodiments, unless otherwise stated.

At step 502, the client-side digital content delivery device (e.g., the device 106) presents digital content that was received from a remote server. The remote server can be part of a digital content delivery system (e.g., the system 104). The digital content can be associated with one or more usage restrictions, such as a restriction that dictates a number of users that are authorized to view the digital content.

In some embodiments, the client-side content delivery device can receive, from the remote server, data identifying the number of authorized users associated with the digital content. For example, the data can be received along with the digital content. Alternatively, the data can be received separately from the digital content.

In some embodiments, the number of authorized users is based on a number of known residents of a dwelling associated with the client-side digital content delivery device. For example, digital content such as a movie rental can be restricted to use by a renting user and his/her immediate family.

In some embodiments, the number of authorized users is based on a license acquired for the digital content. Digital content such as a movie rental may be limited based on a license purchased by the renting user. For example, a basic rental can allow a user to view the movie with their immediate family members. Alternatively, a higher cost rental may allow the user to present the movie to a larger group.

At step 504, the client-side digital content delivery device detects a number of mobile computing devices that are within a geographic distance of the client-side digital content delivery device. For example, the client-side digital content delivery device can detect the number of mobile computing devices by scanning a home network for mobile computing devices that are connected to the home network via Wi-Fi. As another example, the client-side digital content delivery device can detect the number of mobile computing devices by scanning for mobile computing devices that are emitting a Bluetooth signal.

At step 506, the client-side digital content delivery device determines, based on the number of mobile computing devices that are within the geographic distance of the client-side digital content delivery device, that a number of users viewing the digital content exceeds a threshold number of authorized users associated with the digital content. In some embodiments, the client-side digital content delivery device can assume that a unique user is viewing the digital content for each mobile computing device detected. Alternatively, in some embodiments, the client-side digital content delivery device can assume that a unique user is viewing the digital content for each mobile computing device detected that is of a specified type, such as a mobile phone.

At step 508, the client-side digital content delivery device executes a remedial action in response to determining that the number of users viewing the digital content exceeds the threshold number of authorized users associated with the digital content. For example, the client-side digital content delivery device can terminate performance of the digital content, disable the client-side digital content delivery device, suspend performance of the digital content, etc.

Figure 6:
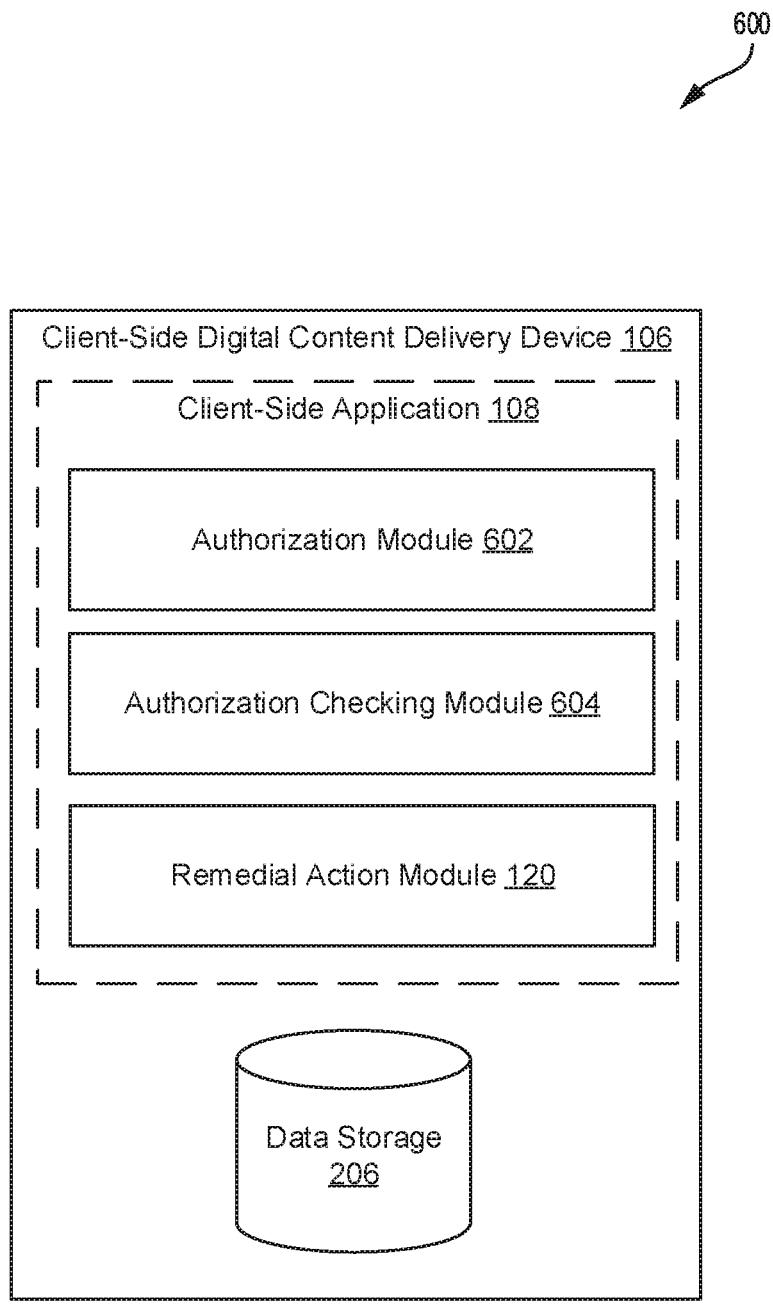
FIG. 6 shows a block diagram of a client-side digital content delivery device configured to limit use of digital content to an authenticated viewing device.

FIG. 6 shows a block diagram 600 of client-side digital content delivery device 106 configured to limit use of digital content to an authenticated viewing device. To avoid obscuring the inventive subject matter with unnecessary detail, various functional components (e.g., modules) that are not germane to conveying an understanding of the inventive subject matter have been omitted from FIG. 6. However, a skilled artisan will readily recognize that various additional functional components may be supported to facilitate additional functionality that is not specifically described herein. Furthermore, the various functional modules depicted in FIG. 6 may reside on a single computing device or may be distributed across several computing devices in various arrangements such as those used in cloud-based architectures.

In some embodiments, client-side digital content delivery device 106 can be restricted to use with an authorized viewing device. For example, in embodiments where client-side digital content delivery device 106 is a set-top box, client-side digital content delivery device 106 can be restricted for use with an authorized viewing device, such as a television, monitor, etc. As a result, digital content presented by client-side digital content delivery device 106 can be restricted to specified areas. For example, digital content such as confidential work materials can be restricted to a display located in a conference room at a company office. As another example, digital content such as a movie rental can be restricted to use on a renting user's television.

In some embodiments, a viewing device can be designated as an authorized viewing device upon initially being paired with client-side digital content delivery device 106 (e.g., a physical connection is made between client-side digital content delivery device 106 and the viewing device using a cable). If the pairing between client-side digital content delivery device 106 and the authorized viewing device is broken (e.g., the physical cable is disconnected) and/or client-side digital content delivery device 106 is paired to a different viewing device that is not authorized, client-side digital content delivery device 106 can execute a remedial action.

As shown in FIG. 6, client-side application 108 includes authorization module 602. Authorization module 602 can be configured to authorize a viewing device to present digital content received by client-side digital content delivery device 106 from digital content delivery system 104. Authorization module 602 can detect that client-side digital content delivery device 106 is paired to a viewing device. For example, authorization module 602 can determine that a connection has been made between client-side digital content delivery device 106 and the viewing device. The connection can be a physical connection (e.g., a cord connected to client-side digital content delivery device 106 and the viewing device) or a wireless connection (e.g., a Bluetooth or other wireless connection).

Upon detecting that a viewing device is paired to client-side digital content delivery device 106, authorization module 602 can designate the viewing device as an authorized viewing device. For example, authorization module 602 can communicate with the viewing device to gather a device identifier identifying the viewing device. Authorization module 602 can record the device identifier in data storage 206 to indicate that the viewing device is authorized to present digital content received by client-side digital content delivery device 106 from digital content delivery system 104.

Client-side digital content delivery device 106 can reference the device identifier stored in data storage 206 to ensure that a viewing device paired with client-side digital content delivery device 106 is authorized to present digital content. Client-side digital content delivery device 106 can include authorization checking module 604 configured to ensure that a viewing device paired with client-side digital content delivery device 106 is authorized to present digital content. For example, prior to client-side digital content delivery device 106 presenting digital content on a viewing device paired to client-side digital content delivery device 106, authorization checking module 604 can request an identifier from the viewing device paired to client-side digital content delivery device 106 and compare it to the recorded device identifier in data storage 206. If authorization checking module 604 determines that the device identifier received from the viewing device paired to client-side digital content delivery device 106 matches the recorded device identifier, authorization checking module 604 can allow the digital content to be presented on the viewing device. Alternatively, if authorization checking module 604 determines that the device identifier received from the viewing device paired to client-side digital content delivery device 106 does not match the recorded device identifier, remedial action module 120 can execute one or more remedial actions.

The number of viewing devices that can be authorized with client-side digital content delivery device 106 can be limited to a maximum allowable number. For example, client-side digital content delivery device 106 can be limited to a maximum of 1, 2, 3, etc., authorized viewing device.

In situations where the maximum number of viewing devices authorized with client-side digital content delivery device 106 has already been met, the user can be required to request approval to remove one or more of the authorized viewing devices to authorize a new viewing device to be authorized. For example, a user may be required to call or otherwise contact an administrator associated with digital content delivery system 104 to request that one or more authorized viewing devices be unauthorized so that a new viewing device can be authorized.

If the user's request is approved, digital content delivery system 104 can transmit a message to client-side digital content delivery device 106 indicating that the request has been approved. The message can cause client-side digital content delivery device 106 to unauthorize one or more viewing devices. For example, authorization module 602 can delete the recorded device identifiers from data storage 206.

In some embodiments, client-side digital content delivery device 106 can be configured to monitor the connection between client-side digital content delivery device 106 and an authorized viewing device that is paired to client-side digital content delivery device 106 to determine whether the connection is broken at any time. For example, after detecting that client-side digital content delivery device 106 is paired with a viewing device, authorization module 602 can monitor the connection to ensure that it remains intact (e.g., the physical cord remains connected to both client-side digital content delivery device 106 and the viewing device). In response to authorization module 602 detecting that client-side digital content delivery device 106 has been unpaired from the viewing device (i.e., the connection between client-side digital content delivery device 106 and the viewing device has been broken), remedial action module 120 can execute a remedial action.

Figure 7:
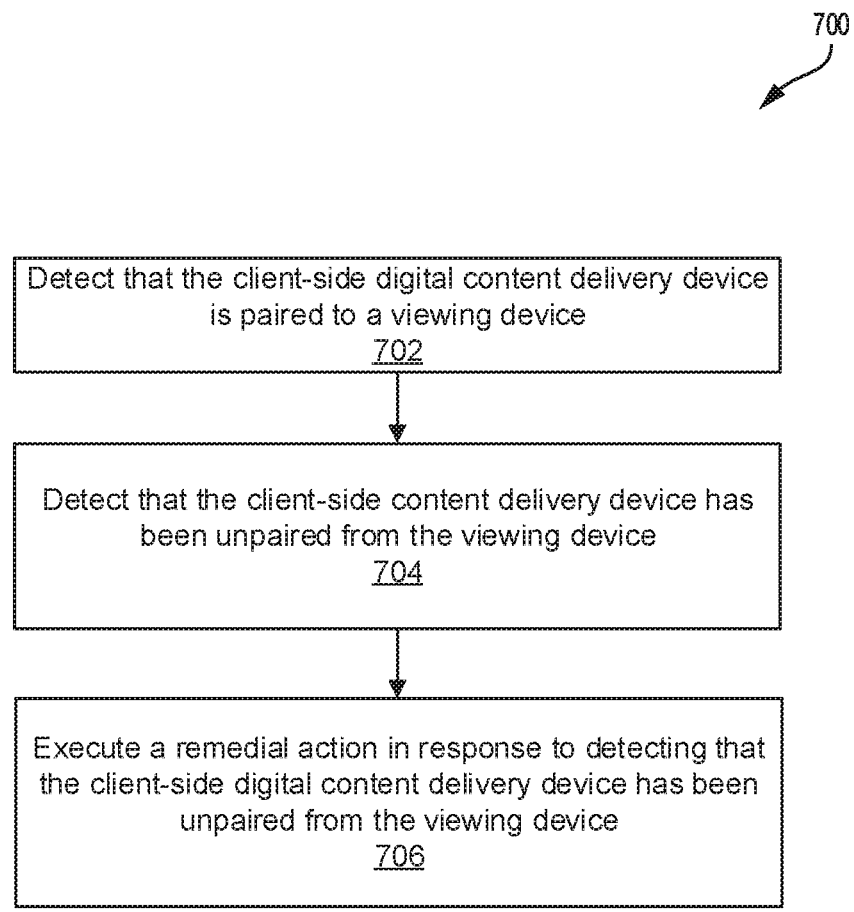
FIG. 7 shows an example method for limiting use of digital content to an authenticated viewing device.

FIG. 7 shows an example method 700 for limiting use of digital content to an authenticated viewing device. It should be understood that there can be additional, fewer, or alternative steps performed in similar or alternative orders, or in parallel, within the scope of the various embodiments unless otherwise stated.

At step 702, the client-side digital content delivery device (e.g., device 106) detects that the client-side digital content delivery device is paired to a viewing device. Detecting that the client-side content delivery device is paired to a viewing device can include detecting that a physical cord has been connected to the client-side digital content delivery device and the viewing device. For example, the physical cord can be a High Definition Multimedia Interface (HDMI) cord. Detecting that the client-side digital content delivery device is paired to a viewing device can also include determining that the client-side digital content delivery device has established a wireless connection with the viewing device utilizing a communication protocol. For example, the communication protocol can be Bluetooth.

After the client-side digital content delivery device is paired to the viewing device, the client-side digital content delivery device can designate the viewing device as an authorized viewing device, thereby enabling the client-side digital content delivery device to cause digital content received from a remote server (e.g., digital content delivery system 104) to be presented on a display of the viewing device. For example, the client-side digital content delivery device can receive, from the viewing device, a unique identifier for the viewing device. The client-side digital content delivery device can record the unique identifier in a memory (e.g., data storage) of the client-side digital content delivery device.

At step 704, the client-side digital content delivery device detects that the client-side content delivery device has been unpaired from the viewing device. For example, the client-side digital content delivery device can detect that a physical cord (e.g., HDMI cord) has been unconnected from either the client-side digital content delivery device or the viewing device. As another example, the client-side digital content delivery device can detect that a wireless connection (e.g., Bluetooth) between the client-side digital content delivery device and the viewing device has been terminated.

In some embodiments, the client-side digital content delivery device can use the unique identifier recorded in memory to detect that the client-side content delivery device has been unpaired from the viewing device. For example, the client-side content delivery device can request a unique identifier from a viewing device paired to the client-side digital content delivery device. The client-side content delivery device can compare the received unique identifier to the unique identifier recorded in the memory of the client-side digital content delivery device. If the unique identifier received from the viewing device does not match the device identifier stored in the memory, the client-side digital content delivery device can determine that the client-side digital content delivery device has been unpaired from the authorized viewing device.

At step 706, the client-side digital content delivery device executes a remedial action in response to detecting that the client-side digital content delivery device has been unpaired from the viewing device. For example, the client-side digital content delivery device can terminate performance of the digital content, disable the client-side digital content delivery device, suspend performance of the digital content, etc.

Figure 8:
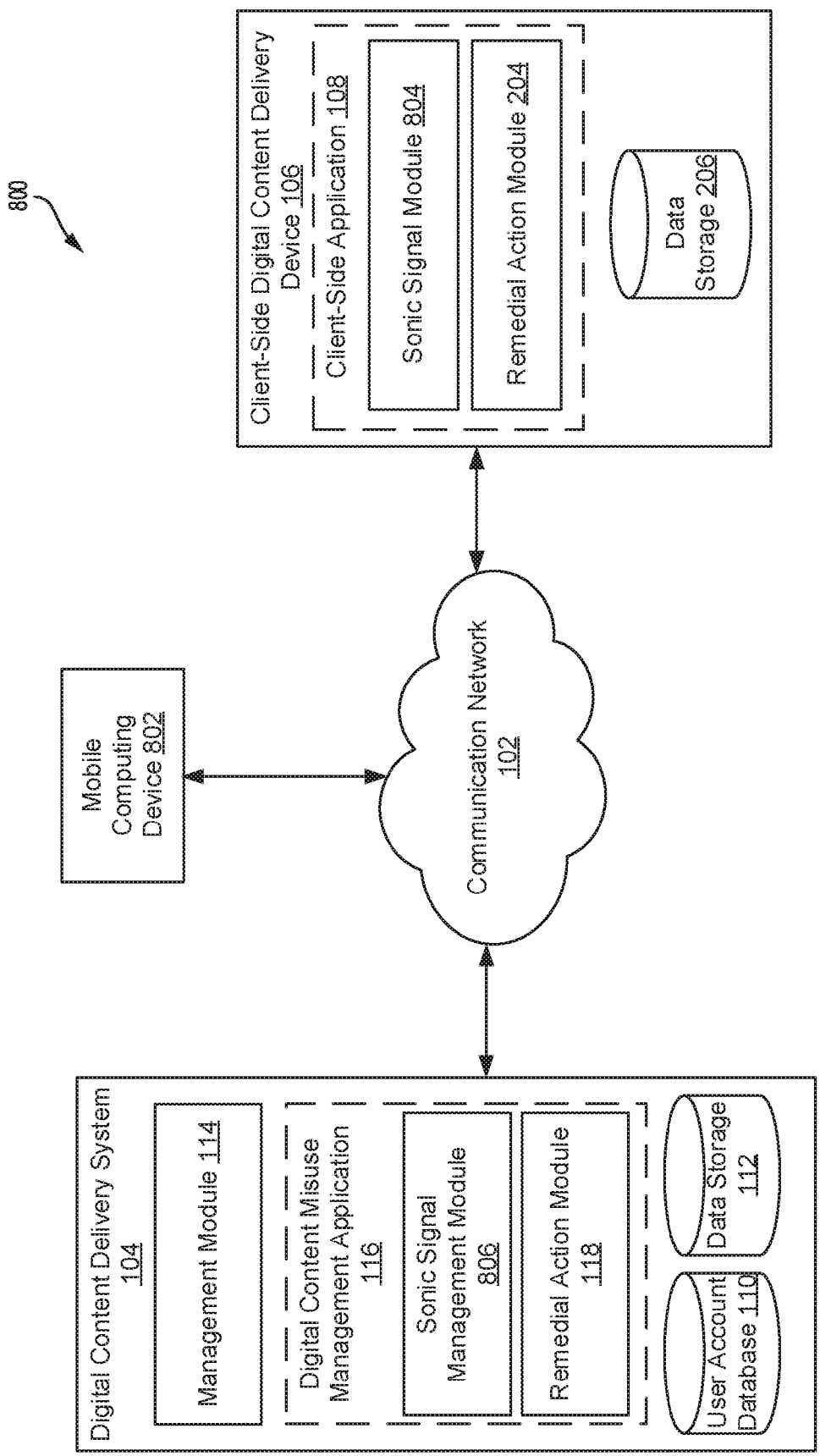
FIG. 8 shows an example system configured to determine whether digital content is being misused.

FIG. 8 shows an example system 800 configured to determine whether digital content is being misused. To avoid obscuring the inventive subject matter with unnecessary detail, various functional components (e.g., modules) that are not germane to conveying an understanding of the inventive subject matter have been omitted from FIG. 8. However, a skilled artisan will readily recognize that various additional functional components may be supported to facilitate additional functionality that is not specifically described herein. Furthermore, the various functional modules depicted in FIG. 8 may reside on a single computing device or may be distributed across several computing devices in various arrangements such as those used in cloud-based architectures.

In some embodiments, digital content can be associated with an intended recipient that is authorized to access the digital content. For example, personal and/or confidential data (i.e., social security number and/or medical records) can be associated with a specified user, such as the owner of the social security number, a doctor, a loan officer, etc. Client-side digital content delivery device 106 and digital content delivery system 104 can be configured to monitor the location of one or more authorized users to ensure that the authorized user(s) is present during presentation of digital content. The authorized user being present can indicate that the digital content is not being misused. In the event that the authorized user(s) is determined to not be present during presentation of the digital content, it can be assumed that the digital content is being misused and remedial actions can be executed.

To determine whether an authorized user is present during presentation of digital content, client-side digital content delivery device 106 can present sonic signals during presentation of the digital content. A sonic signal, upon being detected by an authorized user's mobile computing device (i.e., mobile computing device 802), can cause mobile computing device 802 to transmit a confirmation message to digital content delivery system 104 confirming that mobile computing device 802 detected the sonic signal. If a threshold number of sonic signals are not confirmed by mobile computing device 802, digital content delivery system 104 can determine that the authorized user is not present and a remedial action can be executed.

As shown, client-side application 108 can include sonic signal module 804, which can generate and present sonic signals. A sonic signal can be any type of signal that can be detected by a microphone of mobile computing device 802. For example, a sonic signal can be an acoustic fingerprint that can be presented along with or embedded within digital content. Sonic signal module 804 can present one or more sonic signals, prior to, during and/or after presentation of digital content.

A sonic signal, upon being detected by mobile computing device 802, can cause mobile computing device 802 to transmit a confirmation message to digital content delivery system 104 confirming that mobile computing device 802 detected the sonic signal. For example, mobile computing device 802 can communicate with digital content delivery system 104 via communication network 102.

Sonic signal module 804 can present sonic signals according to any schedule, such as according to specified time intervals, at predetermined points during presentation of the digital content, etc. In some embodiments, client-side digital content delivery device 106 can receive a schedule for presenting the sonic signals from digital content delivery system 104, which can be stored in data storage 206. For example, digital content delivery system 104 can include sonic signal management module 806 that is configured to provide the schedule to client-side digital content delivery device 106. Once stored in data storage 206, sonic signal module 804 can access the stored schedule and present the sonic signals according to the received schedule.

In some embodiments, digital content received from digital content delivery system 104 can include data indicating when sonic signal module 804 should present a sonic signal. In another embodiment, sonic signal module 804 can present sonic signals in response to receiving a command from digital content delivery system 104. For example, sonic signal management module 806 transmits commands to client-side digital content delivery device 106 to present a sonic signal. In response to receiving the command, sonic signal module 804 can cause client-side digital content delivery device 106 to present a sonic signal.

In some embodiments, the sonic signals can be embedded with a code. For example, the code can include data identifying digital content delivery system 104 that client-side digital content delivery device 106 can use to transmit the authorization message. The code can also include an identifier identifying the digital content and/or client-side digital content delivery device 106. As another example, the code can include a unique confirmation code that was received from digital content delivery system 104. Mobile computing device 802 can transmit some or all of the embedded code to digital content delivery system 104 as part of the confirmation message.

Digital content delivery system 104 can be configured to monitor confirmation messages received from client-side digital content delivery device 106 and determine whether a number of unconfirmed sonic signals meets or exceeds a threshold number of allowable unconfirmed sonic signals. An unconfirmed sonic signal can be a sonic signal presented by client-side digital content delivery device 106 that mobile computing device 802 did not confirm detecting (i.e., a sonic signals presented by the client-side digital content delivery device 106 that did not result in mobile computing device 802 transmitting a confirmation message to digital content delivery system 104).

Sonic signal management module 806 can determine whether a sonic signal is unconfirmed. For example, sonic signal management module 806 can determine that a sonic signal is unconfirmed if a threshold amount of time has elapsed after the sonic signal was presented by client-side digital content delivery device 106 and a corresponding confirmation message has not been received from mobile computing device 802.

Sonic signal management module 806 can determine whether the number of unconfirmed sonic signals exceeds a threshold number of allowable unconfirmed sonic signals. If the number of unconfirmed sonic signals does exceed the threshold number of allowable unconfirmed sonic signals, digital content misuse management application 116 can execute a remedial action and/or transmit a notification to client-side digital content delivery device 106 to execute a remedial action. As shown, digital content misuse management application 116 includes remedial action module 118, which can execute one or more remedial actions.

In some embodiments, the number of unconfirmed sonic signals can be based on each unconfirmed sonic signal presented by client-side digital content delivery device 106. Alternatively, the number of unconfirmed sonic signals can be based on sonic signals presented by client-side digital content delivery device 106 with relation to presentation of a single digital data item (e.g., presentation of a movie). For example, the number of unconfirmed sonic signals can indicate the number of unconfirmed sonic signals detected shortly prior to, during and/or shortly after presentation of the movie. As another example, the number of unconfirmed sonic signals can indicate the number of unconfirmed sonic signals detected during a predetermined time period, such as during the previous 10 minutes, 20 minutes, etc.

In some embodiments, client-side digital content delivery device 106 can cause mobile computing device 802 to initiate a sonic signal detection mode. Once in sonic signal detection mode, mobile computing device 802 can actively listen for sonic signals presented by client-side digital content delivery device 106 and transmit confirmation messages to digital content delivery system 104. To initiate sonic signal detection mode, sonic signal module 804 can present a visible code that can be detected by mobile computing device 802. For example, the visible code can be a Quick Response (QR) code presented on a display. A user of mobile computing device 802 can take a picture or otherwise cause an optical sensor of mobile computing device 802 to detect the visible code.

The visible code can cause mobile computing device 802 to initiate sonic signal detection mode, during which one or more microphones of mobile computing device 802 will be active to detect sonic signals presented by client-side digital content delivery device 106. In some embodiments, the visible code can further cause mobile computing device 802 to transmit data to digital content delivery system 104. For example, the visible code can cause mobile computing device 802 to transmit an identifier associated with mobile computing device 802 and/or an identifier for client-side digital content device 106 to digital content delivery system 104. Management module 114 can use the received data to confirm that mobile computing device 802 has initiated sonic signal detection mode as well as to identify confirmation messages from mobile computing device 802.

Figure 9:
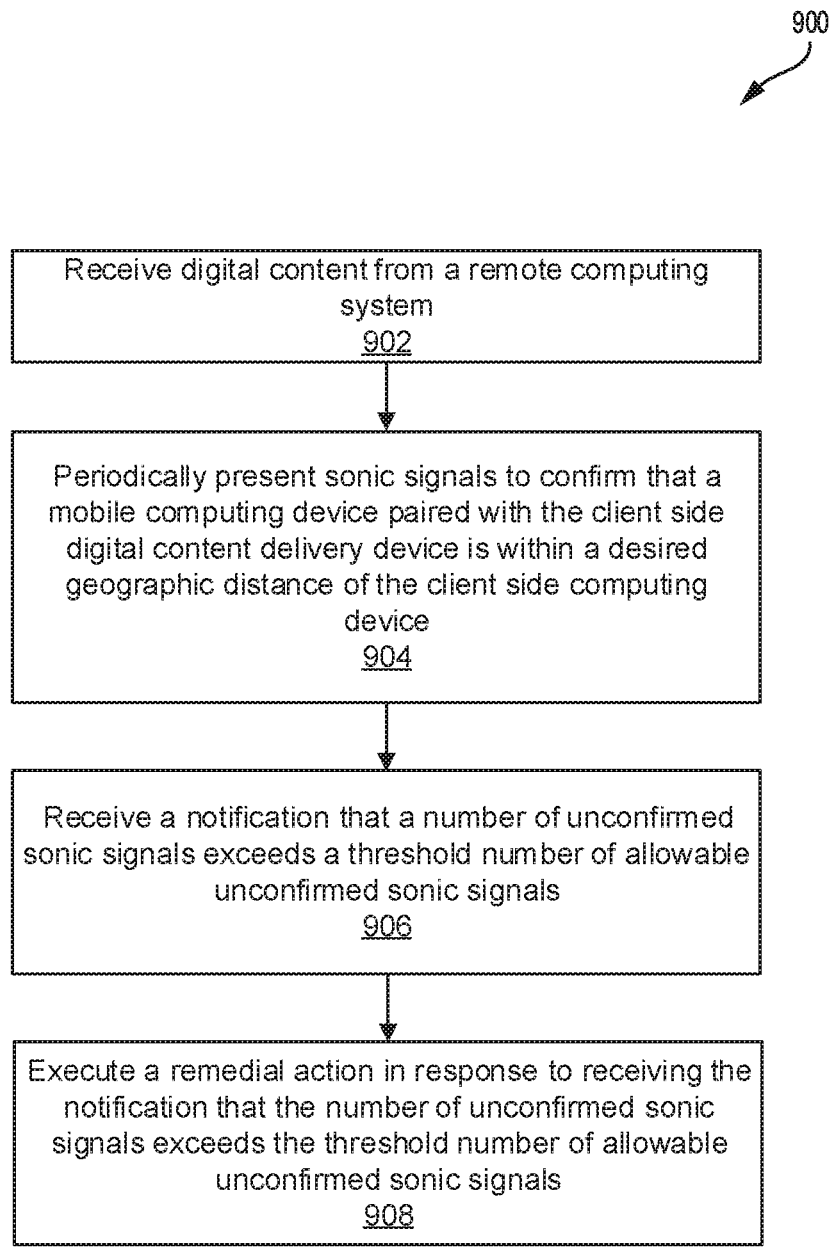
FIG. 9 shows an example method for determining whether digital content is being misused.

FIG. 9 shows an example method 900 for determining whether digital content is being misused. It should be understood that there can be additional, fewer, or alternative steps performed in similar or alternative orders, or in parallel, within the scope of the various embodiments unless otherwise stated.

At step 902, a client-side digital content delivery device (e.g., the device 106) receives digital content from a remote computing system (i.e., a digital content delivery system 104).

At step 904, the client-side digital content delivery device periodically presents sonic signals to confirm that a mobile computing device of a user authorized with the client-side digital content delivery device is within a desired geographic distance of the client-side content delivery device. Each sonic signal, upon being detected by the mobile computing device, can cause the mobile computing device to transmit a confirmation message to the remote computing system confirming that the mobile computing device detected the sonic signal.

Each sonic signal can be embedded with a code. The mobile computing device can include the code in the confirmation message to the remote computing system confirming that the mobile computing device detected the sonic signal. In some embodiments, the code embedded in the sonic signal can be varied. For example, the digital content delivery system can present a first sonic signal embedded with a first code, and then present a second sonic signal embedded with a second code that is different than the first code.

At step 906, the client-side digital content delivery device receives a notification that a number of unconfirmed sonic signals exceeds a threshold number of allowable unconfirmed sonic signals. The number of unconfirmed sonic signals can indicate a number of sonic signals presented by the client-side digital content delivery device that the mobile computing device did not confirm detecting. This number of unconfirmed sonic signals can include all unconfirmed sonic signals or, alternatively, a subset of the unconfirmed sonic signals. For example, the subset of the unconfirmed sonic signals can be the unconfirmed sonic signals that occurred within a predetermined time period (e.g., last 5 minutes, 10 minutes, etc.). As another example, the subset of the unconfirmed sonic signals can be the unconfirmed sonic signals associated with presentation of a singular digital content item (e.g., unconfirmed sonic signals that occurred prior, during and/or after presentation of a singular movie).

At step 908, the client-side digital content delivery device executes a remedial action in response to receiving the notification that the number of unconfirmed sonic signals exceeds the threshold number of allowable unconfirmed sonic signals. For example, the client-side digital content delivery device can terminate performance of the digital content, disable the client-side digital content delivery device, suspend performance of the digital content, etc.

Figure 10:
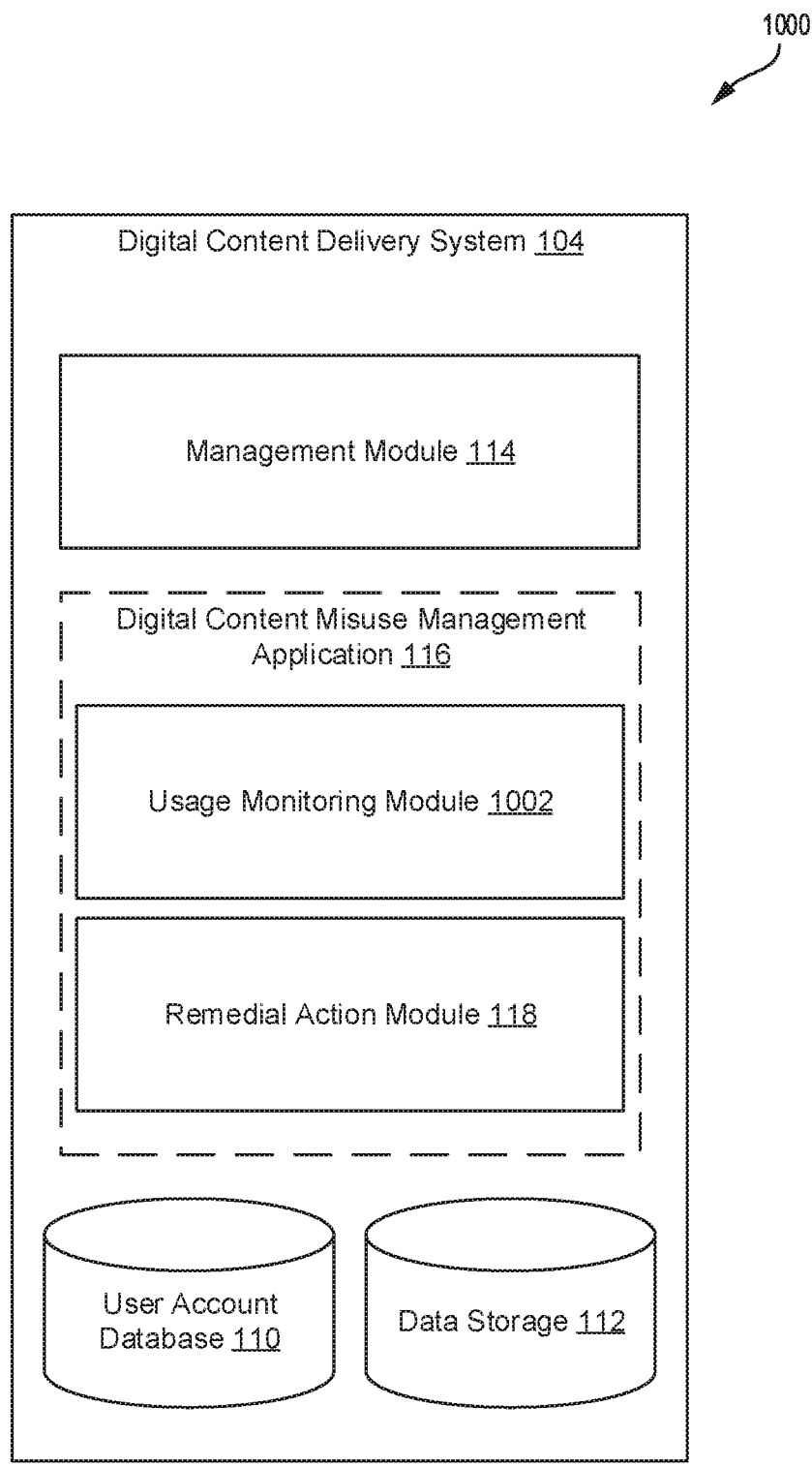
FIG. 10 shows a block diagram of a digital content delivery system configured to determine whether content is being misused.

FIG. 10 shows a block diagram 1000 of digital content delivery system 104 configured to determine whether content is being misused. To avoid obscuring the inventive subject matter with unnecessary detail, various functional components (e.g., modules) that are not germane to conveying an understanding of the inventive subject matter have been omitted from FIG. 10. However, a skilled artisan will readily recognize that various additional functional components may be supported to facilitate additional functionality that is not specifically described herein. Furthermore, the various functional modules depicted in FIG. 10 may reside on a single computing device or may be distributed across several computing devices in various arrangements such as those used in cloud-based architectures.

In some embodiments, misuse of digital content can be inferred based on a user's usage history. A user repeatedly accessing the same digital content item, such as a movie rental, or accessing digital content in consistent patterns, may be misusing the content. For example, a user repeatedly accessing the same digital content item may be misusing the digital content item by presenting the digital content item in violation of the license acquired for the digital content (e.g., for commercial gain). Digital content delivery system 104 can monitor usage of digital content to identify activity and/or patterns that indicate that the content is being misused, in which case digital content delivery system 104 can execute one or more remedial actions.

As shown, digital content misuse management application 116 can include usage monitoring module 1002. Usage monitoring module 1002 can monitor usage of digital content by various users. For example, usage monitoring module 1002 can communicate with user account database 110 to access the various user accounts stored by user account database 110, as well as analyze the usage histories for each user account. Usage monitoring module 1002 can determine, based on the usage history of a user, whether digital content is being misused by the user and, if so, execute one or more remedial actions.

In some embodiments, usage monitoring module 1002 can determine whether digital content is being misused based on the number of times that digital content has been accessed by a user. For example, usage monitoring module 1002 can determine, based on the usage history of a user, the number of times that the user has accessed digital content. This can include the number of times the user has accessed digital content using a client-side digital content delivery device (e.g., client-side digital content delivery device 106) to access digital content.

Usage monitoring module 1002 can determine whether the number of times that the user has accessed digital content meets or exceeds a threshold number of times the user is permitted to access digital content. If usage monitoring module 1002 determines that the number of times that the user has accessed digital content meets or exceeds the threshold number, usage monitoring module 1002 can notify remedial action module 118, which can execute one or more remedial actions.

In some embodiments, the number of times that the user has accessed digital content can be based on the total number of times the user has accessed digital content, including various digital content types (e.g., movies, music, text files, etc.) and without any time limitations. Alternatively, in some embodiments, the number of times that the user has accessed digital content can be based on the user's usage during specified time periods and/or usage with respect to specified content types. For example, the number of times that the user has accessed digital content can be based on the user's usage over the previous day, week, or month. As another example, the number of times that the user has accessed digital content can be based on the user's usage during specified times of the day, such as between 6 pm-10 pm, or during specified days of the week, such as Friday-Sunday.

In some embodiments, the number of times that the user has accessed digital content can be based on a digital content type. For example, the number of times that the user has accessed digital content can be the number of times that the user has accessed one or more specified digital content types, such as movie rentals, confidential work data, etc. As another example, the number of times that the user has accessed digital content can be based on a specific digital content item. For example, the number of times that the user has accessed digital content can indicate the number of times the user accessed a specific movie rental, confidential file, etc.

In some embodiments, usage monitoring module 1002 can determine whether digital content is being misused based on detected patterns in usage data. For example, patterns such as a user accessing a similar or same sequence of digital content at same or similar times can indicate that a user is misusing the digital content. For example, a user that accesses the same sequence of movie rentals each Friday and Saturday night may be misusing the digital content item by presenting the digital content item in violation of the license acquired for the digital content (e.g., for commercial gain).

Usage monitoring module 1002 can analyze a usage history to determine whether digital content is being misused according to a schedule. For example, usage monitoring module 1002 can analyze the usage history for a user according to set time intervals (e.g., hourly, daily, weekly, etc.). Usage monitoring module 1002 can further analyze the usage history for a user in response to the user accessing and/or requesting to access a digital content item. For example, in response to digital content delivery system 104 receiving a request from client-side digital content delivery device 106 to access digital content, usage monitoring module 1002 can analyze the usage history for a user associated with client-side digital content delivery device 106. If usage monitoring module 1002 determines that the user is misusing digital content, digital content delivery system 104 can deny the request to access digital content. Remedial action module 118 can further execute one or more remedial actions.

Figure 11:
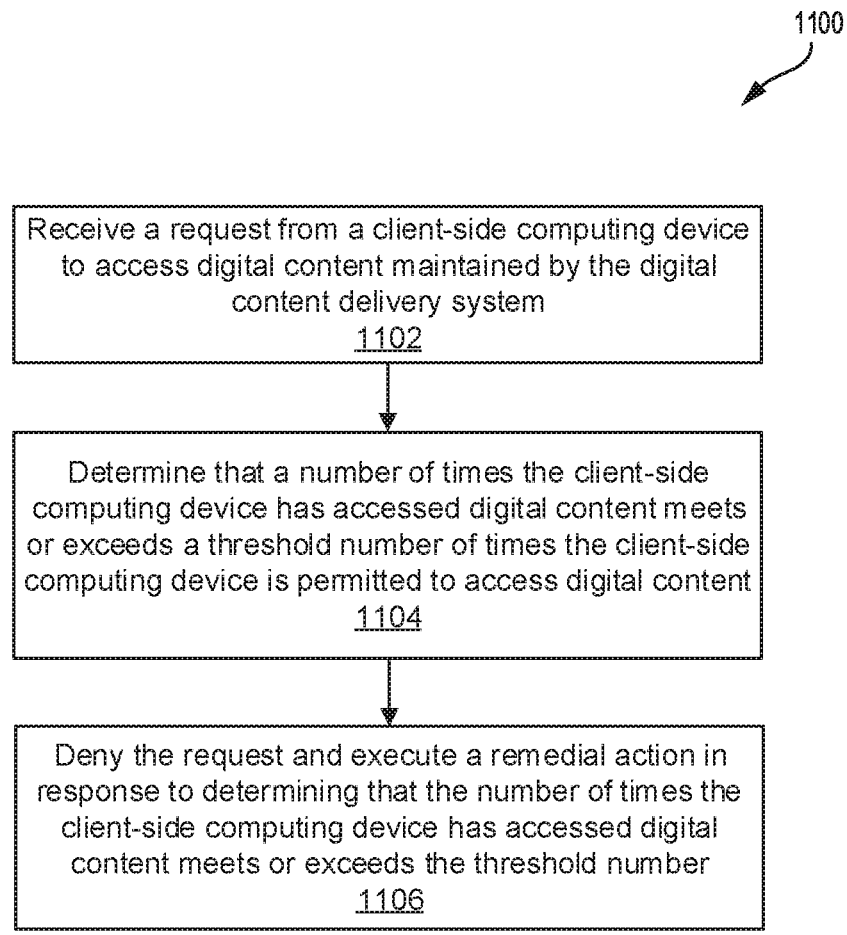
FIG. 11 shows an example method for determining whether digital content is being misused.

FIG. 11 shows an example method 1100 for determining whether digital content is being misused. It should be understood that there can be additional, fewer, or alternative steps performed in similar or alternative orders, or in parallel, within the scope of the various embodiments unless otherwise stated.

At step 1102, the digital content delivery system (e.g., the digital content delivery system 104) receives a request from a client-side computing device (e.g., a client-side content delivery device 106) to access digital content maintained by the digital content delivery system.

At step 1104, the digital content delivery system determines that a number of times the client-side computing device has accessed digital content meets or exceeds a threshold number of times the client-side computing device is permitted to access digital content. The digital content delivery system can determine the number of times the client-side computing device has accessed digital content by reviewing a usage history associated with the client-side computing device. The usage history can include a listing of access requests received from the client-side computing device for digital content.

In some embodiments, the number of times the client-side computing device has accessed digital content can be a number of times the client-side computing device has accessed digital content during a time period. For example, the time period can be a previous hour, day, week, month, etc. As another example, the time period can be a recurring time period, such as Fridays and Saturdays. In this type of embodiment, the digital content delivery system can review the usage history to identify the number of times digital content has been accessed during the time period.

In some embodiments, the number of times the client-side computing device has accessed digital content is a number of times the client-side computing device has accessed a specific digital content item that is being requested in the request received from the client-side computing device. For example, the request received from the client-side computing device can be for a specific digital content item such as a specific movie. In this type of embodiment, the digital content delivery system can review the usage history to identify the number of times the specific digital content item (e.g., movie) has been accessed.

At step 1106, the digital content delivery system denies the request and executes a remedial action in response to determining that the number of times the client-side computing device has accessed digital content meets or exceeds the threshold number. For example, the digital content delivery system can cause the client-side digital content delivery device to be temporarily disabled, suspend performance of digital content, etc.

Figure 12:
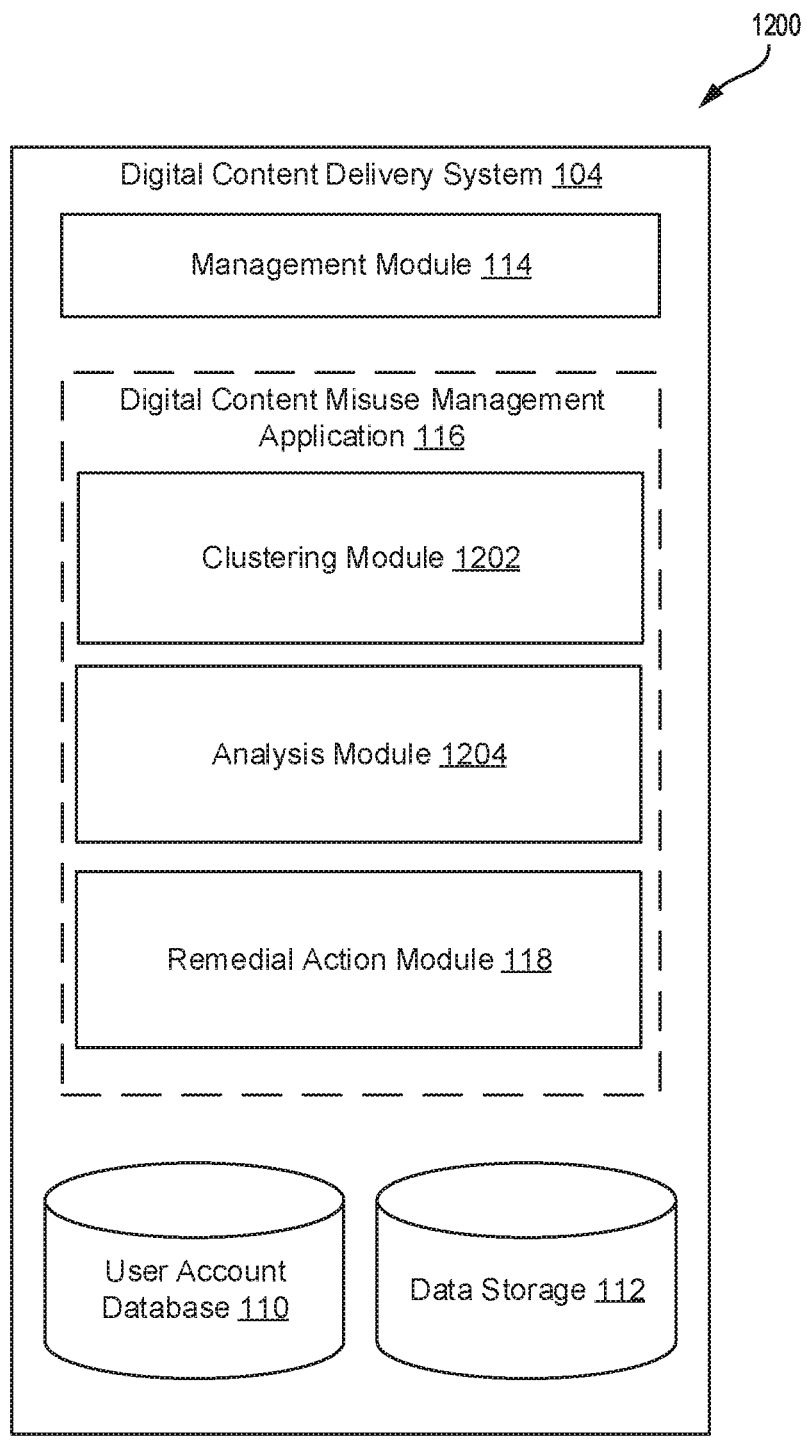
FIG. 12 shows a block diagram of a digital content delivery system configured to cluster usage signal data to determine whether digital content is being misused.

FIG. 12 shows a block diagram 1200 of digital content delivery system 104 configured to cluster usage signal data to determine whether digital content is being misused. To avoid obscuring the inventive subject matter with unnecessary detail, various functional components (e.g., modules) that are not germane to conveying an understanding of the inventive subject matter have been omitted from FIG. 12. However, a skilled artisan will readily recognize that various additional functional components may be supported to facilitate additional functionality that is not specifically described herein. Furthermore, the various functional modules depicted in FIG. 12 may reside on a single computing device or may be distributed across several computing devices in various arrangements such as those used in cloud-based architectures.

In some embodiments, digital content delivery system 104 can analyze usage signal data describing digital content usage for a plurality of user accounts to identify user accounts that are likely to misuse digital content. For example, digital content delivery system 104 can use a clustering algorithm, such as a k-means clustering algorithm, to generate a set of digital content usage clusters based on a set of data points that each correspond to a unique user account and/or client-side digital content delivery device 106. Each data point can be determined based on usage data describing digital content usage by the user account and/or client-side digital content delivery device 106 represented by the data point. Digital content delivery system 104 can analyze the resulting digital content usage clusters to identify data points that are outliers, which may indicate misuse of digital content by the user account represented by the outlier data point.

In some embodiments, digital content delivery system 104 can utilize usage signal data describing digital content usage of known violating user accounts (i.e., user accounts known to have misused digital content) to identify other user accounts that may likely misuse digital content. For example, digital content delivery system 104 can use a clustering algorithm, such as a k-means clustering algorithm, to generate a set of known violator usage clusters based on a set of data points that each correspond to a unique violating user account that is known to have misused digital content. Each data point can be determined based on usage data describing digital content usage by the violating user account. Digital content delivery system 104 can analyze the resulting known violator usage clusters to identify data points that are within a predetermined distance of the center of a known violator usage cluster, which may indicate misuse of digital content by the user account represented by the identified data point.

As shown, digital content misuse management application 116 can include clustering module 1202 and analysis module 1204. Clustering module 1202 can be configured to generate clusters based on usage data signals. Analysis module 1204 can be configured to analyze the resulting clusters to identify user accounts that are potentially misusing digital content.

Clustering module 1202 can gather usage signal data from user account database 110, including data describing users (e.g., address, payment information, gender, a number of known family member residing in a dwelling of the user, etc.), history data (e.g., a digital content accessed by the user, a number of times digital content was accessed, a frequency at which digital content was accessed, times when digital content was accessed, digital content items accessed by the user, etc.), and data received from client-side digital content delivery device 106 (e.g., number of mobile computing devices detected during presentation of digital content, the location of client-side digital content delivery device 106 during presentation of digital content, etc.).

Clustering module 1202 can use the usage signal data to generate a set of data points that represent the user accounts. For example, clustering module 1202 can use usage signal data describing digital content usage associated with a user account to generate a data point representing the user account. Clustering module 1202 can perform this process for multiple user accounts, resulting in the set of data points, in which each data point represents a unique one of the user accounts.

Clustering module 1202 can use a clustering algorithm, such as a k-means algorithm, to generate digital content usage clusters from the set of data points. Although a centroid-based algorithm is used as an example, clustering module 1202 can use any known clustering method to generate the digital content usage clusters. For example, in some embodiments, clustering module 1202 can be configured to use any of a hierarchical-based clustering algorithm, connectivity-based clustering algorithm, distribution-based clustering algorithm, density-based clustering algorithm, etc. Further, other centroid-based clustering algorithms can be used. For example, clustering module 1202 can use any of a fuzzy C-means clustering algorithm, spherical k-means algorithm, Minkowski metric weighted k-means algorithm, etc.

Analysis module 1204 can analyze the resulting digital content usage clusters to identify user accounts that are likely to misuse digital content. The digital content usage clusters can indicate common digital content usage amongst multiple user accounts. For example, the center of each digital content usage cluster can indicate a digital content usage profile for the user accounts represented by the digital content usage cluster. Accordingly, a data point located near the center of a digital content usage cluster can indicate that the digital content usage of the user account represented by the data point is in line with the digital content usage of the other user accounts represented by the digital content usage cluster. Conversely, a data point that is located far from the center of a digital content usage cluster can indicate that the digital content usage of the user account represented by the data point is out of line with the digital content usage of the other user accounts represented by the digital content usage cluster.

Analysis module 1204 can analyze the digital content usage clusters to identify data points that are outliers. An outlier can be a data point that is at least a threshold distance away from the center of a closest digital content usage cluster. As another example, an outlier can be a data point determined to be included in a set of data points that are farthest away from the center of a closest digital content usage cluster. Analysis module 1204 can determine the distance between a data point and the center of a nearest digital content usage cluster to determine if the data point is an outlier.

In response to analysis module 1204 determining that a data point is an outlier, remedial action module 118 can execute a remedial action with respect to the user account represented by the data point. For example, remedial action module 118 can cause a client-side digital content delivery device (e.g., digital content delivery device 106) associated with the user account to suspend performance of digital content.

Some digital content usage clusters may be deemed to provide a poor representation of common digital data usage. Hence, in some embodiments, analysis module 1204 can determine data points that are outliers based on a subset of the digital content usage clusters that are determined to meet a threshold quality level. In this type of embodiment, analysis module 1204 can initially determine a subset of the digital content usage clusters that meet the quality threshold level. Analysis module 1204 can then determine whether a data point is an outlier based on the distance between the data point and the center of a closest digital content usage cluster from the subset of digital content usage clusters determined to meet the threshold quality level.

Whether a digital content usage cluster meets a quality threshold level can be based on one or more factors. For example, the quality threshold level can be based on the number of data points included in the cluster, the density of the cluster, the overall size of the cluster, etc.

In some embodiments, usage signal data from user accounts that are known violators (i.e., are known to have misused digital content) can be used to identify other user accounts that are likely to misuse digital content. For example, clustering module 1202 can generate a set of known violator clusters based on a set of data points that represent user accounts that are known violators. Analysis module 1204 can then analyze the set of known violator clusters to identify data points that are located within a predetermined distance from the center of a closest known violator cluster. This can indicate that the digital content usage of the user account represented by the data point is similar to the digital content usage of known violator accounts, indicating that the user account may also be a violator.

A user account can be determined to be a violator in numerous ways, including any of the methods listed above. As another example, a user account can be determined to be a violator as a result of a user associated with the user account being physically caught misusing digital content. As another example, a user account can be determined to be a violator as a result of an unauthorized copy of digital content being traced back to the user account. For example, the unauthorized copy of digital content can include an embedded watermark that identifies the user account and/or a client-side digital data delivery device associated with the user account.

Figure 13:
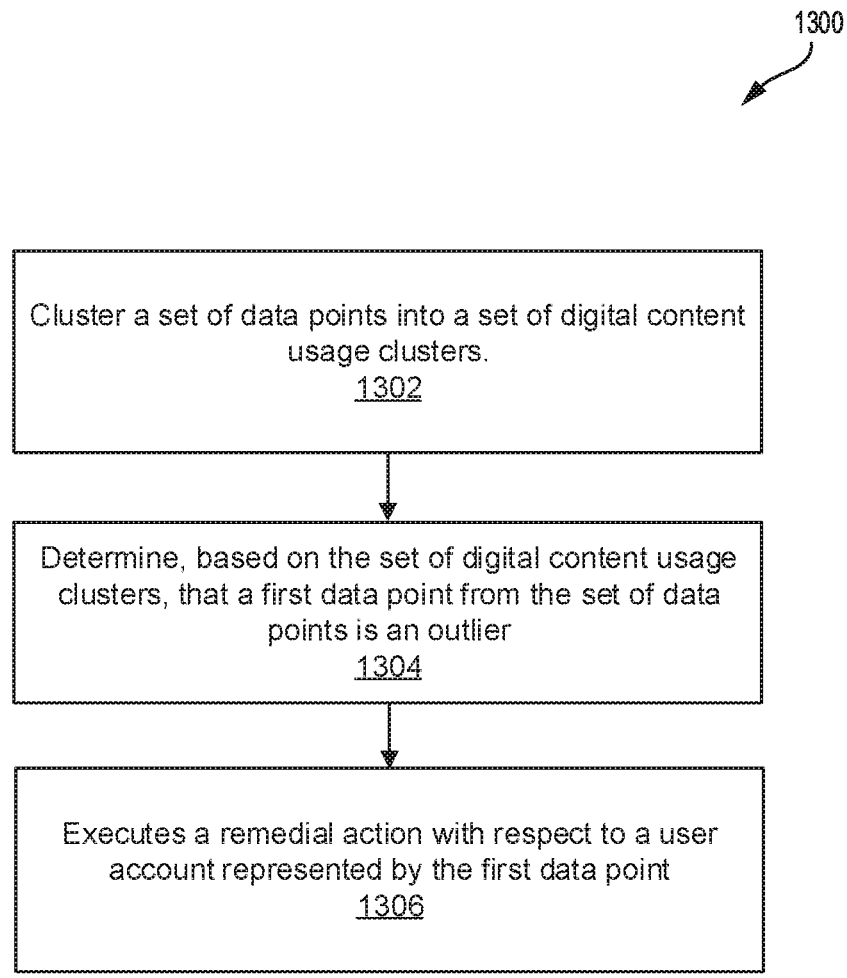
FIG. 13 shows an example method for clustering usage signal data to determine whether digital content is being misused.

FIG. 13 shows an example method 1300 for clustering usage signal data to determine whether digital content is being misused. It should be understood that there can be additional, fewer, or alternative steps performed in similar or alternative orders, or in parallel, within the scope of the various embodiments, unless otherwise stated.

At step 1302, a digital content delivery system (e.g., system 104) clusters a set of data points into a set of digital content usage clusters. Each data point from the set of data points can represent a unique user account from a set of user accounts maintained by the digital content delivery system. Each data point from the set of data points can have been determined based on usage signal data describing digital content usage associated with the unique user account represented by the data point. Usage signal data can include one or more of a number of times digital content was accessed, a frequency at which digital content was accessed, digital content items that were accessed, a geographic location of a client-side computing device associated with the unique user account, a number of known family members residing in a dwelling associated with the unique user account, and a number of mobile computing devices detected during a performance of digital content.

The digital content delivery system can generate the set of digital content usage clusters using at least one clustering algorithm. For example, the digital content delivery system can use at least one k-means clustering algorithm.

At step 1304, the digital content delivery system determines, based on the set of digital content usage clusters, that a first data point from the set of data points is an outlier. The digital content delivery system can determine that the first data point from the set of data points is an outlier by determining that a distance between the first data point and a center of a closest digital content usage cluster exceeds a predetermined threshold distance.

Alternatively, in some embodiments, the digital content delivery system can determine that the first data point from the set of data points is an outlier by initially determining, from the set of digital content usage clusters, a subset of digital content usage clusters that meet a quality threshold level. The digital content delivery system can then determine that a distance between the first data point and a center of a closest digital content usage cluster from the subset of digital content usage clusters exceeds a predetermined threshold distance.

The digital content delivery system can determine the subset of digital content usage clusters that meet the quality threshold level in numerous ways. For example, in some embodiments, the digital content delivery system can determine a density of data points in a first digital content usage cluster, and then compare the density of data points in the first digital content usage cluster to a threshold density level.

At step 1306, the digital content delivery system executes a remedial action with respect to a user account represented by the first data point.

Figure 14:
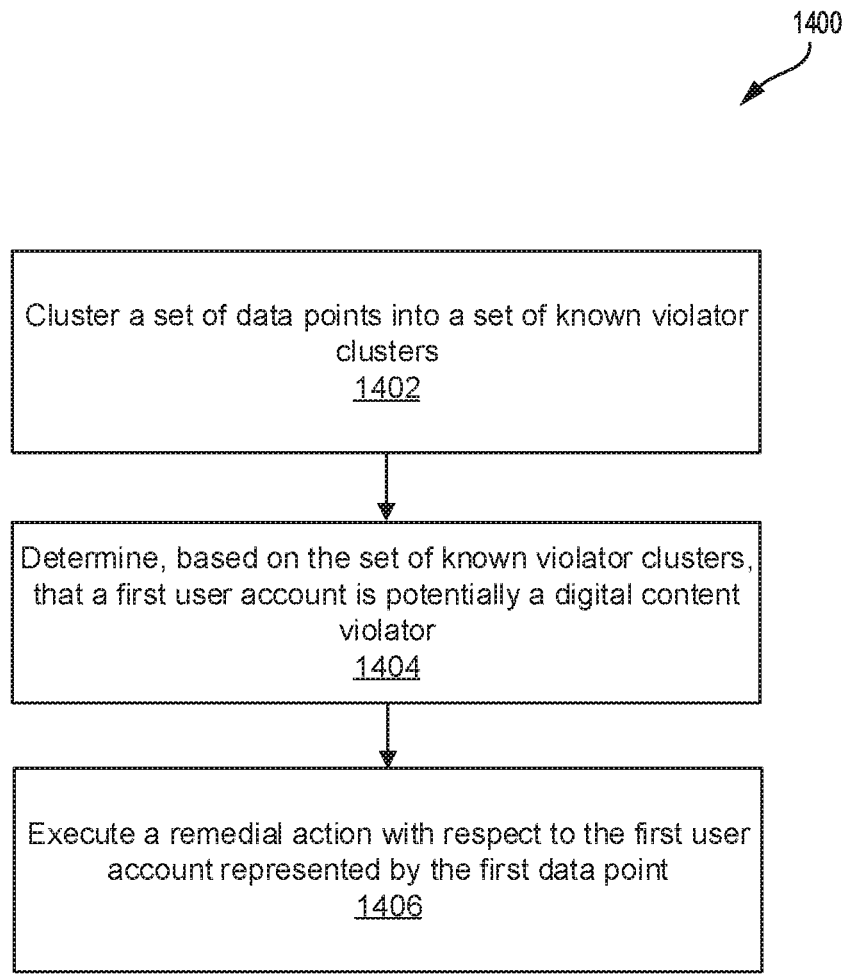
FIG. 14 shows an example method for clustering usage signal data to determine whether digital content is being misused.

FIG. 14 shows an example method 1400 for clustering usage signal data to determine whether digital content is being misused. It should be understood that there can be additional, fewer, or alternative steps performed in similar or alternative orders, or in parallel, within the scope of the various embodiments unless otherwise stated.

At step 1402, a digital content delivery system clusters a set of data points into a set of known violator clusters. Each data point from the set of data points can represent a unique violating user account from a set of violating user accounts that are known digital content violators. Further, each data point from the first set of data points can have been determined based on usage signal data describing digital content usage by the unique violating user account represented by the data point. The usage signal data can include one or more of a number of times digital content was accessed, a frequency at which digital content was accessed, digital content items that were accessed, a geographic location of a client-side computing device associated with the unique user account, a number of known family members residing in a dwelling associated with the unique user account, and a number of mobile computing devices detected during performance of digital content.

The digital content delivery system can generate the set of known violator clusters using at least one clustering algorithm. For example, the digital content delivery system can use at least one k-means clustering algorithm.

At step 1404, the digital content delivery system determines, based on the set of known violator clusters, that a first user account is potentially a digital content violator. The first user account can be represented by a first data point that is not included in the first set of data points. Further, the first data point can have been determined based on usage signal data describing digital content usage association with the first user account.

In some embodiments, the digital content delivery system can determine that the first user account is potentially a digital content violator by determining that a distance between the first data point and a center of a closest known violator cluster is less than a threshold distance. Alternatively, in some embodiments, the digital content delivery system can determine that the first user account is potentially a digital content violator by initially determining, from the set of known violator clusters, a subset of known violator clusters that meet a quality threshold level. The digital content delivery system can then determine that a distance between the first data point and a center of a closest known violator cluster from the subset of known violator clusters is less than a predetermined threshold distance.

At step 1406, the digital content delivery system executes a remedial action with respect to the first user account represented by the first data point.

Figure 15:
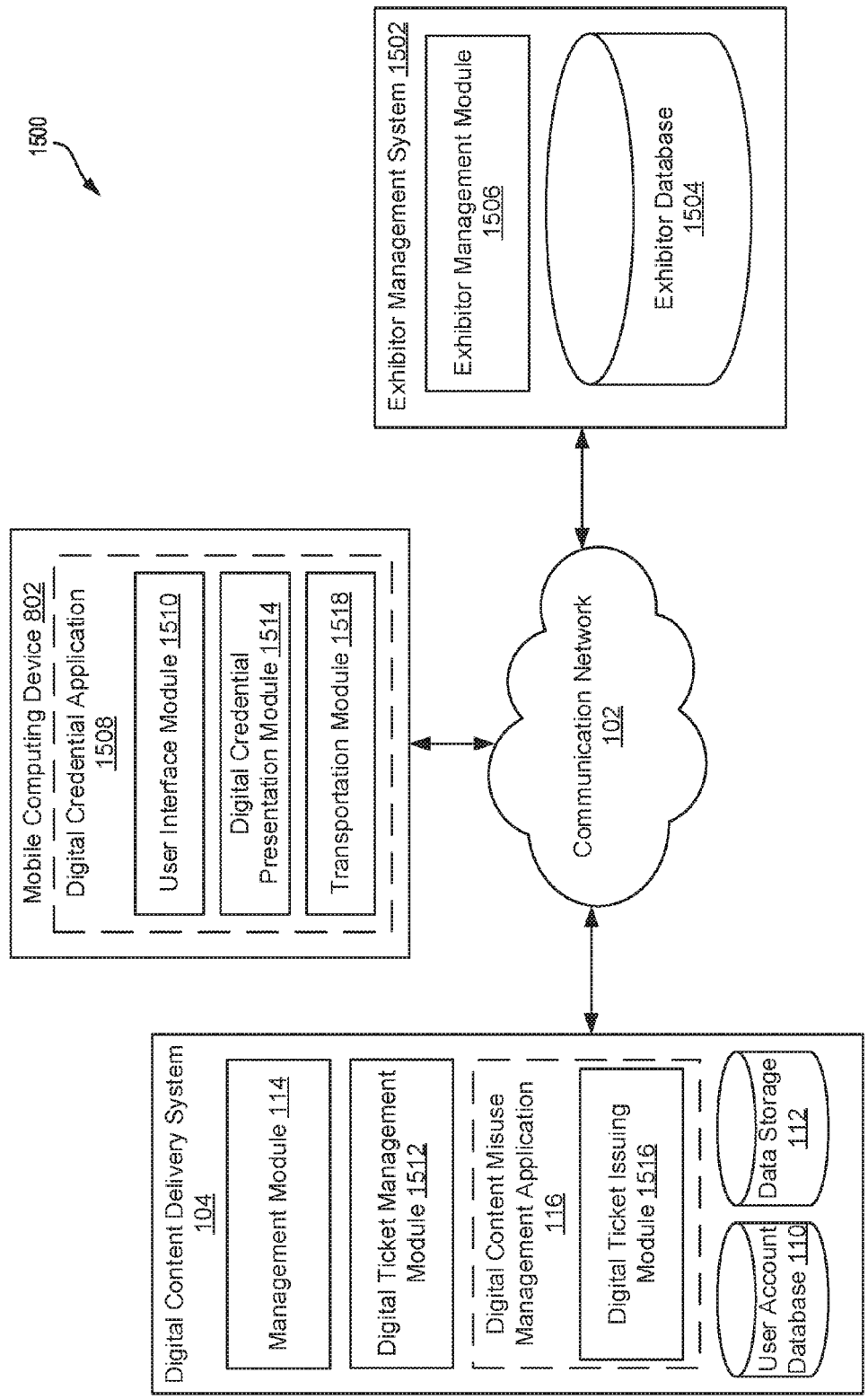
FIG. 15 shows an example system configured to issue digital credentials.

FIG. 15 shows an example system 1500 configured to issue digital credentials (e.g., digital tickets). To avoid obscuring the inventive subject matter with unnecessary detail, various functional components (e.g., modules) that are not germane to conveying an understanding of the inventive subject matter have been omitted from FIG. 15. However, a skilled artisan will readily recognize that various additional functional components may be supported to facilitate additional functionality that is not specifically described herein. Furthermore, the various functional modules depicted in FIG. 15 may reside on a single computing device or may be distributed across several computing devices in various arrangements such as those used in cloud-based architectures.

In some embodiments, digital content delivery system 104 can issue digital credentials that are redeemable by a user. For example, a digital credential can be redeemed to provide a user with access to an exhibitor location, such as a movie theatre, to view a scheduled presentation of a digital content item (e.g., a movie). Digital content delivery system 104 can utilize one or more security measures to prevent misuse of digital credentials, such as digital credentials being issued to an incorrect user and/or the digital credential being utilized in violation of a licensing agreement (e.g., the digital credential being redeemed by an incorrect user and/or the digital credential being resold).

To prevent misuse of a digital credential, digital content delivery system 104 can provide the user with the digital credential after determining a current location of a user is within a predetermined geographic distance of a selected exhibitor location and/or a remaining amount of time until the selected scheduled presentation begins is less than the threshold amount of time. Hence, a user can be required to be physically nearby the exhibitor location (e.g., within 100 feet of the movie theater) and/or wait until shortly before the scheduled presentation (e.g., 15 minutes before the scheduled start time of the movie) to access their digital credential.

In some embodiments, a digital content license acquired by a user can allow the user to access the digital content item using client-side digital content delivery device 106 and/or attend a scheduled presentation of the digital content item at an exhibitor location. As an example, a user that purchases a movie rental that can be streamed to the user's client-side digital content delivery device 106 can also be allotted two tickets (i.e., digital credentials) to view the movie at a movie theatre until the movie is no longer available. A user can therefore choose to view the movie rental at home and/or view the movie at a movie theater.

In addition to issuing a user with a digital credential to a scheduled presentation of a digital content item, in some embodiments, digital content delivery system 104 can enable the user to reserve, schedule, and/or purchase one or more amenities associated with the scheduled presentation. For example, digital content delivery system 104 can enable the user to reserve specific seats for the scheduled presentation of the digital content item, pre-order food and/or beverages, schedule transportation to and/or from the exhibitor location, etc.

In FIG. 15, digital content delivery system 104, mobile computing device 802, and exhibitor management system 1502 can communicate with each other via communication network 102 to reserve and issue digital credentials that can be redeemed by a user to access a scheduled presentation of a digital content item at an exhibitor location.

Exhibitor management system 1502 can be a computing system comprising one or more computing devices associated with an exhibitor. An exhibitor can be an organization, business, etc., that provides scheduled presentations of digital content at one or more exhibitor locations. For example, an exhibitor can be a movie theatre chain that provides scheduled showings of movies at one or more movie theaters.

Exhibitor management system 1502 can include exhibitor database 1504 that maintains exhibitor data describing scheduled presentations of digital content items provided by the exhibitor. Exhibitor data can include data identifying the exhibitor locations associated with the exhibitor (e.g., movie theatres), the digital content items scheduled for presentation at each exhibitor location (e.g., movies) and/or scheduled presentations at each exhibitor location (e.g., scheduled show times). Exhibitor data can also include data identifying digital credential availability for each scheduled presentation (e.g., number of unsold digital credentials available for purchase), seating charts for each exhibitor location, seating availability (e.g., unreserved seats), amenities provided by each exhibitor location, the address of each exhibitor location, etc. Exhibitor data can also include content associated with the exhibitor, exhibitor locations, and/or digital content items. For example, exhibitor data can include content such as written movie description, movie trailers, movie reviews, movie theatre reviews, etc.

Exhibitor management system 1502 can include exhibitor management module 1506 configured to reserve digital credentials and amenities for scheduled presentations of digital content items. Exhibitor management module 1506 can communicate with exhibitor database 1504 to gather requested exhibitor data, provide requested exhibitor data to requesting computing devices and/or update exhibitor data to reflect a reservation of a digital credential and/or amenity. For example, exhibitor management module 1506 can process read requests for exhibitor data such as show times for a specified movie, theatres within a predetermined geographic area that are presenting a specified movie, digital credential and/or seating availability for one or more scheduled presentations, available amenities at an exhibitor location, movie trailers, movie reviews, etc. In response to receiving a read request for exhibitor data, exhibitor management module 1506 can gather the requested exhibitor data from exhibitor database 1504 and return the requested exhibitor data in response to the read request.

Exhibitor management module 1506 can also process reservation requests. A reservation request can be a request to reserve digital credentials and/or amenities for a scheduled presentation of a digital content item. In response to receiving a reservation request, exhibitor management module 1506 can initially confirm whether the reservation request can be fulfilled. For example, exhibitor management module 1506 can determine whether there are a sufficient number of available digital credentials to fulfill the reservation request. As another example, exhibitor management module 1506 can determine whether selected seats are available to be reserved. If exhibitor management module 1506 determines that the reservation request can be fulfilled, exhibitor management module 1506 can update exhibitor database 1504 to fulfill the request. For example, exhibitor management module 1506 can update exhibitor database 1504 to indicate that requested digital credentials have been reserved, update the number of reserved digital credentials for the scheduled presentation, update a seating chart to reflect that specific seats have been reserved, etc.

Exhibitor management module 1506 can also generate and provide reservation data reflecting that a requested reservation has been completed. Reservation data can include data indicating that the reservation request has been completed as well as data that can be used to redeem or confirm the reservation at an exhibitor location. For example, reservation data can include a unique code associated with reserved digital credentials, reserved seats, reserved amenities, etc., that can be used by an exhibitor to confirm the reservation. Reservation data can also include data describing the reservation, such as reserved seats, selected exhibitor location, selected scheduled presentation, reserved amenities (e.g., purchased food items), purchasing user, etc. In some embodiments, the reservation data can be provided to a user for use at the exhibitor. The reservation data can also be provided directly to the exhibitor location.

In system 1500, a user can utilize mobile computing device 802 to reserve a digital credential for a scheduled presentation of a digital content item, as well as reserve amenities. As shown, mobile computing device 802 can include digital credential application 1508. Digital credential application 1508 can enable a user to communicate with digital content delivery system 104 to request exhibitor data as well as to reserve digital credentials and/or amenities. Digital credential application 1508 can include user interface module 1510 configured to present a user with an exhibitor interface including user interface elements (e.g., buttons, text fields, etc.) that a user can use to request and select data. For example, the exhibitor interface can provide a user with a listing of scheduled presentations for a digital content item and allow the user to reserve digital credentials to one or more of the listed scheduled presentations. As another example, the exhibitor interface can provide a user with a listing of unreserved seats for a scheduled presentation and allow the user to reserve one or more of the unreserved seats. As another example, the exhibitor interface can enable the user to enter and/or select one or more exhibitor data parameters (e.g., desired movie, desired theatre, desired day/time) and then provide the user with exhibitor data based on the exhibitor data parameters entered and/or selected by the user.

Digital credential application 1508 can communicate with digital content delivery system 104 to perform one or more actions requested by the user, such as requests to read exhibitor data, requests to reserve digital credentials and/or amenities, etc. For example, digital credential application 1508 can transmit requests to digital content delivery system 104 to perform specified actions, such as requests to read exhibitor data, requests to reserve digital credentials and/or amenities, etc. Digital credential application 1508 can include data in the requests that can be used by digital content delivery system 104 to complete the request. For example, the request can include one or more exhibitor data parameters selected by the user.

Digital content delivery system 104 can include digital credential management module 1512 configured to receive and respond to requests from mobile computing device 802. For example, digital content delivery system 104 can receive a request from mobile computing device 802 for specified exhibitor data and, in response, transmit a read request to exhibitor management system 1502 for the specified exhibitor data. Digital content delivery system 104 can provide the returned exhibitor data to mobile computing device 802, where it can be presented to a user in a exhibitor interface.

As another example, digital credential management module 1512 can receive a request from mobile computing device 802 to reserve a digital credential to a scheduled presentation and/or reserve one or more amenities. In response, digital credential management module 1512 can transmit a reservation request to exhibitor management system 1502 to reserve the digital credential and/or amenities.

Digital credential management module 1512 can receive reservation data from exhibitor management system 1502 confirming that the requested reservation has been completed. In response, digital credential management module 1512 can update the requesting user's account in user account database 110 to reflect that the user's requested reservation has been completed and that the requested digital credential and/or amenities are assigned to the requesting user's account. For example, digital credential management module 1512 can update the requesting user's account with metadata describing the digital credentials assigned to the user's accounts, such as metadata describing a selected exhibitor location, selected scheduled presentation, selected seats, purchased amenities, etc. Digital credential management module 1512 can also store any unique codes received from exhibitor management system 1502 that can be used by a user to redeem the digital credentials assigned to the user's account and/or any reserved amenities.

In some embodiments, digital credential management module 1512 can provide a user with exhibitor data and/or reserve a digital credential for the user based on a digital content license assigned to the user's account. For example, a digital content license can allow the user to access the digital content item using client-side digital content delivery device 106 and/or attend a scheduled presentation of the digital content item at an exhibitor location. In this type of scenario, a user that purchases a movie rental that can be streamed to the user's client-side digital content delivery device 106 can also be allotted two digital credentials to view the movie at a movie theatre. A user can therefore choose to view the movie rental at home and/or view the movie at a movie theater.

A digital content license purchased by a user may be associated with a particular exhibitor. For example, the exhibitor can be an exhibitor that operates within a geographic region where the user resides. As another example, the exhibitor can be an exhibitor selected by the user as the user's preferred exhibitor. In some instances, the exhibitor may receive a portion of the revenue associated with the user's purchase of the digital content license to access the digital content item.

In this type of scenario, digital credential management module 1512 can present the user with exhibitor data and/or reserve a digital credential based on the digital content license purchased by the user and assigned to the user's account. This can include enabling the user to reserve a digital credential for a scheduled presentation of the digital content item associated with the digital content license and/or a scheduled presentation offered at an exhibitor location associated with the digital content license. For example, digital credential management module 1512 can access the user's account in user account database 110 to identify a digital content license assigned to the user's account. Based on the digital content license, digital credential management module 1512 can determine a digital content item that the user has purchased a license to access, and an exhibitor associated with the digital content item. Digital credential management module 1512 can use the determined digital content item and exhibitor to transmit a read request to exhibitor management system 1502 for exhibitor data describing scheduled performances of the digital content item at exhibitor locations associated with the exhibitor. The returned exhibitor data can identify exhibitor locations and scheduled performances that the user is licensed to attend according to the digital content item assigned to the user's account. For example, the user can select to reserve digital credentials to any one of the scheduled performances.

In some situations, an exhibitor may manage a large number of exhibitor locations, and thus providing the user with exhibitor data for all exhibitor locations may be excessive and/or unnecessary. In this type of situation, digital credential management module 1512 can provide the user with a subset of exhibitor data based on the location of the user in relation to exhibitor locations managed by the exhibitor. For example, digital credential management module 1512 can select a subset of exhibitor locations that are within a predetermined geographic distance of a known dwelling of the user or, alternatively, a determined current location of the user. Digital credential management module 1512 can then provide the user with exhibitor data for the subset of exhibitor locations.

Once a digital credential has been reserved and assigned to a user's account, the user can use mobile computing device 802 to retrieve the digital credential. For example, the user can use the exhibitor interface to request that digital credentials assigned to the user's account be transmitted to mobile computing device 802. Digital credential application 1508 can include digital credential presentation module 1514 configured to receive a digital credential from digital content delivery system 104 and render a visual representation of the digital credential. Once rendered, the digital credential can be redeemed by a user to grant the user access to a selected scheduled presentation of the digital content item.

Digital content delivery system 104 can utilize one or more security measures to prevent misuse of digital credentials, such as digital credentials being issued to an incorrect user and/or the digital credential being utilized in violation of the terms of a digital license (e.g., the digital credential being redeemed by an incorrect user and/or the digital credential being resold).

Digital content misuse management application 116 can include digital credential issuing module 1516 configured to prevent misuse of digital credentials. Digital credential issuing module 1516 can restrict a user's access to digital credentials assigned to the user's account until one or more conditions are satisfied. One such condition can be based on the location of the user in relation to an exhibitor location. For example, digital credential issuing module 1516 can require that the user be located within a predetermined geographic distance of the exhibitor location at which the digital credential can be redeemed. Hence a user cannot access the digital credential until the user is nearby the exhibitor location.

In response to receiving a request from mobile computing device 802 for a digital credential to be transmitted to mobile computing device 802, digital credential issuing module 1516 can determine whether a current location of mobile computing device 802 is within a predetermined geographic distance of the exhibitor location where the digital credential can be redeemed. Digital credential issuing module 1516 can access the user's account to gather metadata describing the geographic location of the exhibitor location. Digital credential issuing module 1516 can receive the current location of mobile computing device 802 from mobile computing device 802 (e.g., as part of the request received from mobile computing device 802 or in response to a separate request). Digital credential issuing module 1516 can use the current location of mobile computing device 802 and the geographic location of the exhibitor location to determine whether the current location of mobile computing device 802 is within the predetermined geographic distance of the exhibitor location.

Another condition can be based on the current time in relation to a start time of the scheduled presentation. For example, digital credential issuing module 1516 can require that a remaining amount of time until a start time of the scheduled presentation be less than a threshold amount of time. Hence a user cannot access the digital credential until a short time before the start of the scheduled presentation. Digital credential issuing module 1516 can access the user's account to gather metadata describing the scheduled start time of the scheduled presentation and determine whether a remaining amount of time until the scheduled start time (e.g., a time duration between the current time and the scheduled start time) is less than the threshold amount of time.

Another condition can be based on the requesting mobile computing device. For example, digital credential issuing module 1516 can restrict access to the digital credential to one or more mobile computing devices authorized with the user's account. In some embodiments, device identifiers for the authorized mobile computing device(s) can be stored in the user's account. Digital credential issuing module 1516 can request a device identifier from a mobile computing device 802 requesting digital credentials and then access the user's account to determine whether the device identifier received from mobile computing device 802 is included in the list of authorized device identifiers.

Digital credential issuing module 1516 can deny a request to issue a digital credential if one or more of the described conditions are not satisfied. For example, in some embodiments, digital credential issuing module 1516 can require that all conditions be satisfied for the request to be approved (e.g., the user be located nearby the theatre, the movie to start shortly and the requesting mobile computing device be authorized on the user's account). Alternatively, in some embodiments, digital credential issuing module 1516 can require that at least one or two of the conditions be satisfied for the request to be approved.

If digital credential issuing module 1516 determines that a sufficient number of conditions have been satisfied, digital credential issuing module 1516 can transmit the digital credential to mobile computing device 802. This can include gathering and providing reservation data associated with the digital credential to mobile computing device 802. For example, digital credential issuing module 1516 can access the user's account to access the reservation data associated with the digital credential.

Once the reservation data is received by mobile computing device 802, digital credential presentation module 1514 can use the reservation data to render a graphical representation of the digital credential, such as scannable code (e.g., Quick Response (QR) code, bar code, etc.). The scannable code can be embedded with reservation data that can be used to confirm the user's reservation. For example, the scannable code can be embedded with the unique code associated with the reservation of the digital credentials, the number of digital credentials purchased, reserved seats, purchaser name, etc. The scannable code can be scanned at an exhibitor location using a scanning device capable of reading the scannable code to retrieve the reservation data embedded in the scannable code.

In addition to restricting access to digital credentials until one or more conditions are satisfied, digital credential issuing module 1516 can further implement one or more security features into the visual rendering of the digital credential to prevent misuse. For example, digital credential issuing module 1516 can include image data in the digital credential that, when rendered by mobile computing device 802, causes an image of the user associated with the user account to be presented along with the digital credential. An employee at an exhibitor location can therefore visually verify that the user attempting to redeem the digital credential is the user associated with the user account.

As another example, digital credential issuing module 1516 can include video data in the digital credential that, when rendered by mobile computing device 802, causes a video and/or animation to be presented along with the digital credential. This can prevent users from creating counterfeit copies of the digital credential by taking a picture and/or screen grab of the rendered digital credential.

While digital credential issuing module 1516 is described as implementing one or more security measures to prevent misuse of digital credentials, this is only one example and is not meant to be limiting. In some embodiments, mobile computing device 802 can also be configured to implement security measures. For example, mobile computing device 802 can implement security measures instead of or in addition to digital credential issuing module 1516. For example, digital credential presentation module 1514 can determine whether one or more conditions are met prior to granting a user access to a digital credential (e.g., rendering a visual representation of the digital credential that can be redeemed by the user). Digital credential presentation module 1514 can also implement one or more security features into the digital credential to prevent misuse. For example, digital credential presentation module 1514 can render an image of the user along with the digital credential to allow an employee of an exhibitor location to visually verify that the user attempting to redeem the digital credential is the user associated with the user account. As another example, digital credential presentation module 1514 can render a video and/or animation along with the digital credential to prevent counterfeits of the digital credential to be captured by taking a picture or capturing a screen grab of the rendered digital credential (i.e., the picture or screengrab would include a still image rather than the video and/or animation).

Digital credential application 1508 can also include transportation module 1518, which can coordinate transportation for a user to and/or from a digital venue. For example, transportation module 1518 can communicate with remote servers of one or more taxi and/or drive share services to schedule transportation for a user to and from a digital venue. Transportation module 1518 can schedule transportation for a user based on digital credentials reserved by the user. For example, transportation module 1518 can determine a scheduled start and/or end time of a scheduled presentation. Transportation module 1518 can schedule arrival of a car or taxi based on the scheduled start and/or end time of the scheduled presentation.

Figure 16:
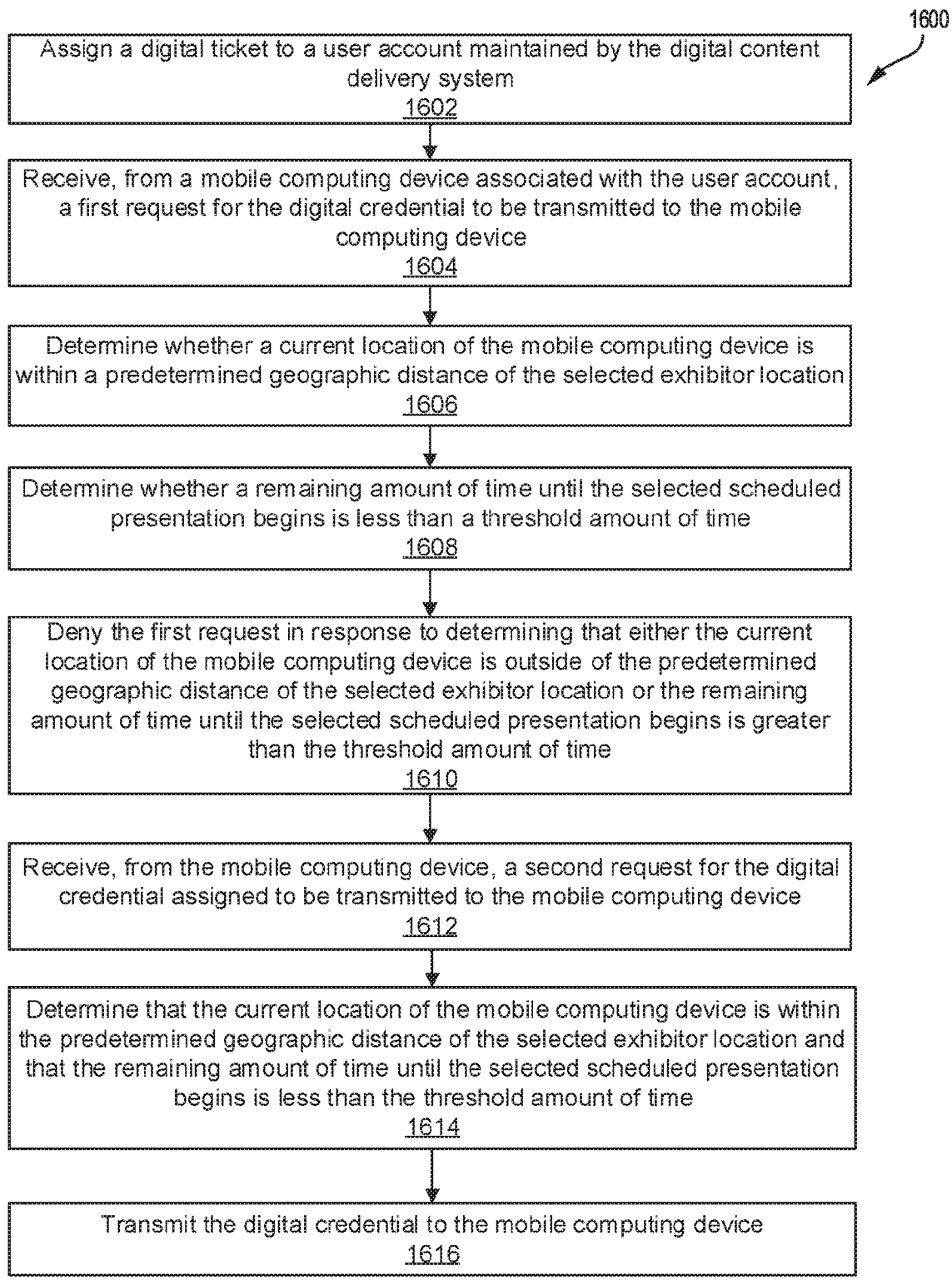
FIG. 16 shows an example method for issuing digital credentials.

FIG. 16 shows an example method 1600 for issuing digital credentials. It should be understood that there can be additional, fewer, or alternative steps performed in similar or alternative orders, or in parallel, within the scope of the various embodiments unless otherwise stated.

At step 1602, a digital content delivery system (e.g., the system 104) assigns a digital credential to a user account maintained by the digital content delivery system. For example, the digital content delivery system can update a user account with reservation data associated with the digital credential. The digital credential can be redeemable at a selected exhibitor location to view a selected scheduled presentation of a digital content item. For example, the digital credential can be redeemed at a selected theatre to view a scheduled movie.

A license to access the digital content item may have been previously assigned to the user account. For example, the user may have previously purchased a license to rent the digital content item and view the digital content item using a client-side digital content delivery device. The purchased license can also provide the user with the right to view a scheduled presentation of the digital content item at an exhibitor location. For example, the purchased license can allow a user to attend a screening of the movie at a selected movie theatre.

At step 1604, the digital content delivery system receives, from a mobile computing device associated with the user account, a first request for the digital credential to be transmitted to the mobile computing device.

At step 1606, the digital content delivery system determines whether a current location of the mobile computing device is within a predetermined geographic distance of the selected exhibitor location. In some embodiments, the first request received from the mobile computing device can include location data describing the current location of the mobile computing device. The digital content delivery system can use the received location information to determine whether the current location of the mobile computing device is within a predetermined geographic distance of the selected exhibitor location.

At step 1608, the digital content delivery system determines whether a remaining amount of time until a scheduled start time of the selected scheduled presentation is less than a threshold amount of time. For example, the digital content delivery system can determine a current time and the scheduled start time of the selected scheduled presentation. The digital content delivery system can determine whether an amount of time between the current time and the scheduled start time is less than a threshold amount of time.

At step 1610, the digital content delivery system denies the first request in response to determining that either the current location of the mobile computing device is outside of the predetermined geographic distance of the selected exhibitor location or the remaining amount of time until the scheduled start time of the selected scheduled presentation is greater than the threshold amount of time. As a result of the first request being denied, the mobile computing device will not receive the digital credential in response to the first request.

At step 1612, the digital content delivery system receives, from the mobile computing device, a second request for the digital credential assigned to be transmitted to the mobile computing device. The second request can be received after the first request was denied. The second request can also include location data indicating the current location of the mobile computing device.

At step 1614, the digital content delivery system determines that the current location of the mobile computing device is within the predetermined geographic distance of the selected exhibitor location and that the remaining amount of time until the scheduled start time of the selected scheduled presentation is less than the threshold amount of time.

At step 1616, the digital content delivery system transmits the digital credential to the mobile computing device. After receiving the digital credential, the mobile computing device can render a visual representation of the digital credential on a display of the mobile computing device, which can be redeemed to provide a user access to the selected scheduled presentation.

Figure 17:
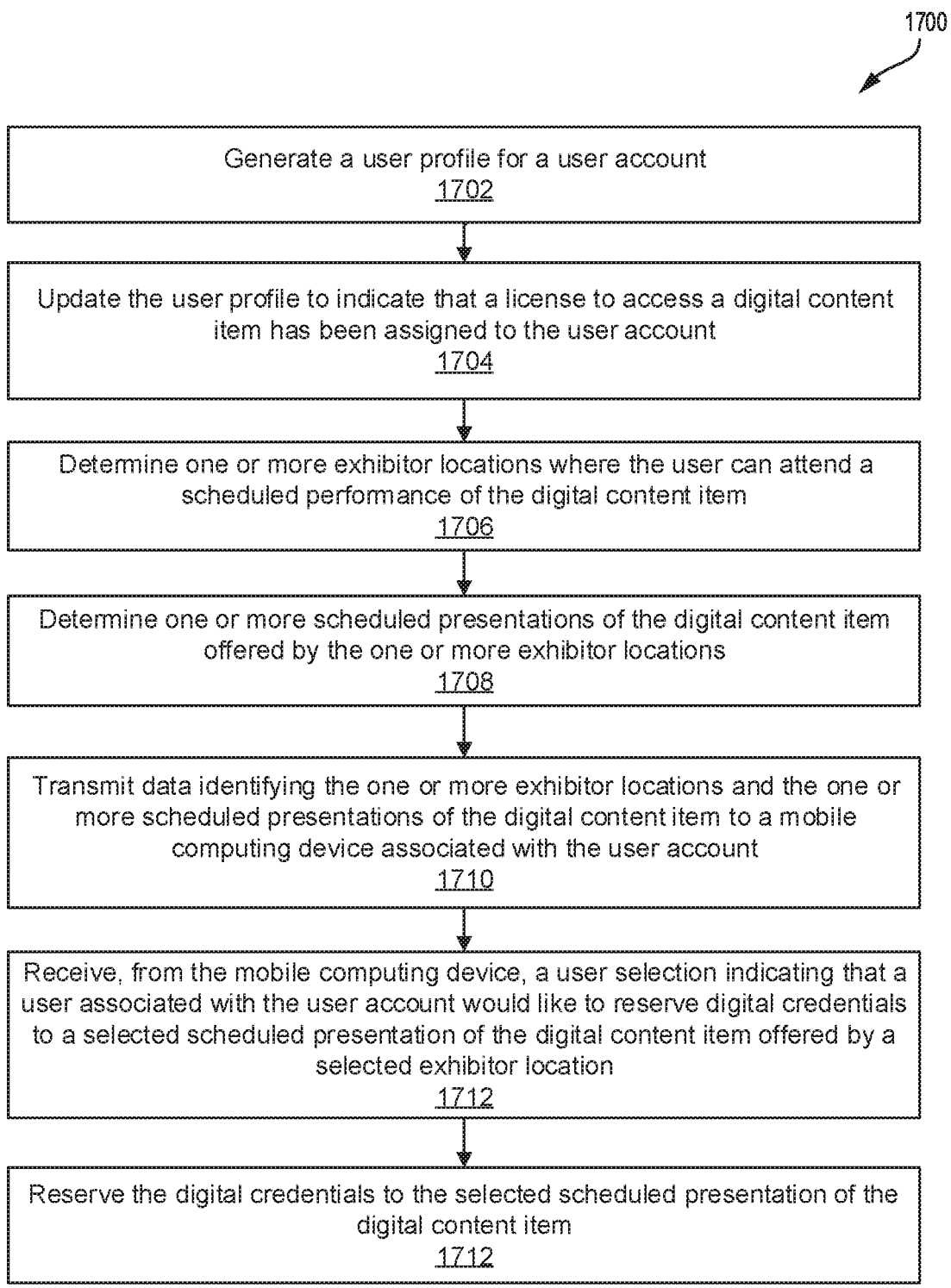
FIG. 17 shows an example method for reserving digital credentials to a scheduled presentation of a digital content item.

FIG. 17 shows an example method 1700 for reserving digital credentials to a scheduled presentation of a digital content item. It should be understood that there can be additional, fewer, or alternative steps performed in similar or alternative orders, or in parallel, within the scope of the various embodiments unless otherwise stated.

At step 1702, a digital content delivery system (e.g., the system 104) generates a user profile for a user account. The generated user profile can be stored in a user account database maintained by the digital content delivery system.

At step 1704, the digital content delivery system updates the user profile to indicate that a license to access a digital content item has been assigned to the user account. For example, the license can be a license to access and present a movie through a client-side digital content delivery device (e.g., the device 106) associated with the user account. The license can further enable a user to attend a scheduled performance of the digital content item.

At block 1706, the digital content delivery system determines one or more exhibitor locations where the user can attend a scheduled performance of the digital content item. The digital content delivery system can determine an exhibitor associated with the license assigned to the user account. For example, the exhibitor can be associated with the purchase of the license and, in some embodiments, received a portion of revenue from the purchase for the license to access the digital content item. Once the digital content delivery system determines the exhibitor associated with the license, the digital content delivery system can determine exhibitor locations associated with the exhibitor. This can include identifying all exhibitor locations associated with the exhibitor or a subset of the exhibitor locations. For example, the digital content delivery system can determine exhibitor locations that are located within a predetermined geographic distance of a dwelling associated with the user account.

At block 1708, the digital content delivery system determines one or more scheduled presentations of the digital content item offered by the one or more exhibitor locations. For example, the digital content delivery system can determine show times at which the digital content (e.g., movie) is playing at various movie theatres.

At block 1710, the digital content delivery system transmits data identifying the one or more exhibitor locations and the one or more scheduled presentations of the digital content item to a mobile computing device associated with the user account. The mobile computing device can render a visual representation of the data and enable a user to browse through the available scheduled presentations as well as select to reserve digital credentials to a scheduled presentation.

At block 1712, the digital content delivery system receives, from the mobile computing device, a user selection indicating that a user associated with the user account would like to reserve digital credentials to a selected scheduled presentation of the digital content item offered by a selected exhibitor location.

At block 1714, the digital content delivery system reserves the digital credentials to the selected scheduled presentation of the digital content item. For example, the digital content delivery system can transmit a reservation request to an exhibitor management system to reserve the digital credentials. The digital content delivery system can additionally update the user's account to assign the reserved digital credentials to the users account. This can include updating the user's account with any reservation data received from the exhibitor management system.

Figure 18A:
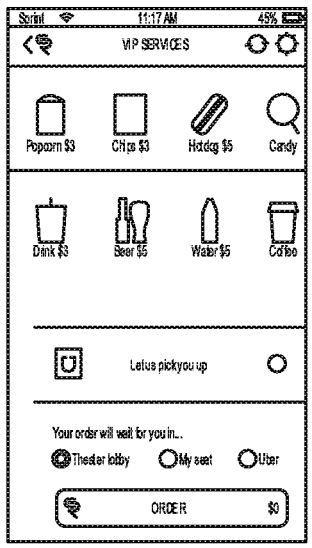
FIGS. 18A-18L show example screenshots of an exhibitor interface.

FIGS. 18A-18L show example screenshots of an exhibitor interface. As shown in FIG. 18A, the exhibitor interface can enable a user to reserve one or more amenities. For example, the user can use the exhibitor interface to select from and purchase food and/or beverages, as well as select a pickup location for the purchased food and/or beverages. The exhibitor interface can also user can also allow a user to schedule transportation to and/or from a scheduled presentation of a digital content item.

Figure 18B:
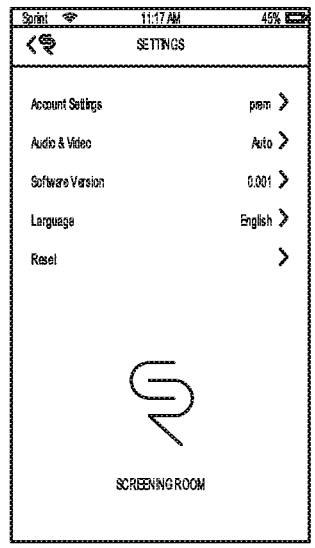

As shown in FIG. 18B, the exhibitor interface can allow a user to view and/or adjust configurations or settings. For example, the exhibitor interface can allow the user to view and/or adjust account settings, audio and video settings, software version and language settings. The exhibitor interface can also allow the user to reset the settings to their default settings.

Figure 18C:
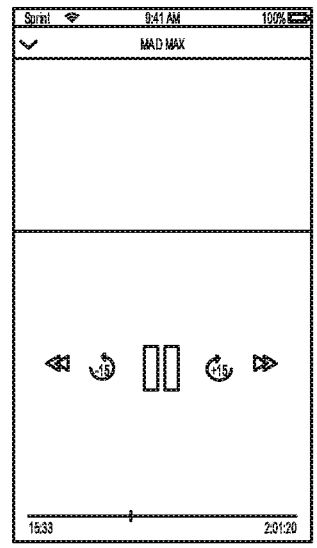

As shown in FIG. 18C, the exhibitor interface can present a user with video. For example, the exhibitor interface can allow the user to view movie trailers, reviews, etc. The exhibitor interface can also allow the user to control presentation of the video, such as fast forward, rewind, pause, play, etc.

Figure 18D:
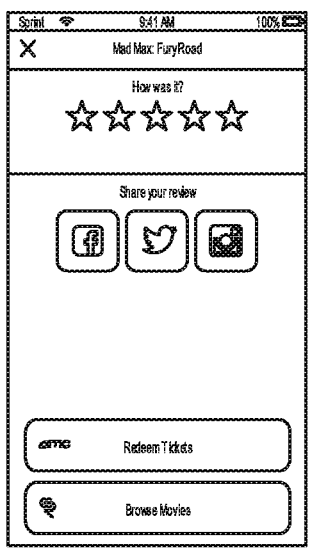

As shown in FIG. 18D, the exhibitor interface can enable the user to perform one or more functions. For example, the exhibitor interface can enable the user to review a digital content item, share the review via one or more social networking services, redeem digital credentials and/or browse movies.

Figure 18E:
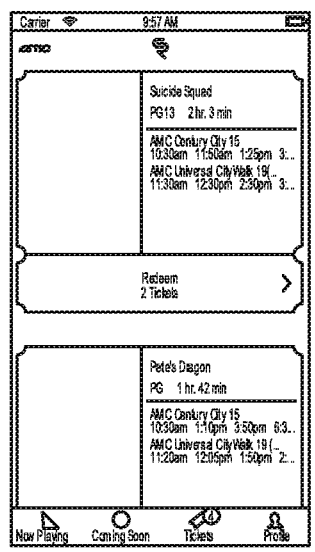

As shown in FIG. 18E, the exhibitor interface can provide the user with data identifying scheduled presentations of digital content items. For example, the exhibitor interface can provide the user with movie title descriptions, available locations and/or times. The exhibitor interface can also enable a user to select to reserve digital credentials to a selected movie.

Figure 18F:
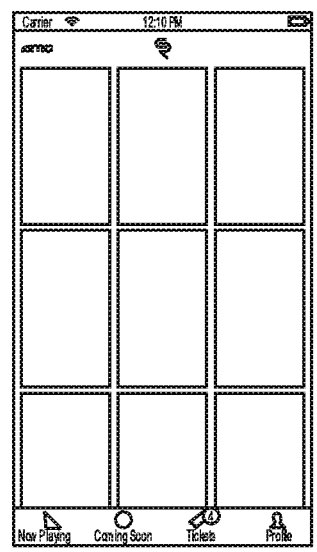

As shown in FIG. 18F, the exhibitor interface can present the user with multiple data tiles that include data and that can be selectable by a user. For example, each data tile can include data associated with a movie, such as images associated with the movie, description text, etc. Further, each data tile can be selectable to enable the user to access additional data.

Figure 18G:
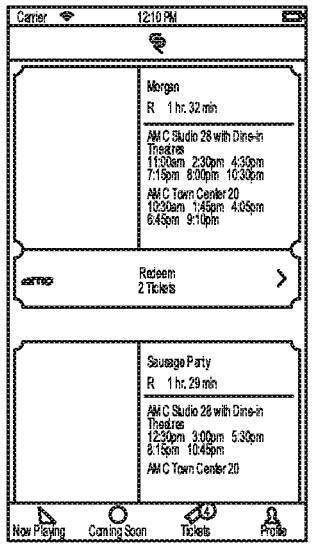

As shown in FIG. 18G, the exhibitor interface can provide the user with data identifying scheduled presentations of digital content items. For example, the exhibitor interface can provide the user with movie title descriptions, available locations and/or times. The exhibitor interface can also enable a user to select to reserve digital credentials to a selected movie.

Figure 18H:
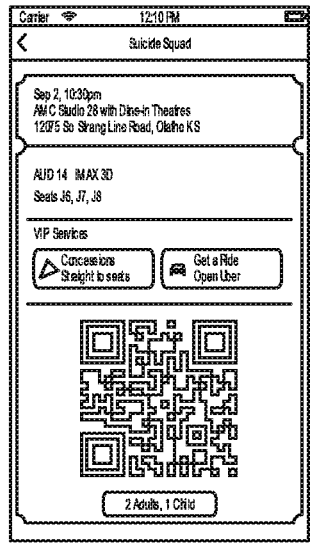

As shown in FIG. 18H, the exhibitor interface can present a visual rendering of a digital credential, such as a QR code. The visual rendering of the digital credential can allow a user to redeem the digital credential at an exhibitor location.

Figure 18I:
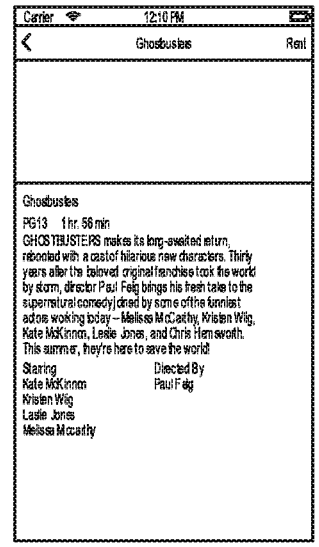

As shown in FIG. 18I, the exhibitor interface can provide a user with a detailed written description of a movie. This can include a plot synopsis as well as a listing of key actors/actresses in the movie and the director.

Figure 18J:
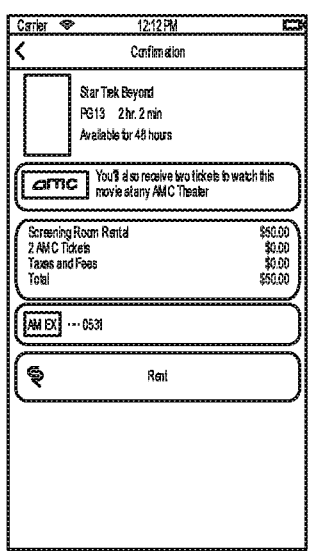

As shown in FIG. 18J the exhibitor interface can enable a user to purchase digital credentials and/or a digital content license. As show, the exhibitor interface can enable the user to enter payment method data, such as credit card information. The exhibitor interface can also provide the user with the total cost for the requested purchase.

Figure 18K:
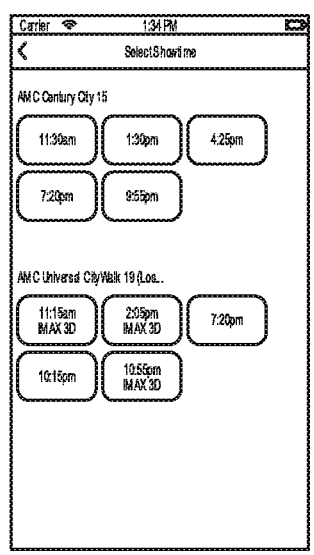

As shown in FIG. 18K, the exhibitor interface can present the user with data tiles representing scheduled presentations of a digital content item. Each data tile can include data describing its respective scheduled presentation, such as the scheduled start time of the scheduled presentation. Further, the data tiles can be interactive such that a user can select a data tile to receive addition information regarding the corresponding scheduled presentation and/or to reserve digital credentials for the scheduled presentation.

Figure 18L:
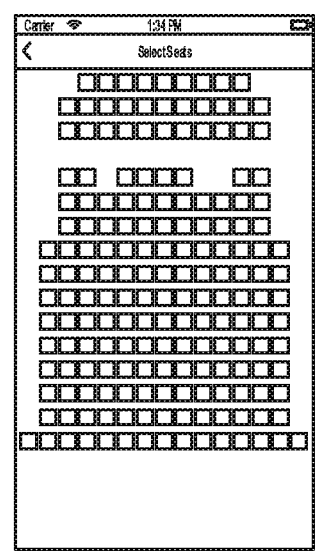

As shown in FIG. 18L, the exhibitor interface can present the user with a seating map identifying the seats at an exhibitor location. The seating map can indicate which seats are reserved and which seats remain available. The seating map can be interactive to allow a user to reserve seats.

Software Architecture

Figure 19:
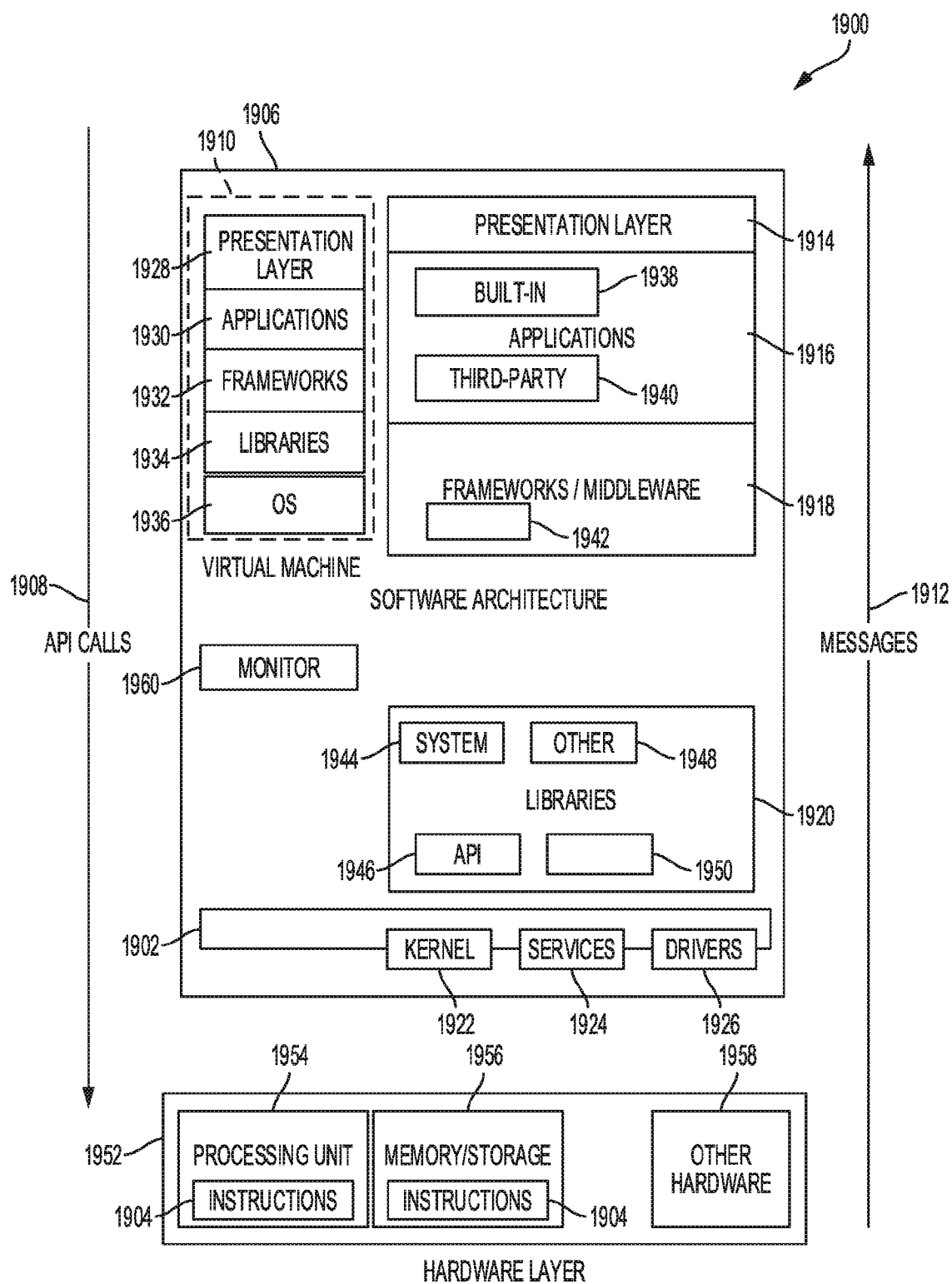
FIG. 19 is a block diagram illustrating a representative software architecture, which may be used in conjunction with various hardware architectures herein described.

FIG. 19 is a block diagram illustrating an example software architecture 1906, which may be used in conjunction with various hardware architectures herein described. FIG. 19 is a non-limiting example of a software architecture and it will be appreciated that many other architectures may be implemented to facilitate the functionality described herein. Software architecture 1906 may execute on hardware such as machine 2000 of FIG. 20 that includes, among other things, processors 2004, memory 2014, and input/output (I/O) components 2018. A representative hardware layer 1952 is illustrated and can represent, for example, machine 2000 of FIG. 20. Representative hardware layer 1952 includes processing unit 1954 having associated executable instructions 1904. Executable instructions 1904 represent the executable instructions of software architecture 1906, including implementation of the methods, modules and so forth described herein. Hardware layer 1952 also includes memory and/or storage modules memory/storage 1956, which also have executable instructions 1904. Hardware layer 1952 may also comprise other hardware 1958.

In the example architecture of FIG. 19, software architecture 1906 may be conceptualized as a stack of layers where each layer provides particular functionality. For example, software architecture 1906 may include layers such as operating system 1902, libraries 1920, applications 1916 and a presentation layer 1914. Operationally, applications 1916 and/or other components within the layers may invoke application programming interface (API) API calls 1908 through the software stack and receive a response as in response to API calls 1908. The layers illustrated are representative in nature and not all software architectures have all layers. For example, some mobile or special purpose operating systems may not provide frameworks/middleware 1918, while others may provide such a layer. Other software architectures may include additional or different layers.

Operating system 1902 may manage hardware resources and provide common services. Operating system 1902 may include, for example, kernel 1922, services 1924, and drivers 1926. Kernel 1922 may act as an abstraction layer between the hardware and the other software layers. For example, kernel 1922 may be responsible for memory management, processor management (e.g., scheduling), component management, networking, security settings, and so on. Services 1924 may provide other common services for the other software layers. Drivers 1926 may be responsible for controlling or interfacing with the underlying hardware. For instance, drivers 1926 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

Libraries 1920 may provide a common infrastructure that may be used by applications 1916 and/or other components and/or layers. Libraries 1920 typically provide functionality that allows other software modules to perform tasks in an easier fashion than to interface directly with the underlying operating system 1902 functionality (e.g., kernel 1922, services 1924 and/or drivers 1926). Libraries 1920 may include system libraries 1944 (e.g., C standard library) that may provide functions such as memory allocation functions, string manipulation functions, mathematic functions, and the like. In addition, libraries 1920 may include API libraries API 1946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic movie on a display), database libraries (e.g., SQLite that may provide various relational database functions), web libraries (e.g., WebKit that may provide web browsing functionality), and the like. Libraries 1920 may also include a wide variety of other libraries 1950 to provide many other APIs to applications 1916 and other software components/modules.

The frameworks frameworks/middleware 1918 (also sometimes referred to as middleware) provide a higher-level common infrastructure that may be used by applications 1916 and/or other software components/modules. For example, frameworks/middleware 1918 may provide various graphic user interface (GUI) functions, high-level resource management, high-level location services, and so forth. Frameworks/middleware 1918 may provide a broad spectrum of other APIs that may be utilized by applications 1916 and/or other software components/modules, some of which may be specific to a particular operating system or platform.

Applications 1916 include built-in applications 1938 and/or third-party applications 1940. Examples of representative built-in applications 1938 may include, but are not limited to, a contacts application, a browser application, a book reader application, a location application, a media application, a messaging application, and/or a game application. Third-party applications 1940 may include any application developed using the Android™ or iOS™ software development kit (SDK) by an entity other than the vendor of the particular platform, and may be mobile software running on a mobile operating system such as iOS™, Android™, Windows® Phone, or other mobile operating systems. Third-party applications 1940 may invoke the API calls 1908 provided by the mobile operating system such as operating system 1902 to facilitate functionality described herein.

Applications 1916 may use built-in operating system functions (e.g., kernel 1922, services 1924 and/or drivers 1926), libraries 1920, frameworks/middleware 1918 to create user interfaces to interact with users of the system. Alternatively, or additionally, in some systems interactions with a user may occur through a presentation layer, such as presentation layer 1914. In these systems, the application/module "logic" can be separated from the aspects of the application/module that interact with a user.

Some software architectures use virtual machines. In the example of FIG. 19, this is illustrated by virtual machine 1910. Virtual machine 1910 creates a software environment where applications/modules can execute as if they were executing on a hardware machine (such as the machine 2000 of FIG. 20, for example). Virtual machine 1910 is hosted by a host operating system (operating system (OS) 1936 in FIG. 19) and typically, although not always, has a virtual machine monitor 1960, which manages the operation of virtual machine 1910 as well as the interface with the host operating system (i.e., operating system 1902). A software architecture executes within the virtual machine 1910 such as operating system (OS) 1936, libraries 1934, frameworks 1932, applications 1930 and/or presentation layer 1928. These layers of software architecture executing within the virtual machine 1910 can be the same as corresponding layers previously described or may be different.

Figure 20:
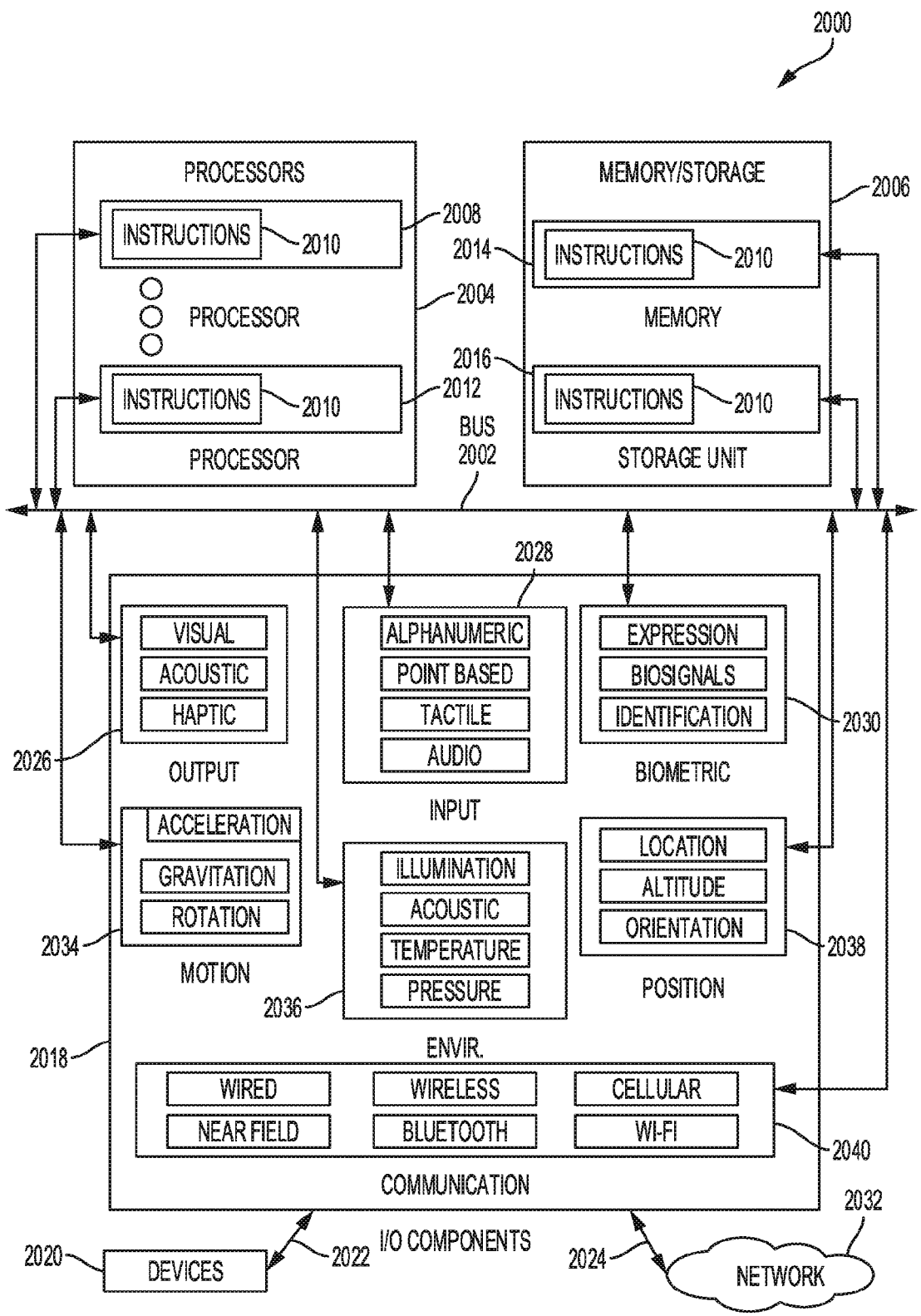
FIG. 20 is a block diagram illustrating components of a machine, according to some example embodiments, able to read instructions from a machine-readable medium (e.g., a machine-readable storage medium) and perform any one or more of the methodologies discussed herein.

FIG. 20 is a block diagram illustrating components of machine 2000, according to some example embodiments, able to read instructions from a machine-readable medium (e.g., a machine-readable storage medium) and perform any one or more of the methodologies discussed herein. Specifically, FIG. 20 shows a diagrammatic representation of machine 2000 in the example form of a computer system, within which instructions 2010 (e.g., software, a program, an application, an applet, an app, or other executable code) for causing machine 2000 to perform any one or more of the methodologies discussed herein may be executed. As such, the instructions 2010 may be used to implement modules or components described herein. The instructions 2010 transform the general, non-programmed machine into a particular machine programmed to carry out the described and illustrated functions in the manner described. In alternative embodiments, machine 2000 operates as a standalone device or may be coupled (e.g., networked) to other machines. In a networked deployment, machine 2000 may operate in the capacity of a server machine or a client machine in a server-client network environment, or as a peer machine in a peer-to-peer (or distributed) network environment. Machine 2000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile computing device, a wearable device (e.g., a smart watch), a smart home device (e.g., a smart appliance), other smart devices, a web appliance, a network router, a network switch, a network bridge, or any machine capable of executing instructions 2010, sequentially or otherwise, that specify actions to be taken by machine 2000. Further, while only a single machine 2000 is illustrated, the term "machine" shall also be taken to include a collection of machines that individually or jointly execute instructions 2010 to perform any one or more of the methodologies discussed herein.

Machine 2000 may include processors 2004, memory/storage 2006, and input/output (I/O) components 2018, which may be configured to communicate with each other such as via bus 2002. Memory/storage 2006 may include memory 2014, such as a main memory, or other memory storage, and storage unit 2016, both accessible to processors 2004 such as via bus 2002. Storage unit 2016 and memory 2014 store instructions 2010 embodying any one or more of the methodologies or functions described herein. Instructions 2010 may also reside, completely or partially, within memory 2014, within storage unit 2016, within at least one of processors 2004 (e.g., within the processor's cache memory), or any suitable combination thereof, during execution thereof by the machine 2000. Accordingly, memory 2014, storage unit 2016, and memory of processors 2004 are examples of machine-readable media.

The input/output (I/O) components 2018 may include a wide variety of components to receive input, provide output, produce output, transmit information, exchange information, capture measurements, and so on. The specific input/output (I/O) components 2018 that are included in a particular machine will depend on the type of machine. For example, portable machines such as mobile phones will likely include a touch input device or other such input mechanisms, while a headless server machine will likely not include such a touch input device. It will be appreciated that input/output (I/O) components 2018 may include many other components that are not shown in FIG. 20. Input/output (I/O) components 2018 are grouped according to functionality merely for simplifying the following discussion and the grouping is in no way limiting. In various example embodiments, input/output (I/O) components 2018 may include output components 2026 and input components 2028. Output components 2026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 2028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, input/output (I/O) components 2018 may include biometric components 2030, motion components 2034, environmental components 2036, or position components 2038 among a wide array of other components. For example, biometric components 2030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Motion components 2034 may include acceleration sensor components (e.g., accelerometer), gravitation sensor components, rotation sensor components (e.g., gyroscope), and so forth. Environmental components 2036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. Position components 2038 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. Input/output (I/O) components 2018 may include communication components 2040 operable to couple the machine 2000 to network 2032 or devices 2020 via coupling 2022 and coupling 2024, respectively. For example, communication components 2040 may include a network interface component or other suitable device to interface with network 2032. In further examples, communication components 2040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. Devices 2020 may be another machine or any of a wide variety of peripheral devices (e.g., a peripheral device coupled via a Universal Serial Bus (USB)).

Moreover, communication components 2040 may detect identifiers or include components operable to detect identifiers. For example, the communication components 2040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2040, such as location via Internet Protocol (IP) geo-location, location via Wi-Fi® signal triangulation, location via detecting a NFC beacon signal that may indicate a particular location, and so forth.

In some embodiments, a method to control access to a movie within a movie distribution ecosystem may include storing subscriber information for a subscriber within a subscriber database of a content distribution system; in the subscriber database, associating the subscriber with a content accessing system; receiving, via a communications network and at the content distribution system, a purchase request from the subscriber to purchase a credential to view the movie; and/or responsive to receipt of the purchase request, issuing the credential to view the movie at one of a movie theater or using the content accessing system issued to the subscriber.

In some embodiments, the issuing of the credential may include updating the subscriber information stored within the subscriber database.

In some embodiments, receiving of the purchase request from the subscriber may include presenting the subscriber with a group of movie theaters within a predetermined geographical proximity to the subscriber, and receiving selection of the movie theater from the subscriber from among the group of movie theaters.

In some embodiments, receiving the purchase request from the subscriber may include presenting the subscriber with a list of movies that are viewable at a group of movie theaters within a predetermined geographical proximity of the subscriber, and receiving a purchase selection of the movie from the list of movies from the subscriber.

In some embodiments, the issuing may include issuing at least two credentials to view the movie to the subscriber, responsive to receipt of the purchase request.

In some embodiments, the credential is redeemable at either the movie theater or via the content accessing system in order to view the movie.

In some embodiments, the issuing the credential may include attributing at least a portion of revenue from the purchase of the credential to the movie theater.

In some embodiments, the content accessing system may include a set top box.

In some embodiments, a method to control access to a content item within a content distribution network may include storing subscriber information for a subscriber within a subscriber database of a content distribution system; in the subscriber database, associating the subscriber with a content accessing system; receiving, via a communications network and at the content distribution system, an access request from the subscriber for access the content item via the content accessing system; and/or responsive to receipt of the access request, issuing access rights to access the content item at one of a first venue or a second venue.

In some embodiments, the first venue may be associated the content accessing system issued to the subscriber and the second venue.

In some embodiments, the first venue may be associated with a content exhibitor.

In some embodiments, the issuing of the access rights may include updating the subscriber information stored within the subscriber database.

In some embodiments, receiving of the access request from the subscriber may include presenting the subscriber with a venues within a predetermined geographical proximity to the subscriber, and receiving selection of the second venue from the subscriber from among the venues.

In some embodiments, the issuing the access rights may include attributing at least a portion of revenue attributable to the access rights to the content exhibitor.

In some embodiments, the access rights are exercisable at either the content exhibitor or via the content accessing system in order to access the content item.

In some embodiments, the content accessing system may include a set top box. In some embodiments, a method to control access to a movie may include receiving input to initiate playback of the movie within a venue; using content accessing system, initiating a scan to locate wireless devices within a predetermined proximity of the content accessing system; determining that a threshold number of wireless devices are present within the predetermined proximity of the content accessing system; and/or responsive to the determination, initiating a verification operation to detect violations of access rights with respect to the movie.

In some embodiments, initiating of the scan to locate the wireless devices may include scanning to identify at least one of Bluetooth or Wi-Fi devices within the predetermined proximity of the content accessing system.

In some embodiments, initiating the scan to locate the wireless devices may include determining whether a mobile device of a subscriber associated with the content accessing system is within the predetermined proximity of the content accessing system.

In some embodiments, initiating the verification operation may include using a content distribution system, determining a social media identifier for a subscriber associated with the content accessing system, retrieving social media data from a social media data system using the social media identify; and automatically analyzing the social media data to detect violations of the access rights with respect to the movie.

In some embodiments, initiating the verification operation may include monitoring a group of content systems outside of a content distribution network to identify an out-of-network watermark digitized version of the movie.

In some embodiments, the playback may include streaming the movie from a remote content storage system to the content accessing system.

In some embodiments, the initiating of the playback may include downloading the movie from a remote content storage system.

In some embodiments, such a method may further include detecting that a violation of the access rights with respect to the movie has occurred and, responsive to the detecting, restricting the playback of the movie within the venue.

In some embodiments, a method to control access to a movie within a venue may include receiving an access request to access to the movie, available via a content distribution system, within the venue; using content accessing system and responsive to the access request to access the movie, initiating a scan to locate wireless devices within a predetermined proximity of the content accessing system; determining that a mobile device of a subscriber associated with the content accessing system is not present within the predetermined proximity of the content accessing system; determining whether a predetermined number of access requests for movies available via the content distribution system have been received at the content accessing system without the mobile device of the subscriber; and/or responsive to the determination, initiating a verification operation to detect violations of access rights with respect to the movie.

In some embodiments, may be present within the predetermined proximity of the content accessing system.

In some embodiments, the predetermined number of access requests may include a predetermined number of purchase requests for credentials for the movies.

In some embodiments, such a method may further include detecting that a violation of the access rights with respect to the movie has occurred and, responsive to the detecting, restricting access to the movie within the venue.

In some embodiments, initiating the verification operation may include using the content distribution system, determining a social media identifier for the subscriber associated with the content accessing system, retrieving social media data from a social media data system using the social media identify; and automatically analyzing the social media data to detect violations of the access rights with respect to the movie.

In some embodiments, the access may include streaming the movie from a remote content storage system to the content accessing system.

In some embodiments, the access may include downloading the movie from a remote content storage system.

In some embodiments, initiating of the scan to locate the wireless devices may include scanning to identify at least one of Bluetooth or Wi-Fi devices within the predetermined proximity of the content accessing system.

In some embodiments, a method to control distribution of a digitized version of a movie may include receiving an access request at a content distribution system from a content accessing system associated with a subscriber to a movie subscription service operated by the content distribution system, the content distribution system and the content accessing system forming part of a content distribution network, and the access request; using the subscriber identifier, accessing a subscriber database, to determine that the subscriber is authorized to access the movie; responsive to the determination that the subscriber is authorized to access the movie, applying a persistent forensic watermark to the digitized version of the movie to generate a watermarked digitized version of the movie; and/or distributing the watermarked digitized version of the movie from the content distribution system to the content accessing system.

In some embodiments, the receiving an access request at a content distribution system from a content accessing system associated with a subscriber to a movie subscription service operated by the content distribution system, the content distribution system and the content accessing system forming part of a content distribution network, and the access request may include a subscriber identifier of the subscriber and requesting access to the movie.

In some embodiments, the persistent forensic watermark further may be uniquely associated with the subscriber identifier.

In some embodiments, the access request may include a device identifier associated with the content accessing system.

In some embodiments, such a method may further include monitoring a group of content systems outside of the content distribution network to identify an out-of-network watermark digitized version of the movie.

In some embodiments, such a method may further include responsive to identifying the out-of-network watermark digitized version of the movie, disabling and quarantining the content accessing system.

In some embodiments, such a method may further include responsive to identifying the out-of-network watermark digitized version of the movie, automatically distributing corrupted digitized versions of the movie via the content distribution network.

In some embodiments, the content distribution network may include a peer-to-peer distribution system, and automatically distributing corrupted digitized versions of the movie is performed using the peer-to-peer distribution system.

The current application discloses number of technologies that may be used, in example embodiments, to address and mitigate access and distribution challenges that are currently facing the movie distribution industry. These technologies, embedded in a network-based movie delivery system, monitor behavioral indicators on users and restrict or shutdown movie viewing when certain behaviors are detected.

Figure 21:
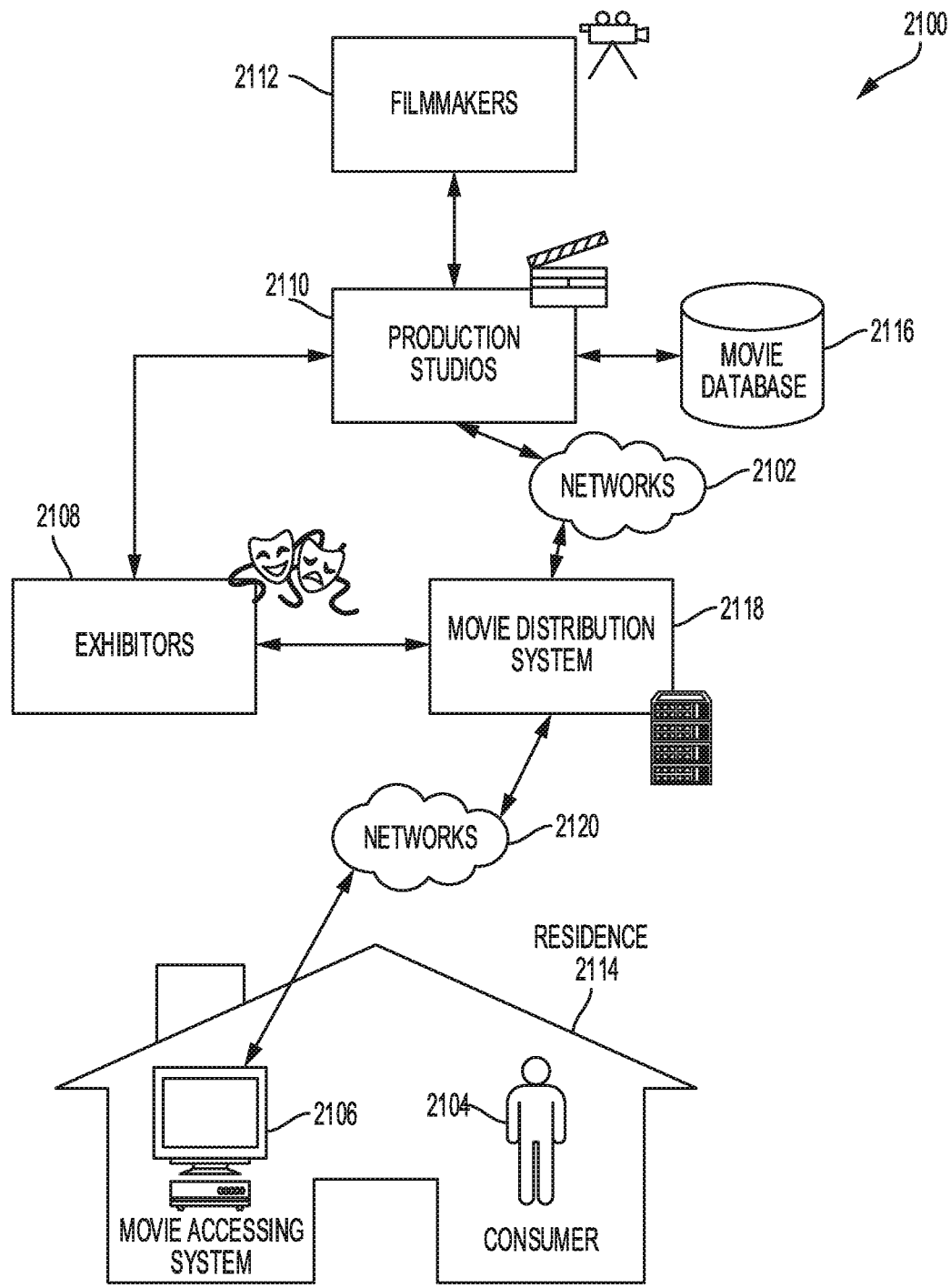
FIG. 21 is a diagrammatic representation of a content distribution network within which various example embodiments may be implemented.

Various example embodiments will be discussed with the context of a content distribution network 2100 illustrated in. Within the context of content distribution network 2100, filmmakers 2112 collaborate with FIG. 21 production studios 2110 to create movies (or films). Increasingly, movies are being created in a purely digital form, and may be stored in a movie database 2116.

The production studios 2110 turn work with movie distributors, each of which may operate a movie distribution system 2118 in order to distribute movies via a number of channels for release in cinemas or directly to consumers (e.g., via DVD or video on demand (VOD)). To this end, a movie distribution system 2118 may access and distribute digital movies from the movie database 2116 via multiple networks 2102 (e.g., terrestrial or satellite networks, including the Internet). A movie distribution system 2118 may deliver movies to an exhibitor 2108 (e.g., a particular movie theater), either on film, hard disk drives, or electronically via a network (e.g., via a secure satellite connection).

The movie distribution system 2118, according to some in some embodiments, may also be connected via one or multiple movie accessing systems 2106 (e.g., a set top box) so as to enable distribution of digital movies directly to a residence 2114 (or other location) of a consumer 2104.

The movie distribution system 2118 interacts with a network of exhibitors so as to make the first-run movies, currently available in theaters operated exhibitors 2108 to be simultaneously made available to the consumer 2104 via the movie accessing system 2106. Specifically, in one example embodiment, the accessing system enables the consumer 2104, via the 2106, to purchase access rights, in the example from that credential that is redeemable to view a particular movie either at theaters operated by the exhibitors 2108 or within the residence 2114 via the movie accessing system 2106.

It will be appreciated that there are a large number of technical challenges to ensuring that the out-of-theater access to first-run movies (which are currently still primarily available in theater) is not abused or misused. For example, a particular consumer 2104 may be tempted to invite a large number of people into his or her residence 2114 to view particular movie. Similarly, the consumer 2104 may also be tempted to relocate the movie accessing system 2106 to a public venue for a screening of particular movie. Where the consumer 2104 has only paid for limited access rights, these actions would cause constitute a misuse, and a loss of revenue for the exhibitors 2108.

Where the consumer 2104 is technically skilled, there is also the risk that the consumer 2104 may be tempted to replicate a movie to which he or she has access to via the movie accessing system 2106. Such replication could be achieved, for example, by using a camera to capture playback of a movie on the movie accessing system 2106. A more sophisticated consumer 2104 may attempt to inject a video capture device into a playback chain to capture a high quality copy of a movie by the movie accessing system 2106.

To combat the above scenarios, the example content distribution network 2100 employs technologies across the movie distribution system 2118 and the movie accessing system 2106. As will be described in further detail below with reference to FIG. 22, the movie distribution system 2118 and the movie accessing system 2106 employ subsystems to monitor certain behaviors that are indicative of misuse, and also modify content to facilitate such monitoring. While for the details regarding the subsystems will be provided, an overview of certain example functions is provided immediately below Monitored behavioral indicators that may be detected by the content distribution network 2100 include:

(1) Ordering the same movie (e.g., movie title) multiple times.

Population spikes of wireless devices (e.g. Wi-Fi and Bluetooth devices) within a home-viewing environment (e.g., the residence 2114) are detected. As virtually everyone who comes over to watch a movie at the residence 2114 will have a smartphone, the movie accessing system 2106 monitors populations of Wi-Fi devices in the residence 2114 in order to ensure sufficient bandwidth is available for high-quality viewing experience. For example, the system may choose to download more of a movie into the viewing device if the home network is experiencing heavy traffic. An important by-product of this technology is the ability to count the Wi-Fi and Bluetooth enabled devices before, during, and after movie purchases. Spikes in number devices during film rentals trigger a social scrape, discussed in further detail below.

(2) Audio fingerprint/location services matching. Both of these technologies contribute to the detection of an increase in the number of devices (and thus humans) at the time of viewing.

Usage is permitted for the entire residence 2114, but membership (or subscription) to a service associated with the movie distribution system 2118 is tied to an individual account, home address, and mobile number. A Bluetooth ping is emitted from the movie accessing system 2106 (e.g., a set-top box). The movie accessing system 2106 is accordingly able determine if the member's mobile phone is present when a film is purchased. Should the content distribution network 2100 detect multiple purchases without the member present, the movie distribution system 2118 conducts a social media scrape, an enhanced and specific MUI (Member's Unique Identifier) search and a purchase analysis to ensure proper use (2) Ordering in similar time and frames on a regular basis, (implying a programmatic system to capture the output of the content access device)

The content distribution network 2100 automatically detects such activity, and conducts a social media scrape—e.g., automated analysis of a member's social media profile and circle and can shut down service if abuse is further evidenced.

Each membership is tied to an individual and a single residential address (e.g., of the residence 2114). The movie accessing system 2106 is always aware of its location and will only activate in the applicant's home address. When the movie accessing system 2106 is installed, it forms an unbreakable chain with the single TV, switcher or receiver to which it is connected with via HDMI, creating a "Client to Device Pairing" (CTDP). Once the CTDP is established and someone attempts to move the movie accessing system 2106, the chain is broken and the movie accessing system 2106 is unusable. This movie accessing system 2106 may be designed for one screen, one home.

When the member would like to upgrade his/her screen, the member will notify the movie distribution system 2118 to enable a grace period, allowing him/her to change screens and re-lock to the new one. Again, the change of screen has to take place in the exact member home (e.g., the residence 2114) and once the re-lock takes place the unbreakable chain is reestablished.

A consumer 2104 is associated to a specific theater of the exhibitors 2108 to which all credential and concession income are attributed and where the member can re-experience films previously rented on the service. This provides transparency on a "same-store-basis"—existing physical attendance, digital experience and physical re-experience all contributing to EBITDA on a theater-by-theater basis. This creates a powerful financial analysis tool for the exhibitors 2108 to properly analyze performance and the positive impact of a movie distribution system 2118. A service offered by a movie distribution system 2118, which is tied to location and credential purchases, can provide this level of clarity.

The content distribution network 2100 described herein is a highly sophisticated technology platform exceeding many requirements for existing platforms today. The living room is a less-controlled environment, and the example content distribution network 2100 provides measures to protect movie. Examples of such measures include:

Encryption Key Hierarchy Design

The movie distribution system 2118 and movie accessing system 2106 use multiple encryption key sets which can change as often as necessary (the "key period") (for example, every 60 seconds). Given the proprietary architecture of the content distribution network 2100, at today's processing power, it would take a super-computer many years to crack encryption under a brute force attack scenario. Even then, the intruder would have access to only the amount of time equivalent to the key period of viewing. This process would have to be repeated for each key period in the film.

Persistent Forensic Watermarking

The movie accessing device 2106 to watermark each movie with a Member's Unique Identifier (MUI) linking it back to the individual member. The watermark is persistent, invisible to the naked eye and irremovable without the destruction of the underlying image. A watermark thus operates as a digital beacon stitched into the fabric of the film.

Forensic Data Center

The movie distribution system 2118 has a dedicated data center that constantly searches for MUI's outside the content distribution network 2100. Since the MUI is inserted at the movie accessing device, any MUI found anywhere on the internet 2100 is considered illicit. At this point, the member's movie accessing system 2106 will be shut off and quarantined. If the abuse or illicit activity is confirmed, the member and the household will be banned from the content distribution network 2100.

P2P Polluter

Once an MUI is detected outside of the content distribution network 2100, the movie distribution system 2118 (and specifically a forensic analysis system 2238) distributes corrupted files of the same film at a ratio of 1,000 to 1 via peer-based distribution. Therefore, immediately "diluting" the infringement to a rate that would be extraordinarily frustrating, if not impossible, for further piracy of that copy to take place.

The content distribution network 2100 provides custom dashboards to the production studios 2110 and the exhibitors 2108 with transparent up-to-the-minute reporting on a title-by-title basis. In anonymous format, the movie distribution system 2118 provides "behavioral analytics" to better target market members who are fans of particular genres or filmmakers. Increasing titles, surfacing more relevant choices per member and ultimately increasing purchases betters all constituencies. F The content distribution network 2100 may be implemented as a closed membership service, and records for members or subscribers in the following basic information:
  Name
  DOB (must be 18+)
  Gender
  Home Address
  Email
  Phone number (home and cell)
  Own or rent home
  How long lived at home address
  From this information, and a social media scrape—automated analysis of a member's social media profile and circle—the movie distribution system 2118 is able to determine the applicant's suitability and grant or deny membership.

Once membership is granted, the member's card is charged for shipping of the movie accessing system 2106. The movie accessing system 2106 is drop-shipped directly to the home residence of the accepted member, and a signature will always be required.

The content distribution network 2100 a technology platform enabling exhibitors 2108 to distribute first-run movies to a residence 2114. When the movie is in theaters, it is on the content distribution network 2100. When it is out of theaters, it is off the content distribution network 2100.

Figure 22:
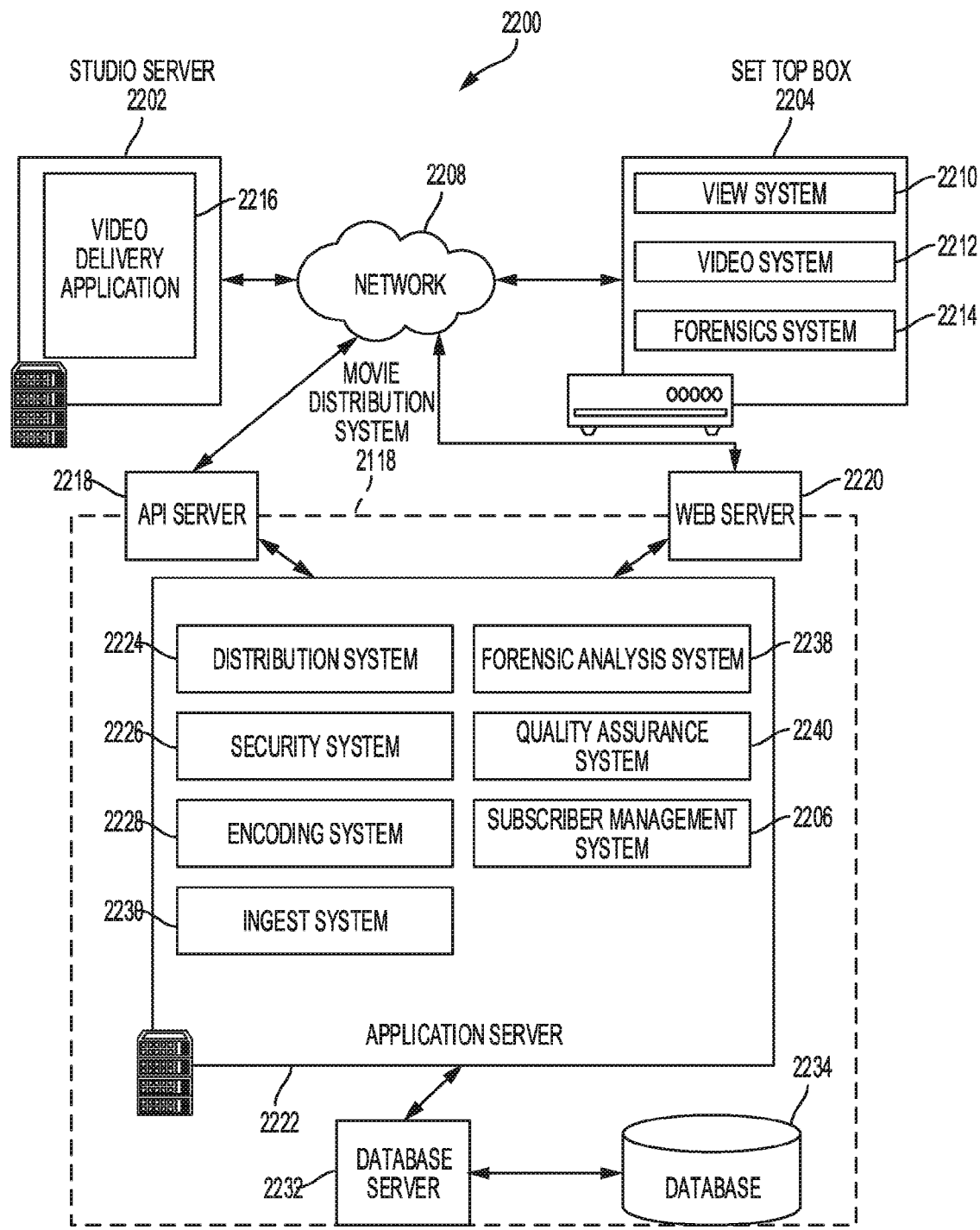
FIG. 22 is a block diagram illustrating a network-based movie distribution system, according to some example embodiments.

With reference to FIG. 22, an example embodiment of content distribution network architecture 2200 is shown. A movie distribution system 2118 provides server-side functionality via a network 2208 (e.g., the Internet or wide area network (WAN)) to a movie accessing system 2106 in the example form of a set top box 2204. Various subsystems, including a view system 2210, a video system 2212, and a forensics system 2214 are hosted and execute on the set top box 2204.

The movie distribution system 2118 includes an application server 2222, which in turn hosts a number of subsystems that provides a number of functions and services to studio server 2202 and the set top box 2204.

The set top box 2204 enables a consumer 2104 to view and interact with the movie distribution system 2118. For instance, the user provides input (e.g., touch screen input or alphanumeric input) to the set top box 2204, and the input is communicated to the movie distribution system 2118 via the network 2208. In this instance, the movie distribution system 2118, in response to receiving the input from the user, communicates information back to the set top box 2204 via the network 2208 to be presented to the user.

An Application Program Interface (API) server 2218 and a web server 2220 are coupled to, and provide programmatic and web interfaces respectively, to the application server 2222. The application server 2222 comprises a number of subsystems including a distribution system 2224, a security system 2226, an encoding system 2228, an ingest system 2230, a forensic analysis system 2238, a quality assurance system 2240, and a subscriber management system 2206.

The ingest system manages the retrieval of content from the studios for encoding and distribution.

The quality assurance system works to ensure movies are encoded with high quality and there are no errors in the resulting files.

The subscriber management system is the core registry of members of the service, and is the database that determines whether a member's device is valid and can be issued keys to decrypt the movie.

The application server 2222 is, in turn, shown to be coupled to a database server 2232 that facilitates access to information storage repositories (e.g., a database 2234). In an example embodiment, the database 2234 includes storage devices that store information accessed and generated by the set top box 2204

Additionally, a video delivery application 2216, executing on a studio server 2202, is shown as having programmatic view to the movie distribution system 2118 via the programmatic interface provided by the Application Program Interface (API) server 2218.

Further, while the content distribution network architecture 2200 shown in FIG. 22 employs a client-server architecture, the present inventive subject matter is of course not limited to such an architecture, and could equally well find application in a distributed, or peer-to-peer, architecture system, for example. The content distribution network architecture 2200 could also be implemented as a standalone software program, which does not necessarily have networking capabilities.

Figure 23:
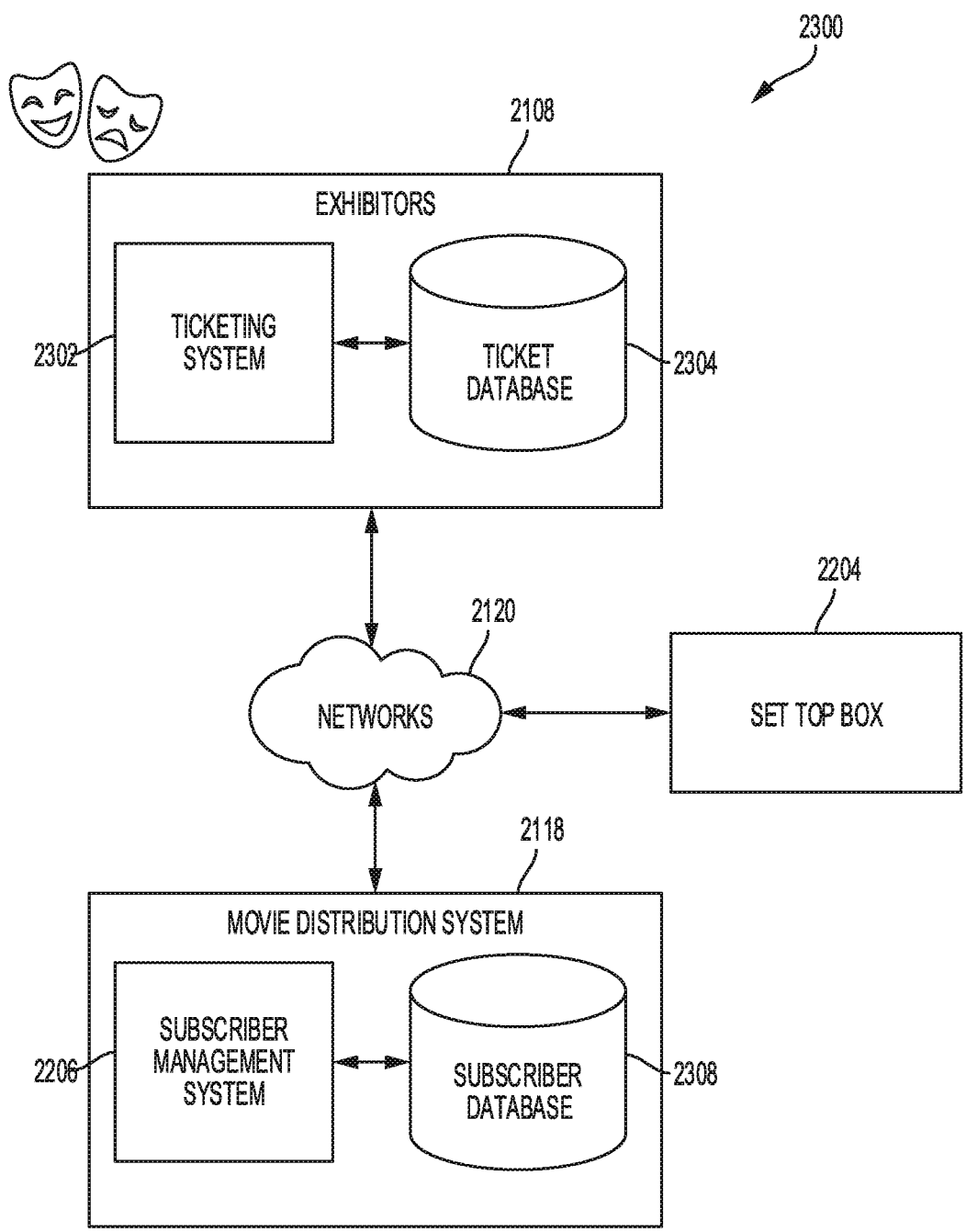
FIG. 23 is a block diagram illustrating a further details of subscriber management and ticketing technology, according to some example embodiments, as implemented between a movie distribution system and exhibitors.

FIG. 23 is a block diagram illustrating further details of the subscriber management and credentialing technology, according to some example embodiments, as implemented between a movie distribution system 2118 and exhibitors 2108.

Exhibitors maintain a credentialing system 2302, and a credential database 2304, to track the issuance of credentials for the viewing of movies within the theaters operated by the exhibitors 2108. To this end, the credentialing system 2302 provides on-premise terminals at which movie theater-goers can purchase credentials. The credentialing system 2302 may also have a web and application program interfaces so as to allow the purchase of theater credentials remotely, via the Internet (e.g., on webpages or using credential purchasing applications hosted on mobile other computing devices).

A subscriber management system 2206 of a movie distribution system 2118 is able to access the credentialing system 2302 of the 2108 via the networks 2120. This in turn enables a consumer 2104, via the set top box 2204, to interact with the movie distribution system 2118 to purchase credentials for accessing content (e.g., a movie), with this credential purchased being accredited to the exhibitors 2108 and reflected in the credentialing system 2302 of the exhibitors 2108. For example, a consumer 2104 may interact with the movie distribution system 2118, via the networks 2120, and issue a credential purchase request to the movie distribution system 2118. The movie distribution system 2118, in turn, may record a corresponding credential purchase authorization within the subscriber database 2308. The credential purchase authorization enables and authorizes access by the set top box 2204 to a digitized version of the movie (e.g., stored within the movie database 2116). The movie distribution system 2118 further interacts via the networks 2120, with the credentialing system 2302 to associate a credential purchase authorization within the 2206 with a credential purchase recorded in the credential database 2304. This is synchronization between the subscriber management system 2206 and the credentialing system 2302 enables redemption of a credential (or multiple credentials) to view a movie at either a movie theater operated by the exhibitors 2108 and/or within a residence 2114 via the set top box 2204.

As with credential purchase authorizations, credential redemptions are likewise synchronized between the credentialing system 2302 and the subscriber management system 2206, so that the viewing of a movie, for example, on the set top box 2204 may disqualify further viewing of the movie within a theater operated by the exhibitors 2108.

Figure 24:
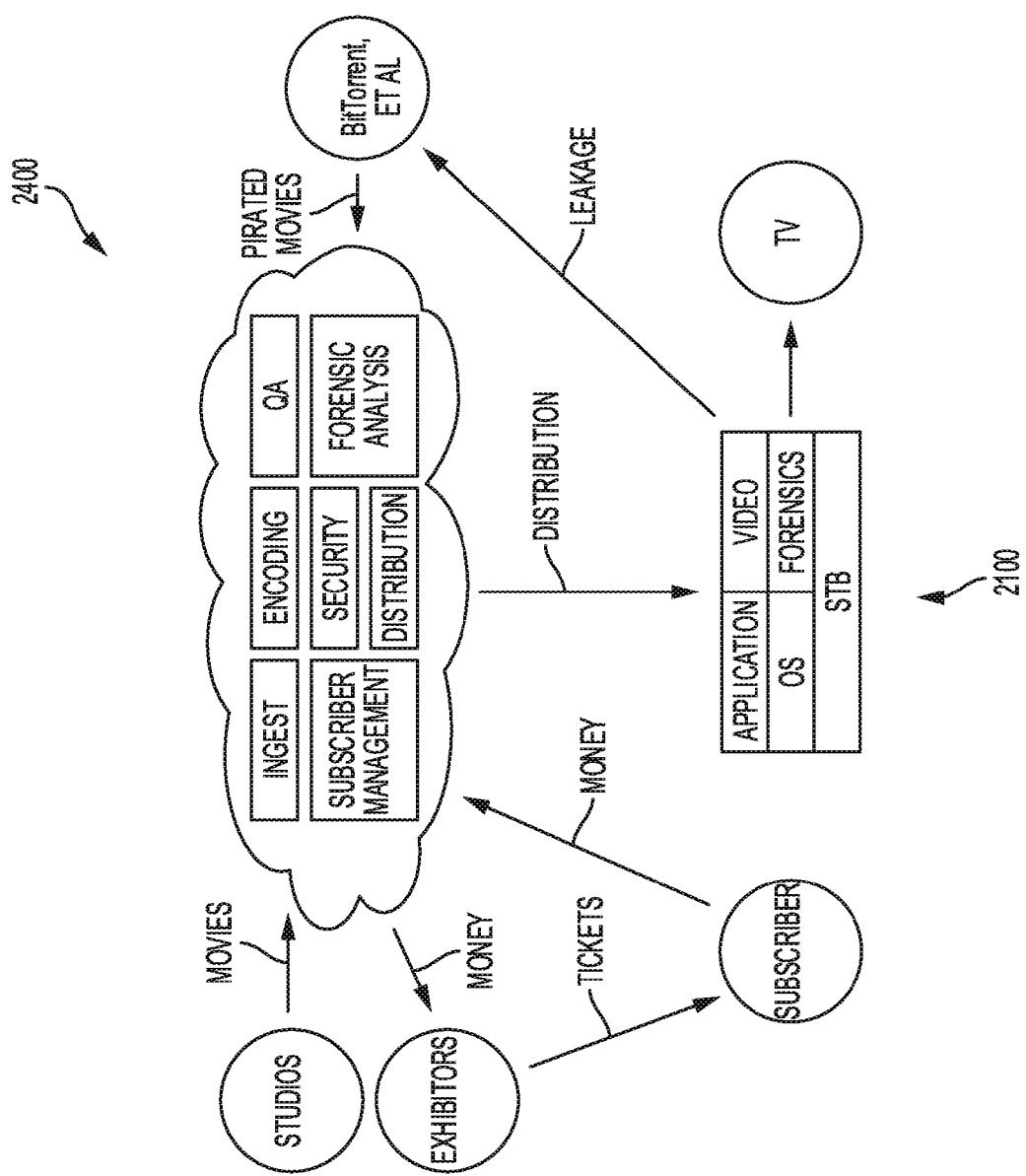
FIG. 24 is a schematic representation of interactions between various components described with reference to the preceding figures.
Figure 25:
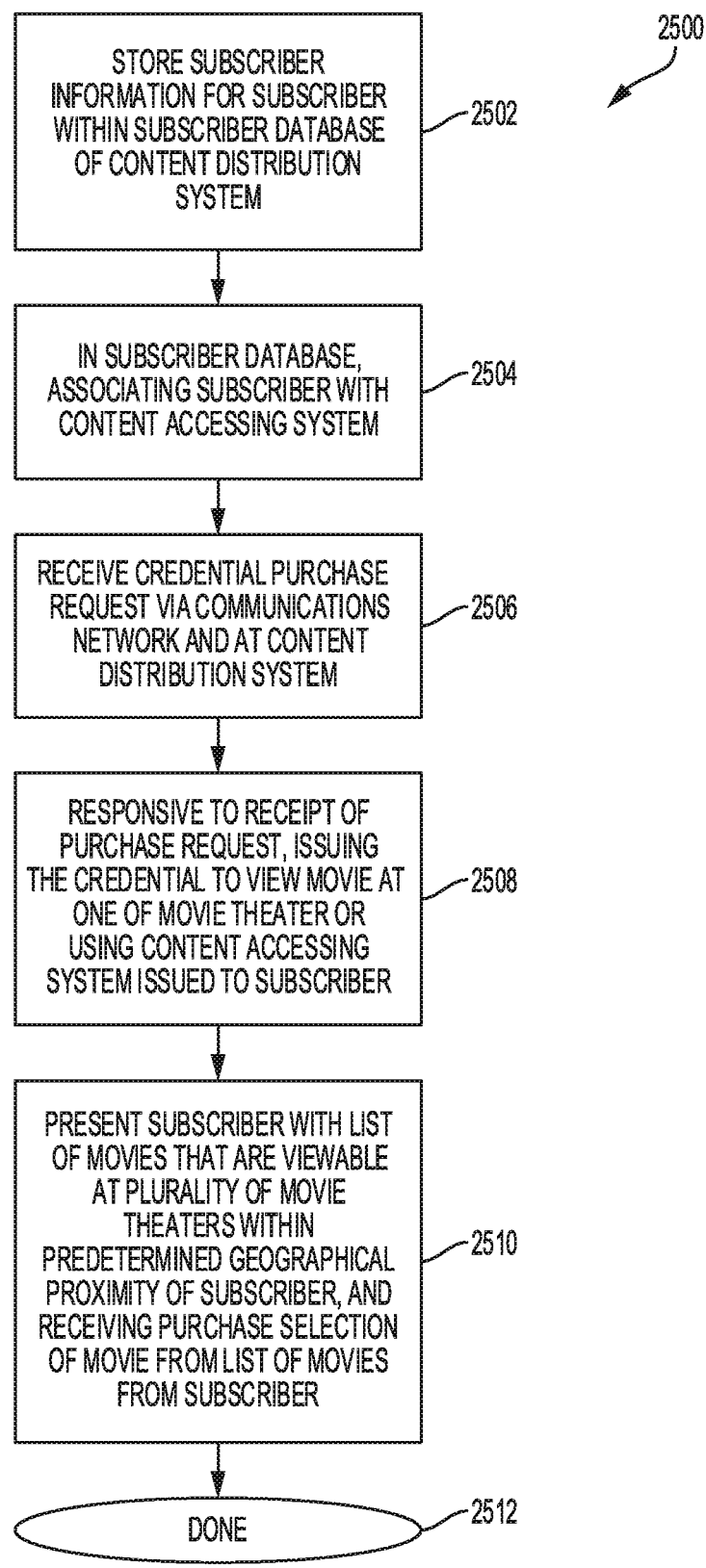
FIG. 25 illustrates a routine in accordance with one embodiment.
Figure 26:
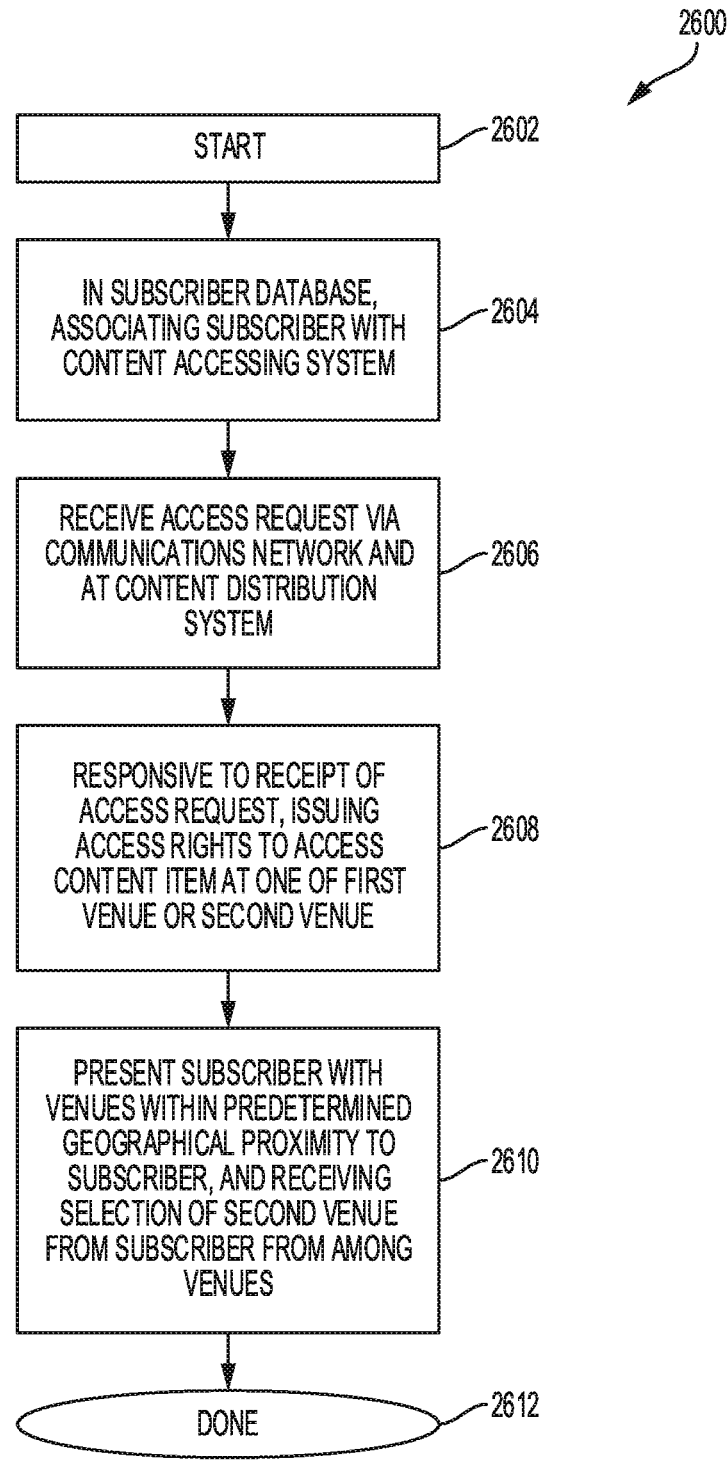
FIG. 26 illustrates a routine in accordance with one embodiment.
Figure 27:
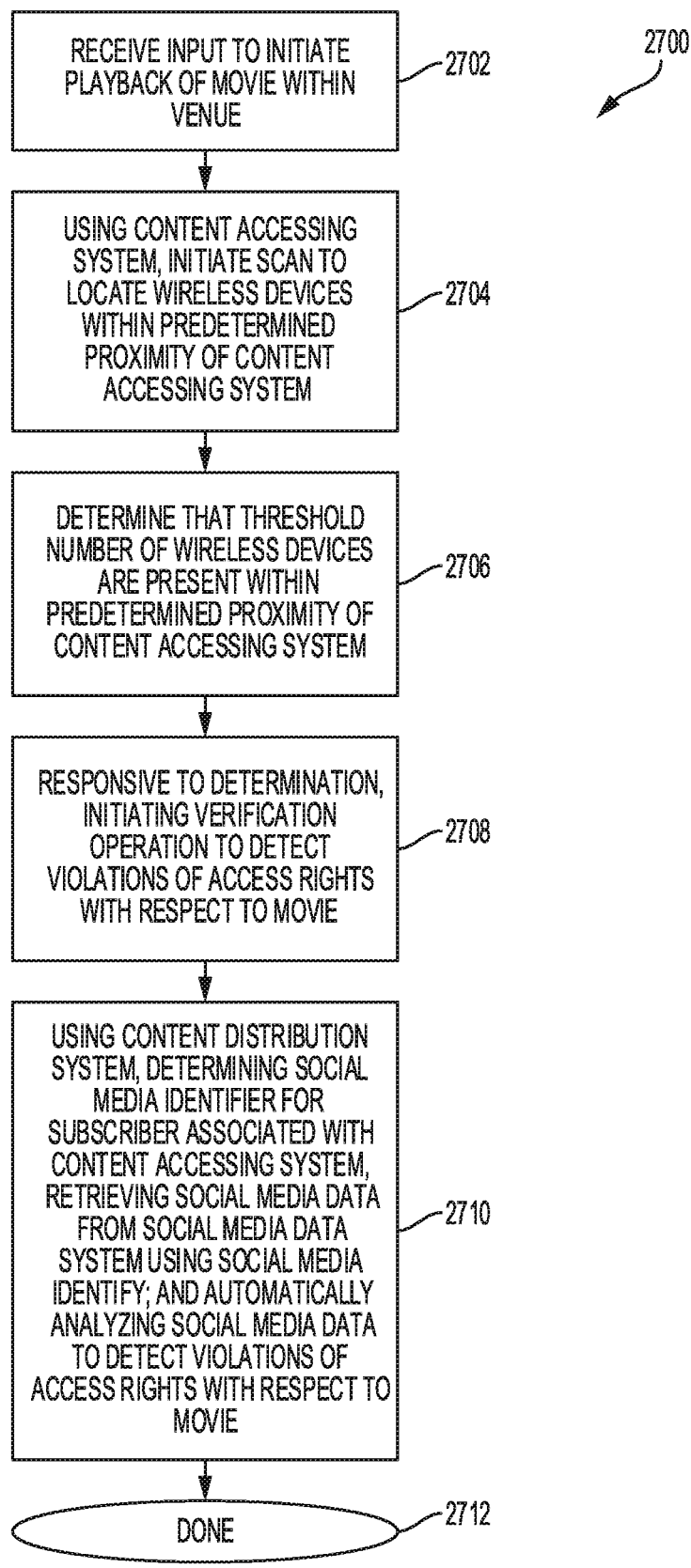
FIG. 27 illustrates a routine in accordance with one embodiment.
Figure 28:
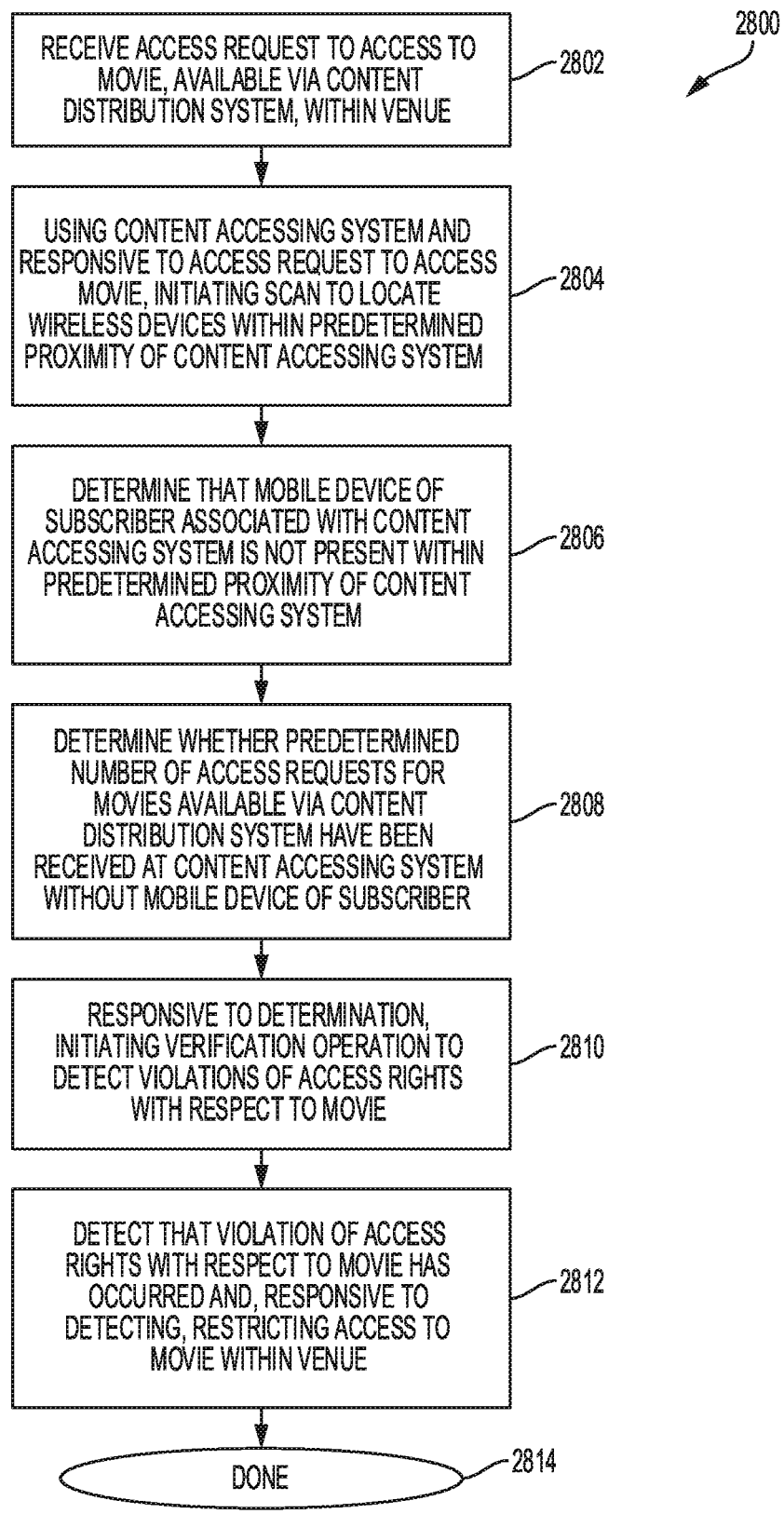
FIG. 28 illustrates a routine in accordance with one embodiment.
Figure 29:
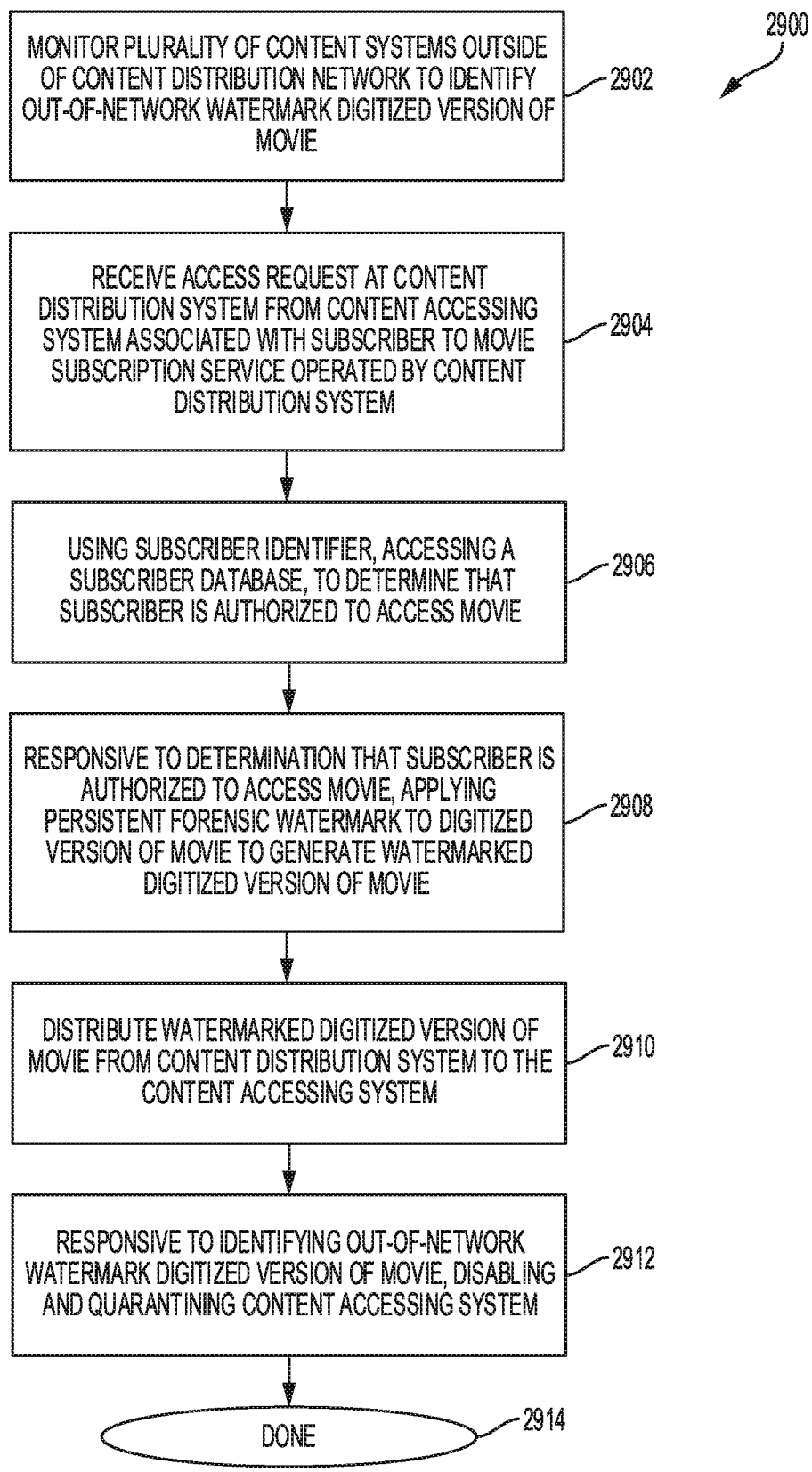
FIG. 29 illustrates a routine in accordance with one embodiment.
Figure 30:
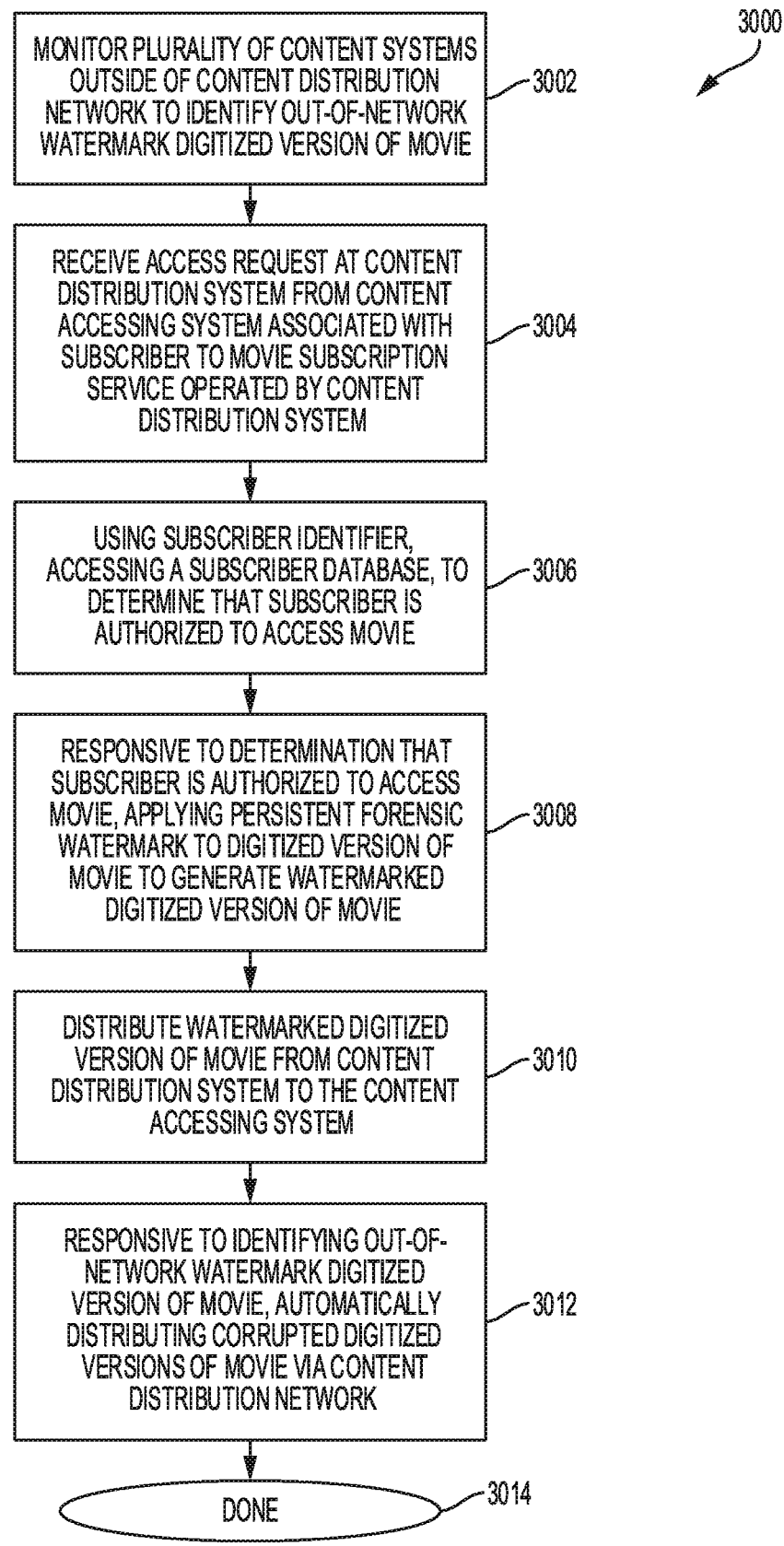
FIG. 30 illustrates a routine in accordance with one embodiment.

FIG. 24 is a schematic representation of interactions between various components described with reference to the preceding figures.

A routine is not described, which may be implemented and executed, in some example embodiments, by the movie distribution system 2118 described with reference to the preceding figures.

In block 2502, routine 2500 stores subscriber information for a subscriber within the subscriber database 2308 of a movie distribution system 2118.

In block 2504, routine 2500, in the subscriber database 2308, associates the subscriber with a content accessing system (e.g., the set top box 2204).

In block 2506, routine 2500 receives, via a communications network and at the content distribution system, a credential purchase request.

In block 2508, routine 2500 responsive to receipt of the purchase request, issues the credential to view the movie at one of a movie theater or using the content accessing system issued to the subscriber.

In block 2510, routine 2500 presents the subscriber with a list of movies that are viewable at a plurality of movie theaters within a predetermined geographical proximity of the subscriber, and receives a purchase selection of the movie from the list of movies from the subscriber.

In done block 2512, routine 2500 ends.

In block 2602, routine 2600 starts.

In block 2604, routine 2600 associates the subscriber with a content accessing system in the subscriber database 2308.

In block 2606, routine 2600 receives, via a communications network and at the content distribution system, a content access request to access a particular content item (e.g., a movie).

In block 2608, routine 2600 responsive to receipt of the access request, issues access rights to access the content item at one of a first venue or a second venue.

In block 2610, routine 2600 presents the subscriber with a venues within a predetermined geographical proximity to the subscriber, and receives selection of the second venue from the subscriber from among the venues.

In done block 2612, routine 2600 ends.

In block 2702, routine 2700 receives input to initiate playback of the movie within a venue.

In block 2704, routine 2700 using the movie accessing system 2106, initiates a scan to locate wireless devices within a predetermined proximity of the movie accessing system 2106.

In block 2706, routine 2700 determines that a threshold number of wireless devices are present within the predetermined proximity of the movie accessing system 2106.

In block 2708, routine 2700 responsive to the determination, initiates a verification operation to detect violations of access rights with respect to the movie.

In block 2710, routine 2700 using the movie distribution system 2118, determines a social media identifier for a subscriber associated with the movie accessing system 2106, retrieves social media data from a social media data system using the social media identify; and automatically analyzes the social media data to detect violations of the access rights with respect to the movie.

In done block 2712, routine 2700 ends.

In block 2802, routine 2800 receives an access request to access to the movie, available via the movie distribution system 2118, within the venue.

In block 2804, routine 2800 using movie accessing system 2106 and responsive to the access request to access the movie, initiates a scan to locate wireless devices within a predetermined proximity of the movie accessing system 2106.

In block 2806, routine 2800 determines that a mobile device of a subscriber associated with the movie accessing system 2106 is not present within the predetermined proximity of the movie accessing system 2106.

In block 2808, routine 2800 determines whether a predetermined number of access requests for movies available via the movie distribution system 2118 have been received at the movie distribution system 2118 from a device without geographical proximity to the mobile device of the subscriber.

In block 2810, routine 2800 responsive to the determination, initiating a verification operation to detect violations of access rights with respect to the movie.

In block 2812, routine 2800 detects that a violation of the access rights with respect to the movie has occurred and, responsive to the detecting, restricts to the movie within the venue.

In done block 2814, routine 2800 ends.

In block 2902, routine 2900 monitors a plurality of content systems outside of the content distribution network 2100 to identify an out-of-network watermark digitized version of the movie.

In block 2904, routine 2900 receives an access request at the movie distribution system 2118 from the movie accessing system 2106 associated with a subscriber to a movie subscription service operated by the movie distribution system 2118

In block 2906, routine 2900 using the subscriber identifier, accesses the subscriber database 2308, to determine that the subscriber is authorized to access the movie.

In block 2908, routine 2900 responsive to the determination that the subscriber is authorized to access the movie, applies a persistent forensic watermark to the digitized version of the movie to generate a watermarked digitized version of the movie.

In block 2910, routine 2900 distributes the watermarked digitized version of the movie from the movie distribution system 2118 to the movie accessing system 2106.

In block 2912, routine 2900 responsive to identifying the out-of-network watermark digitized version of the movie, disabling and quarantining the movie accessing system 2106

In done block 2914, routine 2900 ends.

In block 3002, routine 3000 monitors a plurality of content systems outside of the content distribution network 2100 to identify an out-of-network watermark digitized version of the movie.

In block 3004, routine 3000 receives an access request at a movie distribution system 2118 from the movie accessing system 2106 associated with a subscriber to a movie subscription service operated by the movie distribution system 2118

In block 3006, routine 3000 using the subscriber identifier, accesses the subscriber database 2308, to determine that the subscriber is authorized to access the movie.

In block 3008, routine 3000 responsive to the determination that the subscriber is authorized to access the movie, applies a persistent forensic watermark to the digitized version of the movie to generate a watermarked digitized version of the movie.

In block 3010, routine 3000 distributes the watermarked digitized version of the movie from the movie distribution system 2118 to the movie accessing system 2106.

In block 3012, routine 3000 responsive to identifying the out-of-network watermark digitized version of the movie, automatically distributing corrupted digitized versions of the movie via the movie distribution system 2118

In done block 3014, routine 3000 ends.

Figure 31:
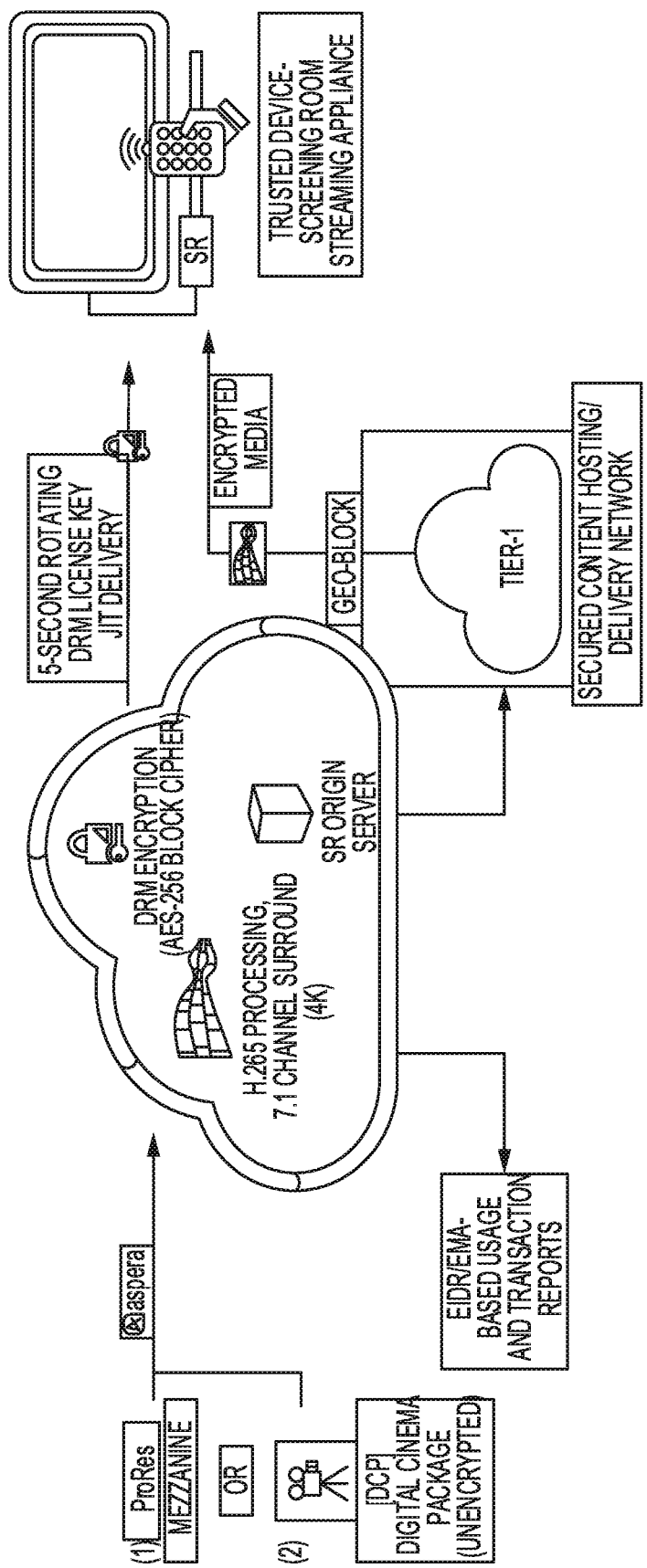
FIG. 31 is a diagrammatic representation of a content distribution network within which various example embodiments may be implemented.

FIG. 31 is a diagrammatic representation of a content distribution network within which various example embodiments may be implemented.

In one embodiment, the system delivers first-run, feature films into the home. As such it is designed as a high standard consumer video service. Films are encoded at higher bit-rates to ensure the highest viewing quality. Content is distributed and saved to local storage inside the in-home viewing device. The system is designed with the high levels of piracy detection and prevention.

Figure 32:
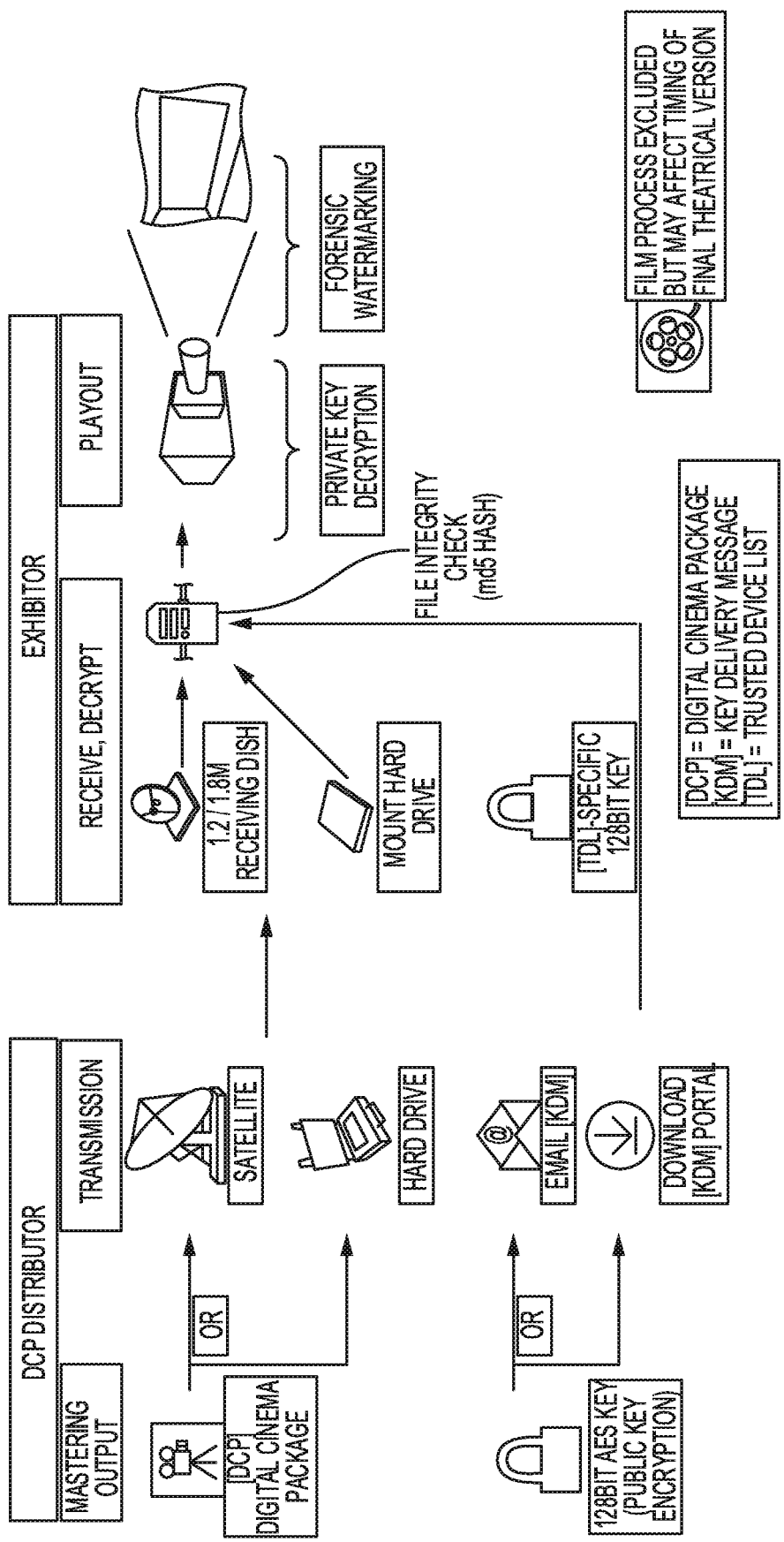
FIG. 32 is a diagrammatic representation of another content distribution network within which various example embodiments may be implemented.

FIG. 32 is a diagrammatic representation of another content distribution network within which various example embodiments may be implemented.

The content distribution of FIGS. 31 and 32 provide a similar level of security.

Ingest

The head end receives content from the studios using the Digital Cinema Distribution Coalition (DCDC) system, which pitches theater-quality encoded movies over a satellite connection. The DCDC system also includes provisions for exception-handling in cases where the satellite delivery fails, falling back ultimately to hand-delivered hard drives in the worst case.

In one embodiment, one aspect of the DCDC system is adapted. Because of encoding content for a typical flat-panel television screen, it is re-encoded at the head end for distribution, such that it is made available to the encoding system "in the clear." The ingest system is adapted to populate a secure file server with content that can be accessible by the encoding system.

In one embodiment, the DCDC system is leveraged for delivery and management of availability windows so the contents of the contribution file system conforms to industry standards.

In one embodiment, the output of the Ingest system is the Contribution File Server (CFS) with high-quality content for the movies and trailers that the system relies on.

Figure 33:
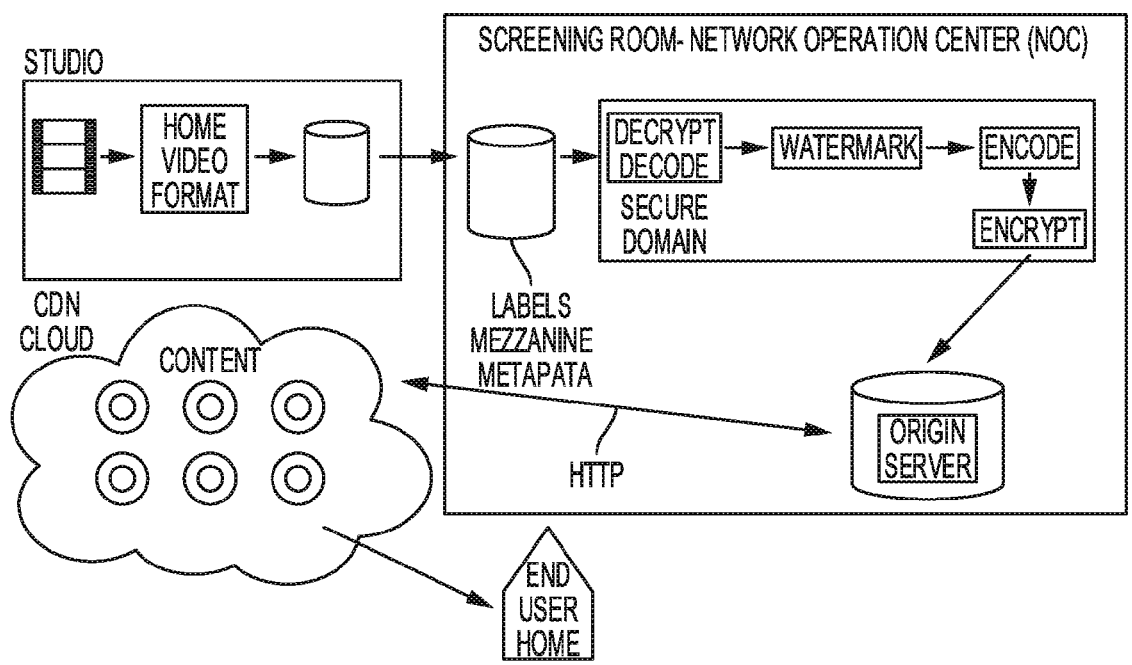
FIG. 33 is a diagrammatic representation of yet another content distribution network within which various example embodiments may be implemented.

FIG. 33 is a diagrammatic representation of yet another content distribution network within which various example embodiments may be implemented.

Encoding

Various embodiments manage a broad range of formats, frame rates and conversions, including HD, 3D, Mezzanine, 4K, UHD and HDR. Some embodiments offer native support for the Materials eXchange Format (MXF), and Inter-Operable Media Files (IMF) for Digital-End-To-End (DETE) system.

In one embodiment, new features and trailers that arrive in the CFS are automatically encoded to the defined profiles by a bank of encoding machines.

In one embodiment, content is encoded in H.265 video at a sufficiently high average bitrate to eliminate artifacts at full resolution. In the "constant quality" approach taken, the bitrate is allowed to vary when the content is more demanding rather than over-constraining the encoding process. In one embodiment, this uses the download-first delivery system. Because the entire feature is played from local storage, the peak encoded bitrate can be very large. High-action scenes simply consume more bandwidth with no effect on quality.

Audio is encoded in 7.1 channel surround sound in multiple formats to match the capabilities of home theater receivers. The appropriate format is delivered based on the user's receiver, and any necessary transformation from that format is handled by the set-top box.

Metadata

The DCDC system carries metadata to describe every feature and trailer. In some embodiments the User Experience (UX) uses some enhancements to metadata to complement the on-screen UI. Some augmentation of the available metadata is handled by an editorial staff and entered into the Metadata system.

In one embodiment, a MongoDB database is the master store of all metadata for the editorial system. In one embodiment, this, and all other data is stored within secure data centers. Data centers follow modern approaches to securing data, ranging from multi-tiered services, encrypted server-to-server communication throughout, and physical security around storage of key assets.

Some embodiments provide extensive technical and editorial metadata services, with a single master ingestion and normalization process that aligns source material with industry metadata and identification standards (e.g. EMA, EIDR). Metadata is sourced directly from Content Providers and be conditionally augmented with external data sources.

Encryption

In some embodiment, all content is encrypted with an AES block cipher. AES keys are changed periodically (such as every few seconds) to limit the impact of a brute-force attack on the content. In one embodiment, keys are never reused beyond the block of content in the particular file they are matched to, so even a successful attack on a single AES key yields only access to a few seconds of video. These keys are individually encrypted and delivered to each in-home STB that purchases the movie just prior to viewing. In one embodiment, within the STB, the keys are decrypted only within the trusted secure processor to prevent leakage.

Figure 34:
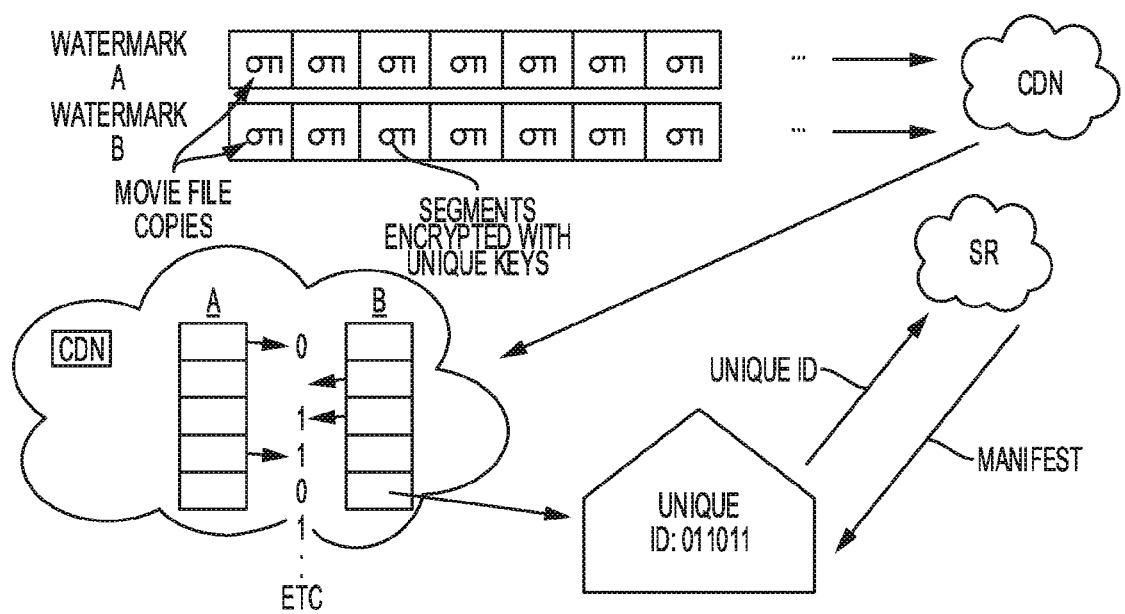
FIG. 34 is a diagrammatic representation of server-side watermarking according to some example embodiments.

FIG. 34 is a diagrammatic representation of server-side watermarking according to some example embodiments.

Watermarking

As part of the overall effort make the content highly secure and trackable, down to the end user, in some embodiments watermarking is implemented for all content. Some embodiments include a server and client component aspect.

Once content has been received in the secure NOC facility, server side watermarking is applied. This is done by using two streams of the same content and embedding content segments with specific watermarking. The segmented video content is further encrypted with individual keys.

Figure 35:
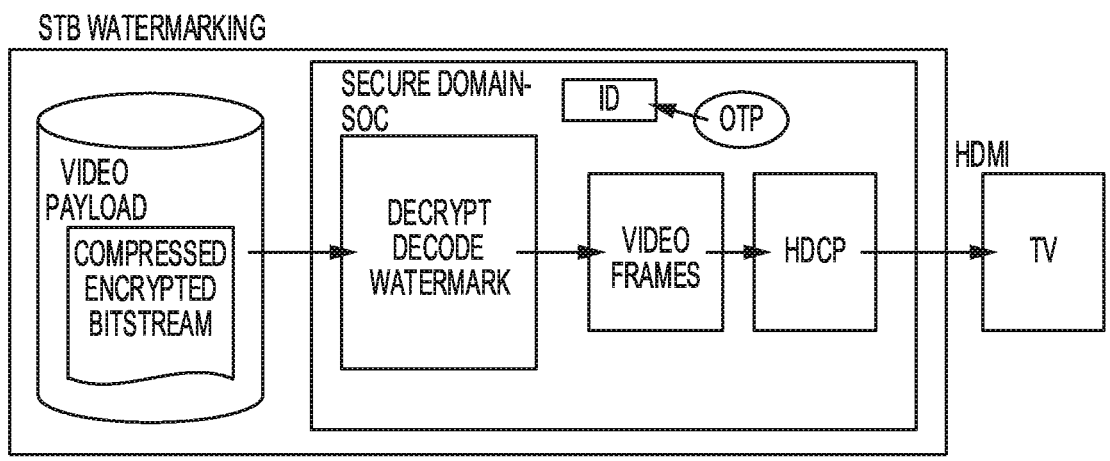
FIG. 35 is a diagrammatic representation of set-top-box watermarking according to some example embodiments.

FIG. 35 is a diagrammatic representation of set-top-box watermarking according to some example embodiments.

On the Set-Top-Box side the secure domain within the SOC provides the decryption and decoding of the protected content. Furthermore, HDCP is used for connecting via HDMI to final display (TV).

Figure 36:
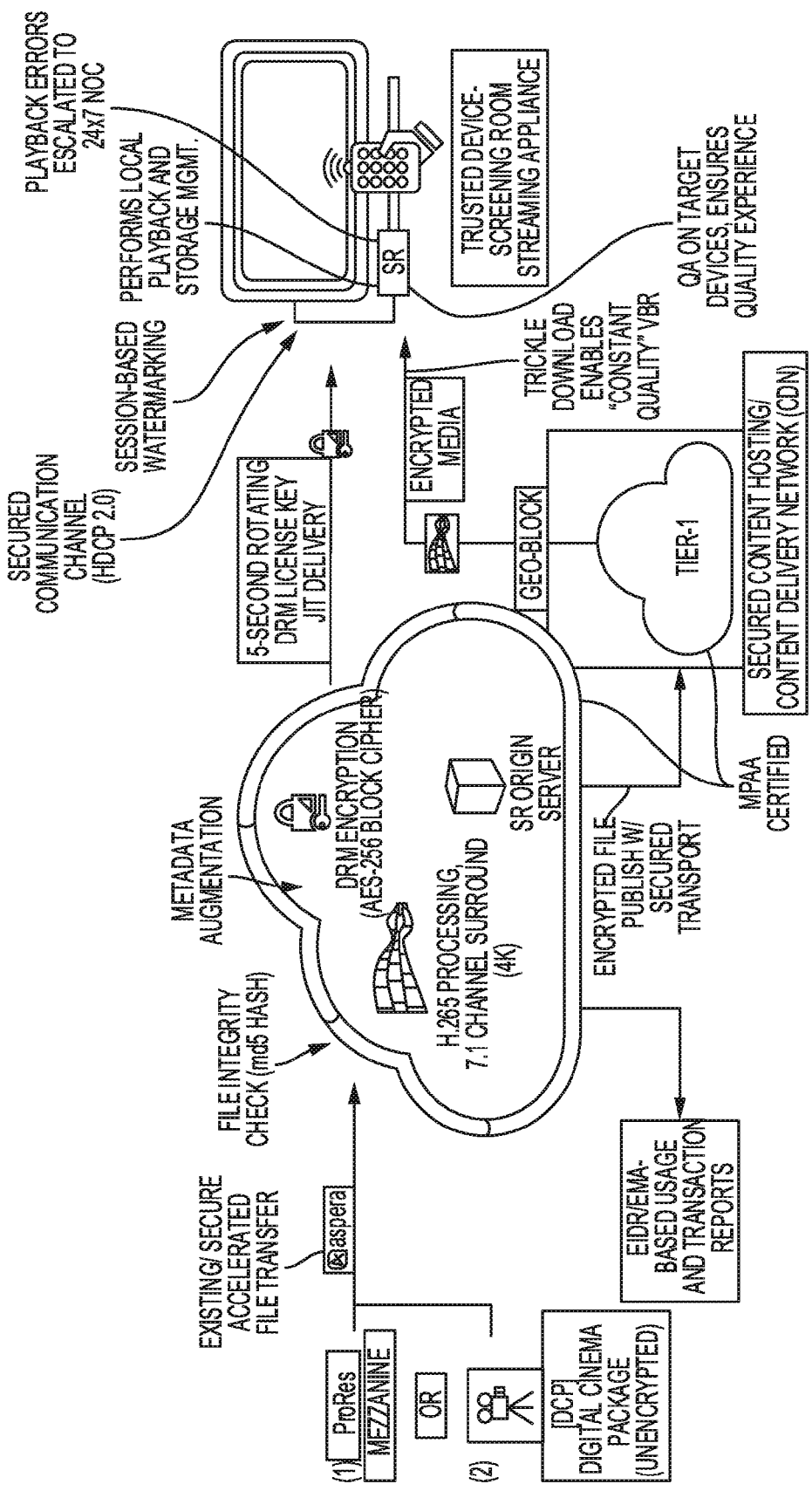
FIG. 36 is a diagrammatic representation of the content distribution network of FIG. 31 with an example watermarking implementation within which various example embodiments may be implemented.

FIG. 36 is a diagrammatic representation of the content distribution network of FIG. 31 with an example watermarking implementation within which various example embodiments may be implemented.

Quality & Service Assurance

In some embodiments encoded content and metadata are previewed on an actual in-home set-top box by QA staff to ensure there are no errors in encoding or metadata. Once a new feature has been QA'd and approved, the content is made available to the Origin Server for distribution. Performing QA on an actual STB ensures the entire end-to-end chain is functioning properly.

In some embodiments all parts or at least one part of the system, including the STB, collect key data that is examined for anomalies. Any problem with the display of any frame of a film is reported and escalated through support staff at the Network Operations Center (NOC). Anomalies are traced to root cause and actions are taken to restore service or identify faulty hardware.

The data is available to Customer Service as well, to allow for rapid troubleshooting and validation of viewer complaints. Any gap in the chain of problem identification and resolution is fed into an ongoing process improvement system that is focused on a 99.999% uptime.

Cloud Hosting, Storage and Distribution

The distribution infrastructure is set up in a secure cloud hosting, storage and delivery services for a library of the capacity of, for example, 50,000 movies with ingest from any major Content Provider. Content is published 1) in Mezzanine quality to support any downstream workflows; 2) in ABR format to a pre-designated end-point; 3) to any CDN origin storage (with DRM) and/or 4) to any provided IP-capable set-top-box, which is studio-approved and MPAA-certified cloud.

In some embodiments, encoded and encrypted content is stored on the Origin Server. Content Distribution Network (CDN) partners pull content from the Origin Server and make it available at scale to the customer base. Downloading into the SSD storage in the in-home STB is essentially a "pull" operation driven by an arbitrage according to each CDN partner's cost structure and availability.

In order to ensure the best possible viewing experience, devices download all available content, or a selected or automatic subset, to the local storage and keep it until the end of the availability window. This allows a viewer to impulse-purchase a film and view it with highest quality even if the viewer's internet connection is unstable.

In some embodiments, an internet connection is still required at the time of viewing, however, for delivery of keys and to ensure the collection of forensic information. Since the keys are a fraction of the size of the actual video data, the time it takes to download them at the time of purchase is negligible.

Trailers are also downloaded into the local storage and played prior to viewing of the feature film. During this time the STB and service work together to validate the integrity of the downloaded content, ensure the keys are properly delivered, and the internet is sufficiently available for forensic collection.

Tier-1 network delivery ensures high-quality video delivery, across multiple networks and leverage enhanced media consumption insights.

In some embodiments, the system manages and enforces Content Providers required potential content rights limitations (e.g., geo-blocking).

Figure 37:
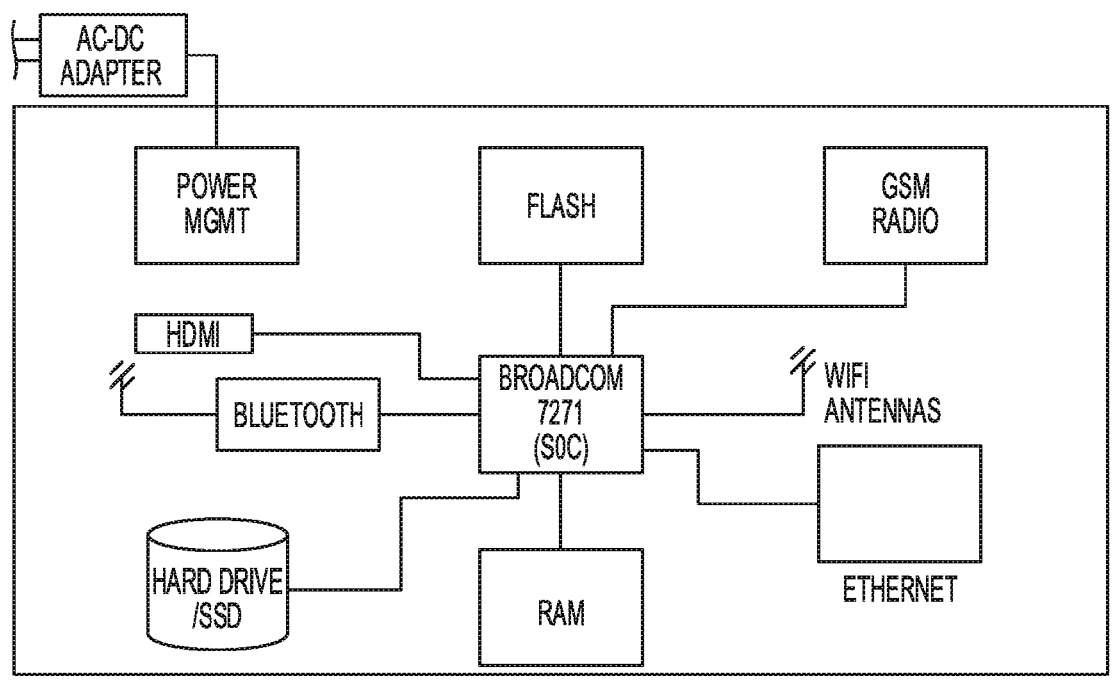
FIG. 37 is a block diagram illustrating a set-top box, according to some example embodiments.

FIG. 37 is a block diagram illustrating a set-top box, according to some example embodiments.

Customer-Premises Equipment

In one embodiment the in-home device looks like a set-top box, Some embodiments have one or more of:
 SSD storage for pre-cached film content.
 Custom individual watermarking with the device's unique ID.
 Highest-quality video decoding-minimum 4 k capable.
 Modern graphics for an excellent UI.
 Identification of the television for pairing.
 Network-scanning, both WiFi and Bluetooth.

Hardware/Security

The device has a system-on-chip (SoC) that includes all or many functions: CPU, GPU, A/V decode, secure processor (SP). The SP assumes that it cannot trust the host CPU, and in one embodiment all authentication of the device to the service is essentially a transaction between the service and the SP. The SP includes secure storage for keys as well as secure use of the keys for both symmetric and asymmetric decryption. In one embodiment, in no event is a key ever exposed to the host processor on the SoC. In one embodiment, as A/V bitstreams are decrypted they are kept in an area of memory inaccessible to the CPU while waiting to be decoded by the A/V decoder. By design, even a rooted device is unable to access keys or decrypted bitstreams.

In one embodiment, as a further measure of security, the device has a mechanism in the case that disables the device permanently and irreversibly if any attempt is made to open it.

OS/UX and Framework

In one embodiment, the underlying operating system running on the host processor is Android. Android is a variant of SELinux with an additional Java-based application framework. In one embodiment, since the device has no need for applications, the Android Operating System (OS) is stripped down to its basic elements necessary for operation, and the Java application environment is removed.

In one embodiment, the user-interface is built using web technologies to take full advantage of modern tools for expressing an experience. To support this, in one embodiment the OS implements a constrained, embedded version of the "Chromium" browser core which forms the basis of the "Chrome" browser. The Chromium browser core itself is subjected to pruning, but also extended to support certain aspects of the service.

Mobile Verification

In one embodiment the primary viewer's mobile phone is paired with the device to ensure the viewer is present when the device is active. In one embodiment pairing is performed by the Screening Room iOS/Android application. In one embodiment initial pairing is done by presenting a QR code on the television, which is viewed by the app using the mobile device's camera. In one embodiment once this pairing is established, audio fingerprinting can be used on an on-going basis to verify the presence of the viewer's mobile phone.

Forensics

Piracy

In one embodiment the primary attack vectors of concern for the system are that of copying digital content from the system via HDMI, and by training a camera on the output of a television.

HDMI piracy is mitigated to some extent by television pairing using the television's (or intermediate receiver's) unique ID, which is used to determine when the device is no longer connected to the original television. A call to customer service is required to re-enable the device after a legitimate move.

To handle both the case of digital copying as well as capturing photons from a screen, a forensic watermark is applied by the STB containing the ID of the device.

At the same time, the infrastructure includes a web crawler that is constantly searching for pirated versions of feature films. When the web crawler identifies a film, it scans it for watermarks. If a match is found, the account that matches the ID found in the watermark can be held accountable and, if necessary, disabled.

Clustering

The terms of service make it clear that the device is for household residents only. To impede attempts at "clustering," or allowing an excessive number of others to view the film in the viewer's home, in some embodiments one or more techniques are employed:
 Periodic scans of the home network are performed to keep track of the number of devices that are connected to WiFi.
 Periodic scans for Bluetooth devices are performed to count nearby phones and tablets.
 A fingerprint is embedded into the audio that can be used to ensure the actual viewer's mobile phone is within range of the television.

Any suspicious activity is followed up with a scan of the viewer's social media activity to determine if there is reason to suspect intentional "clustering."

Credentialing for Re-Experiencing

Viewers receive with each purchase the opportunity to re-experience the film at their theater of choice. Each purchase qualifies the viewer to receive two or more credentials and allow the viewer to make their showtime selection on-screen.

This involves several threads of execution:

Tracking vouchers. Once a purchase is made, the credit for viewing in the theater is recorded and tracked until the film is no longer available.

Showtime selection. Presentation of available showtimes to the user also involves mitigating impact to peak theater attendance. Operational rules are available in the system to reduce availability for re-experiencing when the showtime is nearly sold out.

Seat selection. Since many theaters now offer reserved seating, in one embodiment the system allows for seat selection with purchase.

Additional credentials. Viewers may purchase additional credentials for friends and family members to combine with the two or more credentials they receive with the original purchase. This supports seat selection, so the group can sit together.

Upgraded credentials. Viewers may choose to upgrade their original credentials to higher quality experiences (e.g. IMAX, 3D, etc.).

Mobile credentials on the viewer's phone.

Implementation of credential policy. The two or more credentials from the original purchase are for the use of the viewer and household only. In various embodiments, the system has one or more hooks to ensure it is extremely difficult to sell or share the credentials outside the household:

The viewer's mobile device is validated using SMS ensuring the credential QR code cannot be displayed on an un-validated device.

The QR code is not made available to the mobile device until a short time before the scheduled viewing.

The QR code is made available using geo-fencing to verify the user's proximity to the designated theater.

The QR code contains subtle animating graphics to mitigate the risk of the sharing screenshots of credentials.

The viewer's avatar is displayed on the mobile app along with the QR code to the trained agent at the theater to withhold issue of the credential if a photo verification isn't possible.

In one embodiment credentialing is through integration with an existing credentialing system like Fandango. In this case the credential policy is implemented as described as above. In another embodiment, credentials are issued via a separate kiosk in the theater that implements one or more additional screening techniques:

Video verification to ensure the viewer is present. Primarily for forensics, this allows follow up on a pattern of suspected abuse.

Bluetooth challenge-response validation between the viewer's phone and the kiosk (to mitigate the ability of a QR code being shared with another device).

Mobile Application

Standalone App

An engagements for end users, apart from the TV/STB application, is the mobile application. The mobile application can be used for one or more of: browsing content, viewing trailers (but not full length feature movies), viewing additional optional content provided for purchased content, accessing subscriber settings and managing overall account settings, approval of purchase content, ordering theater credentials and related concessions, selecting seats in theater and reserving transportation if necessary (e.g. Uber integration), and also being able to use it as a remote control when in proximity of the STB.

Out of Box Experience (OOBE)

When the Set-Top-Box (STB) is first received by the end user, installation or Out-Of-Box-Experience is very straight forward. The end user connects the STB to power and to the HDMI input on the TV.

Next, the end user downloads a mobile application. The first run scenario after installation (from the app respective app store), guides the end user through the next steps of the installation process. Namely, setting up the personal account with all personal and payment information (as much as possible pre-populated by the backend services and the information that on hand about the customer), and setting up personal preferences as well.

Once the personal set up is completed, the pairing with the STB will is the next phase, for example, via wireless (WiFi) connectivity in the home. The mobile app automatically discovers and pairs itself with the STB that it found in the vicinity. Next, the phone connects the STB directly to the home network (WiFi) as well, and sets up password protection for both devices. Once the STB is connected to wireless and the pairing of the phone/STB is completed, the system is ready for consumption and an introductory video is started.

Remote Control (Virtual App)

As part of Mobile Application, the application can be used as a remote control with the Set-Top-Box (STB). When playback of a feature content is started on the mobile application, the phone/app connects directly to the STB via WiFi and/or Bluetooth for connecting to the player on the STB. This enables the phone app to act as the remote control for the TV viewing as well as providing other related feature integrations (e.g. sharing of content/movie, providing feedback and rating, any other personal settings and/or preferences related to movie watching).

The mobile app can be used at any time to engage directly with the STB, provided that the mobile phone is within range of the STBs wireless radios (as dictated by Bluetooth about maximum of 30 meters and WiFi signal strength).

Virtual Credential—Theater Connection

The mobile app has interaction with the credentials that the end user has received as part of his movie purchase. For this interaction, there is a separate tab available on the mobile app that connects to the backend services (where we store the available credentials, redeemed credentials, and any related information). With the movie tab, the end user can select movie theater locations (browse all available and/or proximity selection as well), select seats directly (e.g. thru API/service integration of AMC and other services on our aggregation server), select any premium experience consumption for the theater (e.g. pre-order concession directly and have them ready for pick up/delivery at the time of arrival), order any other services (e.g. Uber ride reservation to/from theater).

Furthermore, the end user can augment and/or change the numbers of theater goers that would join him/her in the experience and have a seamless transaction right there, with a one click approval.

Once all selections have been made, a confirmation is provided and a secure bar or QR code will be sent to the customer on file (e.g. main approver of household). This allows for easy redemption of the credentials and any related concession on theater premise (e.g. similar experience as TSA pre-check).

Data Analytics

Analytics & Reporting

A component of backend services is the analytics engine and overall reporting capabilities derived from it.

Reporting is a core service provides to the content providers (e.g. Studios) for their assessment and based on their specific requirements. This is made available via at least one of two main components: generated queries and related reports, and self-service access to our data via exposed APIs and/or web portal for our partners.

The architecture enables data collected to feed components enabling real-time decision making. The full clickstream data set by individual client device and/or app service is collected.

Other services on this architecture allow for services like offer management to end users, recommendation services, special invitations to content/events, potential advertising and/or data sharing for other monetization or improved customer experiences.

One embodiment includes a series of standard web enabled dashboards (with customization options for visual representation and data selection range). Another embodiment allows for data export in pre-defined file formats, allowing for use of 3rd party tools as well. Web exposure is through standard HTML, for example.

Full access is provided to affiliate marketing site for any potential marketing materials and other assets, eliminating the need for multiple marketing service group interactions. He client base can be leveraged to help partners and content providers to make intelligent marketing and merchandising decisions.

Telemetry

As part of the overall monitoring and quality of service guarantee the telemetry service, which provides continuous analysis of data streams, assist the quality of service guarantee (QoS). A main data store for the Telemetry service is be the Telemetry database. Service monitoring tools are used as well.

Subscriber Management

Billing

Billing (credit card) solutions are used for the backend services including gifting, credits, cancellation, etc. Overall billing preferences are part of the subscriber settings, in that end users can update and assign multiple billing options (e.g. cards), at their convenience.

Studio-approved processes are used for royalty reporting, including account set-up, payment instrument integration, invoicing and reconciliation. Mandatory and optional data points required by Content Providers are managed.

Preferences & Settings

End user preferences and settings are stored in the subscriber database. The end user has access to personal settings and preferences via one or more options:

Using the mobile application and use the 'Settings Tab' on the mobile app to directly access and manipulate the stored data. This is a way to manipulate the setting and preferences data.

On TV screen/app section with a limited input mode assumption (e.g. there is no key board for entering credit card or address information).

Web application and use the 'Settings Tab' on the web page. This will have the same full functionality as the mobile application.

International

Service Scaling

Server side infrastructure (hosted cloud services) are expandable to cover other geographies. Since those services are hosted in one embodiment (e.g. AWS), many of the local government and data protection aspects are shielded for a direct impact to implementations. Same concept is applied to CDN scaling in various geographies and the ingest and delivery mechanism is applicable.

Localization

Screening Rooms systems are capable of processing audio, subtitling and closed-caption files in 80+ languages for future global expansion.

Databases

Content Database

Among the various databases/services for hosting, the Content Database represents a central storage for content. This includes full feature movie content, and related trailers, and/or supplemental content related to any movie. The service capability includes the whole content life cycle from ingest to removal at end of windowing period. Furthermore, workflow is implemented based on overall process and related meta data (e.g. movie posters, rating, etc.) is stored accordingly as well.

Theater Database

As part of the overall experience, customers can select their theater location of choice. The Theater database serves as a main aggregation hub for all theater locations. This is accomplished by continuously monitoring and updating table content directly from services exposed by the respective data sources (e.g. AMC API service calls for location attributes and updated location parameters). The Theater database also supports credentialing, seat selection, concession information and/or other exposed services, that are provided as part of the API/service exposure provided. This allows for overall aggregation, and an expedited experience from a customer perspective.

Subscriber Database

A main store for all subscriber/customer information is the Subscriber database. As part of subscriber management system, this store holds the relevant customer information. Among those are: user accounts and related customer identifiable information, related household information, customer preferences, payment and billing, device subscription and management, purchase history, related search history, concession and credential transaction history, and all subscriber settings that can be accessed either via the mobile applications or the webpage.

The subscriber database also stores the Universal User Profile. This serves as the store for end users's services— like accessing viewing history, purchasing history, cross-device pause/resume, authentication, preferred settings and others.

Telemetry Database

The Telemetry database is used for internal telemetry assessment and monitoring of all services. As a central store for many of the other services, it contains overall system usage data (provided from services like ingest, CDN usage, concurrent user, bandwidth usage, etc.). A variety of monitoring is coupled to an internal API for quality assurance and continuous monitoring by the support staff for quality of service guarantees and trouble shooting if necessary. Furthermore, analytics are run on the overall usage data, combined with subscriber information and input from the forensic services, to monitor and/or detect any improper behavior of service consumption.

Figure 38:
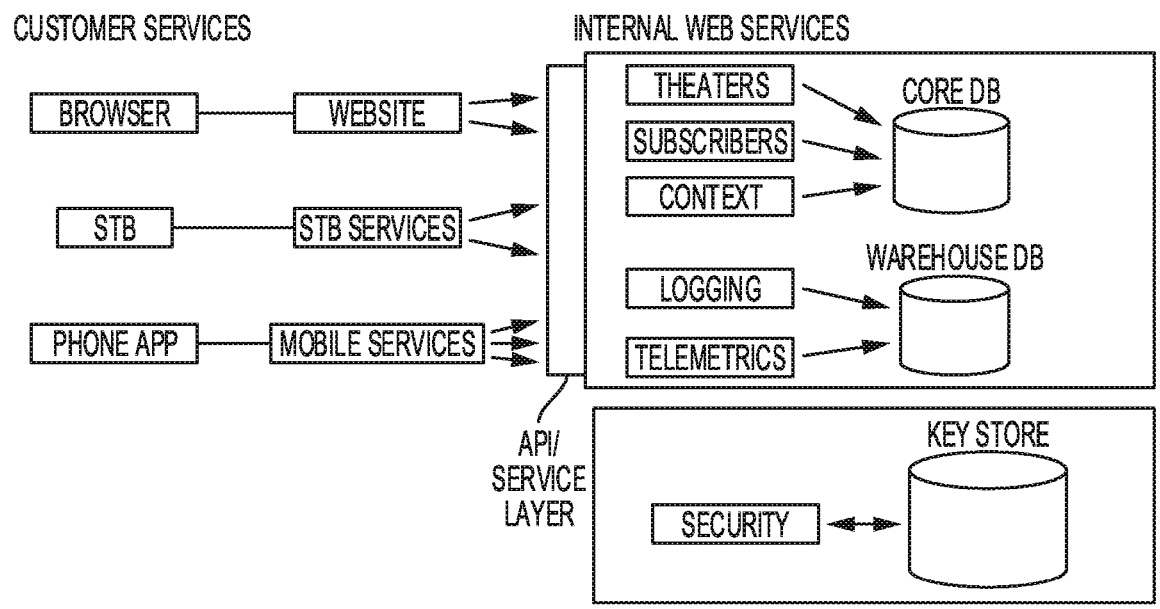
FIG. 38 is a diagrammatic representation of services of a content distribution network within which various example embodiments may be implemented.

FIG. 38 is a diagrammatic representation of services of a content distribution network within which various example embodiments may be implemented.

Security Efforts & Continuous Reviews

One embodiment gathers and identifies all relevant requirements (from Studios, MPAA, etc.)

One embodiment considers any potential contractual or regulatory requirements (e.g., PCI-DSS, SEC, Cybersecurity requirements, etc.)

One embodiment builds and reviews a requirements matrix of all controls (includes inspection steps, supporting artifacts, etc.)

One embodiment conducts assessment and review of initial state capabilities, desired future state and processes in place to meet requirements through interviews and workshops with business and technology stakeholders.

One embodiment identifies gaps, artifacts to support requirements and develop recommendations to remediate gaps.

Customer Support

Customer support is provided at a Network Operations Center, with media distribution monitoring, incident reporting and issue resolution procedures. In addition to detailed FAQs and 24/7 email and phone support, clients receive automated notifications with an up-to-date status towards any issue/resolution.

Various Embodiments

In the various embodiments disclosed, "receiving" is replaced with "accessing". In some embodiments, an "accessing" element relies on another element to perform any "receiving."

In some embodiments, unpairing is wireless or wired.

Some embodiments are directed to a server embodiment.

Various embodiments are:

A method comprising:

providing, to a client-side computing device, digital content from a server;

in response to a determination that a client-side computing device is outside of a predetermined geographic area in which the client-side computing device is authorized to present the digital content, the server causing a remedial action.

A method comprising:

in response to a detection that a client-side computing device has been unpaired from the viewing device, a server executing a remedial action, wherein the detection that the client-side computing device is unpaired from the viewing device occurs after the client-side computing device is paired to a viewing device such that the client-side computing device is able to cause digital content received from the remote server to be presented on a display of the viewing device.

A method comprising:

in response to receiving a determination that a number of users viewing digital content exceeds a threshold number of authorized users associated with the digital content, a server executing a first remedial action;

wherein the determination is based on a number of mobile computing devices that are within a geographic distance of the client-side computing device, that a number of users viewing the digital content exceeds a threshold number of authorized users associated with the digital content; and the determination occurs after a client-side computing device presents digital content that received from the server.

A method comprising:

in response to receiving determining that a number of unconfirmed sonic signals exceeds a threshold number of allowable unconfirmed sonic signals, a server executing a remedial action;

wherein the notification occurs after a client-side computing device receives digital content from a the server, the client-side computing device periodically presents a sonic signal to confirm that a mobile computing device of a user authorized with the client-side computing device is within a desired geographic distance of the client-side computing device, and wherein each sonic signal, upon being detected by the mobile computing device, causes the mobile computing device to transmit a confirmation message to the server confirming that the mobile computing device detected the sonic signal; and the server performs said determining that a number of unconfirmed sonic signals exceeds the threshold number of allowable unconfirmed sonic signals, wherein the number of unconfirmed sonic signals indicates a number of sonic signals presented by the client-side computing device that the mobile computing device did not confirm detecting.

Various server-related embodiments, include one or more processors; and one or more computer-readable mediums storing instructions that, when executed by the one or more computer processors, cause the server to execute server operations as disclosed.

Various server-related embodiments, include one or more computer-readable mediums storing instructions that, when executed by the one or more computer processors, cause a server to execute server operations as disclosed.

What is claimed is:

1. A method comprising:

receiving, by a client-side computing device, a digital movie from a remote computing system, a user authorized with the client-side computing device having purchased a limited license to access the digital movie;

presenting, on a display, a visible code that, when detected by an optical sensor of the mobile computing device, causes the mobile computing device to initiate a sonic signal detection mode during which a microphone of the mobile computing device actively listens for sonic signals presented by the client-side computing device;

periodically presenting, by the client-side computing device, sonic signals during presentation of the digital movie received from the remote computing system, the sonic signals being presented to confirm that the mobile computing device of the user authorized with the client-side computing device is within a desired geographic distance of the client-side computing device while the client-side computing device is presenting the digital movie received from the remote computing system, wherein each sonic signal is embedded in the digital movie, and each sonic signal, upon being detected by the mobile computing device, causes the mobile computing device to transmit a confirmation message to the remote computing system confirming that the mobile computing device detected the sonic signal;

receiving, by the client-side computing device during the presentation of the digital movie, a notification that a number of unconfirmed sonic signals exceeds a threshold number of allowable unconfirmed sonic signals, wherein the number of unconfirmed sonic signals indicates a number of sonic signals presented by the client-side computing device that the mobile computing device did not confirm detecting; and in response to receiving the notification that the number of unconfirmed sonic signals exceeds the threshold number of allowable unconfirmed sonic signals, suspending the presentation of the digital movie.

2. The method of claim 1, wherein the visible code, upon being detected by the mobile computing device, further causes the mobile computing device to transmit an identifier associated with the mobile computing device and an identifier associated with the client-side computing device to the remote server.

3. The method of claim 1, wherein the visible code is a quick response (QR) code that can be detected by an optical sensor of the mobile computing device.

4. The method of claim 1, wherein each sonic signal is embedded with a code and the mobile computing device includes the code embedded in the confirmation message to the remote computing system.

5. The method of claim 4, wherein periodically presenting sonic signals comprises:
presenting a first sonic signal embedded with a first code; and
presenting a second sonic signal embedded with a second code, wherein the second code is different than the first code.

6. The method of claim 4, wherein the code includes an identifier for the client-side computing device.

7. The method of claim 1, further comprising:
terminating the presentation of the digital movie; and
disabling the client-side computing device.

8. The method of claim 1, further comprising:
receiving a command from the remote server to resume performance of the digital movie; and
in response to receiving the command, resuming performance of the digital movie.

9. A client-side computing device comprising:
one or more computer processors; and
one or more computer-readable mediums storing instructions that, when executed by the one or more computer processors, cause the client-side computing device to perform operations comprising:
receiving a digital movie from a remote computing system, a user authorized with the client-side computing device having purchased a limited license to access the digital movie;
presenting, on a display, a visible code that, when detected by an optical sensor of the mobile computing device, causes the mobile computing device to initiate a sonic signal detection mode during which a microphone of the mobile computing device actively listens for sonic signals presented by the client-side computing device;
periodically presenting sonic signals during presentation of the digital movie received from the remote computing system, the sonic signals being presented to confirm that the mobile computing device of the user authorized with the client-side computing device is within a desired geographic distance of the client-side computing device while the client-side computing device is presenting the digital movie received from the remote computing system, wherein each sonic signal is embedded in the digital movie, and each sonic signal, upon being detected by the mobile computing device, causes the mobile computing device to transmit a confirmation message to the remote computing system confirming that the mobile computing device detected the sonic signal;
receiving, during the presentation of the digital movie, a notification that a number of unconfirmed sonic signals exceeds a threshold number of allowable unconfirmed sonic signals, wherein the number of unconfirmed sonic signals indicates a number of sonic signals presented by the client-side computing device that the mobile computing device did not confirm detecting; and
in response to receiving the notification that the number of unconfirmed sonic signals exceeds the threshold number of allowable unconfirmed sonic signals, suspending the presentation of the digital movie.

10. The client-side computing device of claim 9, wherein the visible code, upon being detected by the mobile computing device, further causes the mobile computing device to transmit an identifier associated with the mobile computing device and an identifier associated with the client-side computing device to the remote server.

11. The client-side computing device of claim 10, wherein the visible code is a quick response (QR) code that can be detected by an optical sensor of the mobile computing device.

12. The client-side computing device of claim 9, wherein each sonic signal is embedded with a code and the mobile computing device includes the code embedded in the confirmation message to the remote computing system.

13. The client-side computing device of claim 12, wherein periodically presenting sonic signals comprises:
presenting a first sonic signal embedded with a first code; and
presenting a second sonic signal embedded with a second code, wherein the second code is different than the first code.

14. The client-side computing device of claim 12, wherein the code includes an identifier for the client-side computing device.

15. The client-side computing device of claim 9, the operations further comprising:
terminating the presentation of the digital movie; and
disabling the client-side computing device.

16. A non-transitory computer-readable medium storing instructions that, when executed by one or more computer processors of a client-side computing device, cause the client-side computing device to perform operations comprising:
receiving a digital movie from a remote computing system, a user authorized with the client-side computing device having purchased a limited license to access the digital movie;
presenting, on a display, a visible code that, when detected by an optical sensor of the mobile computing device, causes the mobile computing device to initiate a sonic signal detection mode during which a microphone of the mobile computing device actively listens for sonic signals presented by the client-side computing device;
periodically presenting sonic signals during presentation of the digital movie received from the remote computing system, the sonic signals being presented to confirm that the mobile computing device of the user authorized with the client-side computing device is within a desired geographic distance of the client-side computing device while the client-side computing device is presenting the digital movie received from the remote computing system, wherein each sonic signal is embedded in the digital movie, and each sonic signal, upon being detected by the mobile computing device, causes the mobile computing device to transmit a confirmation message to the remote computing system confirming that the mobile computing device detected the sonic signal;

receiving, during the presentation of the digital movie, a notification that a number of unconfirmed sonic signals exceeds a threshold number of allowable unconfirmed sonic signals, wherein the number of unconfirmed sonic signals indicates a number of sonic signals presented by the client-side computing device that the mobile computing device did not confirm detecting; and in response to receiving the notification that the number of unconfirmed sonic signals exceeds the threshold number of allowable unconfirmed sonic signals, suspending the presentation of the digital movie.

* * * * *